(12) United States Patent
Schwartz et al.

(10) Patent No.: US 10,913,836 B2
(45) Date of Patent: *Feb. 9, 2021

(54) ELASTOMERIC COMPOSITES EXHIBITING HIGH AND LONG-LASTING MECHANICAL STRENGTH AND ELASTICITY AND DEVICES CONTAINING SAME

(71) Applicant: GreenSpense Ltd., Misgav (IL)

(72) Inventors: Adam Schwartz, Haifa (IL); Gadi Har-Shai, Hod-HaSharon (IL)

(73) Assignee: GreenSpense Ltd., Misgav (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/761,388

(22) PCT Filed: Jan. 16, 2014

(86) PCT No.: PCT/IL2014/050060
§ 371 (c)(1),
(2) Date: Jul. 16, 2015

(87) PCT Pub. No.: WO2014/111940
PCT Pub. Date: Jul. 24, 2014

(65) Prior Publication Data
US 2015/0368438 A1 Dec. 24, 2015

Related U.S. Application Data

(60) Provisional application No. 61/753,433, filed on Jan. 17, 2013, provisional application No. 61/753,428, filed on Jan. 16, 2013.

(51) Int. Cl.
*C08K 9/04* (2006.01)
*C08K 3/04* (2006.01)
(Continued)

(52) U.S. Cl.
CPC ............ *C08K 9/04* (2013.01); *B65D 83/0061* (2013.01); *B65D 83/62* (2013.01); *C08K 3/04* (2013.01);
(Continued)

(58) Field of Classification Search
CPC . C08K 3/04; C08K 9/04; C08K 5/548; C08K 9/06; C08K 2201/011; C08K 3/346;
(Continued)

(56) References Cited

U.S. PATENT DOCUMENTS 2,822,342 A 2/1958 Ford et al.
2,966,282 A 12/1960 Geisler
(Continued)

FOREIGN PATENT DOCUMENTS

CN 101058650 10/2007
CN 101735493 6/2010
(Continued)

OTHER PUBLICATIONS

JP 59-071340 A, machine translation, JPO Japan Platform for Patent Information (J-PlatPat). (Year: 1984).*
(Continued)

*Primary Examiner* — Josephine L Chang

(57) ABSTRACT

Elastomeric composites comprising natural rubber, a filler and nanofiller, which exhibit improved performance are disclosed. The elastomeric composite comprise a filler in an amount of less than 50 parts, yet exhibit high elastic modulus, high elasticity and reduced relaxation and/or creep. Articles and devices for dispensing fluid materials and comprising elastomeric composites are also disclosed.

12 Claims, 38 Drawing Sheets
(10 of 38 Drawing Sheet(s) Filed in Color)

(51) Int. Cl.
    *C08K 5/548*      (2006.01)
    *B65D 83/00*      (2006.01)
    *C08L 7/00*       (2006.01)
    *C08K 9/06*       (2006.01)
    *C08K 3/34*       (2006.01)
    *B65D 83/62*      (2006.01)
    *C08L 9/00*       (2006.01)

(52) U.S. Cl.
    CPC .............. *C08K 3/346* (2013.01); *C08K 5/548* (2013.01); *C08K 9/06* (2013.01); *C08L 7/00* (2013.01); *C08L 9/00* (2013.01); *C08K 2201/011* (2013.01)

(58) Field of Classification Search
    CPC ....... B65D 83/0061; B65D 83/62; C08L 7/00; C08L 9/00
    USPC ................................. 524/249, 445; 222/215
    See application file for complete search history.

(56) References Cited

U.S. PATENT DOCUMENTS

| | | |
|---|---|---|
| 3,509,102 A | 4/1970 | Horn et al. |
| 3,791,557 A | 2/1974 | Venus, Jr. |
| 3,838,796 A | 10/1974 | Cohen |
| 3,961,725 A | 6/1976 | Clark |
| 3,981,415 A | 9/1976 | Fowler et al. |
| 3,993,069 A | 11/1976 | Buckles et al. |
| 4,008,831 A | 2/1977 | Vidilles |
| 4,077,543 A | 3/1978 | Kulikowski et al. |
| 4,121,737 A | 10/1978 | Kain |
| 4,222,499 A | 9/1980 | Lee et al. |
| 4,251,032 A | 2/1981 | Werding |
| 4,458,830 A | 7/1984 | Werding |
| 4,573,992 A | 3/1986 | Marx |
| 4,574,746 A | 3/1986 | Keyes, IV et al. |
| 4,785,972 A | 11/1988 | LeFevre |
| 4,964,540 A | 10/1990 | Katz |
| 4,981,238 A | 1/1991 | Wenmaekers |
| 5,014,881 A | 5/1991 | Andris |
| 5,060,700 A | 10/1991 | Wenmaekers |
| 5,080,652 A | 1/1992 | Sancoff et al. |
| 5,111,971 A | 5/1992 | Winer |
| 5,127,554 A | 7/1992 | Loychuk |
| 5,143,260 A | 9/1992 | Loychuk |
| 5,156,309 A | 10/1992 | Friedrich |
| 5,167,631 A | 12/1992 | Thompson et al. |
| 5,303,853 A | 4/1994 | Nye |
| 5,372,578 A | 12/1994 | Kriesel et al. |
| 5,409,142 A | 4/1995 | Wenmaekers et al. |
| 5,526,957 A | 6/1996 | Brown et al. |
| 5,656,032 A | 8/1997 | Kriesel et al. |
| 5,927,551 A | 7/1999 | Taylor et al. |
| 6,407,155 B1 | 6/2002 | Qian et al. |
| 6,413,239 B1 | 7/2002 | Burns et al. |
| 6,793,090 B2 | 9/2004 | Ackerman et al. |
| 6,818,693 B2 | 11/2004 | Heinrich et al. |
| 9,409,698 B2* | 8/2016 | Har-Shai ............... A62C 13/00 |
| 9,758,641 B2 | 9/2017 | Schwartz |
| 2002/0061982 A1 | 5/2002 | Donald et al. |
| 2003/0032710 A1* | 2/2003 | Larson ................. C08K 9/04 524/445 |
| 2003/0172801 A1 | 9/2003 | Reininger |
| 2003/0176537 A1* | 9/2003 | Chaiko ................. C08K 9/04 523/200 |
| 2004/0011810 A1 | 1/2004 | Mita et al. |
| 2004/0054059 A1* | 3/2004 | Parker ................. B60C 1/00 524/445 |
| 2005/0027058 A1 | 2/2005 | Dias et al. |
| 2005/0103802 A1 | 5/2005 | Alberg |
| 2006/0211909 A1 | 9/2006 | Anstadt et al. |
| 2006/0243741 A1 | 11/2006 | Schiefer |
| 2007/0193669 A1 | 8/2007 | Giannini et al. |
| 2007/0262091 A1 | 11/2007 | Harper |
| 2007/0267437 A1 | 11/2007 | Nimmo et al. |
| 2008/0272145 A1 | 11/2008 | Nimmo et al. |
| 2009/0045222 A1 | 2/2009 | Nimmo et al. |
| 2009/0047969 A1 | 2/2009 | Lee et al. |
| 2010/0059544 A1 | 3/2010 | Dijkstra et al. |
| 2010/0133295 A1 | 6/2010 | Chan et al. |
| 2011/0060086 A1 | 3/2011 | Rodgers et al. |
| 2011/0108574 A1 | 5/2011 | Nimmo et al. |
| 2011/0130507 A1 | 6/2011 | Leu et al. |
| 2011/0262550 A1* | 10/2011 | Klofta ................. A61K 31/192 424/523 |
| 2012/0004347 A1 | 1/2012 | Ratnayake et al. |
| 2012/0097706 A1 | 4/2012 | Nimmo et al. |
| 2013/0072607 A1 | 3/2013 | Schwartz |
| 2013/0345647 A1 | 12/2013 | Har-Shai |
| 2014/0031468 A1 | 1/2014 | Schwartz |
| 2015/0307258 A1 | 10/2015 | Har-Shai et al. |
| 2016/0340107 A1 | 11/2016 | Har-Shai |
| 2017/0260369 A1 | 9/2017 | Schwartz |
| 2019/0210791 A1 | 7/2019 | Har-Shai et al. |

FOREIGN PATENT DOCUMENTS

| | | |
|---|---|---|
| CN | 102504361 | 6/2012 |
| DE | 9203141 | 7/1993 |
| DE | 4333627 | 4/1995 |
| DE | 4413770 | 10/1995 |
| DE | 19731362 | 1/1999 |
| DE | 102004028734 | 12/2005 |
| DE | 102010018890 | 11/2011 |
| EP | 0248755 | 12/1987 |
| EP | 0300886 | 1/1989 |
| EP | 0324289 | 7/1989 |
| EP | 0178573 | 2/1992 |
| EP | 1026102 | 8/2000 |
| EP | 1851135 | 7/2008 |
| EP | 1984279 | 11/2009 |
| EP | 2188191 | 6/2011 |
| EP | 2129598 | 4/2012 |
| EP | 2188962 | 10/2012 |
| EP | 2509267 | 10/2012 |
| EP | 2597834 | 5/2013 |
| FR | 2242158 | 3/1975 |
| FR | 2608137 | 6/1988 |
| FR | 2707264 | 1/1995 |
| GB | 1463336 | 2/1977 |
| GB | 2209056 | 4/1989 |
| GB | 2262312 | 6/1993 |
| GB | 2278823 | 12/1994 |
| JP | 59071340 A * | 4/1984 |
| JP | 3-22558 | 8/1991 |
| JP | 2004-137431 | 5/2004 |
| WO | WO 88/00563 | 1/1988 |
| WO | WO 95/09784 | 4/1995 |
| WO | WO 01/15583 | 3/2001 |
| WO | WO 03/022711 | 3/2003 |
| WO | WO 2004/080841 | 9/2004 |
| WO | WO 2005/113660 | 12/2005 |
| WO | WO 2007/093889 | 8/2007 |
| WO | WO 2010/069341 | 6/2010 |
| WO | WO 2010/085979 | 8/2010 |
| WO | WO 2010/145677 | 12/2010 |
| WO | WO 2011/139545 | 11/2011 |
| WO | WO 2012/117401 | 9/2012 |
| WO | WO 2013/008241 | 1/2013 |
| WO | WO 2014/111939 | 7/2014 |
| WO | WO 2014/111940 | 7/2014 |

OTHER PUBLICATIONS

Priolo et al., "Super Oxygen Barrier of Polymer-Clay Nano Brick Wall Thin Films," SAMPE—2010: New Materials and Processes for a New Economy, SAMPE, Seattle, WA. (Year: 2010).*

Engel et al., "Rubber, 9. Chemicals and Additives, 3.2.1. Staining Antidegradants that Act as Anti-Flex-Cracking Agents and Antiozonants," Ullmann's Enc. of Industrial Chem., Wiley-VCH Verlag GmbH, pp. 22-23. (Year: 2011).*

(56) References Cited

OTHER PUBLICATIONS

Communication Pursuant to Article 94(3) EPC dated Jan. 7, 2015 From the European Patent Office Re. Application No. 12714383.2.
Communication Pursuant to Article 94(3) EPC dated Sep. 24, 2015 From the European Patent Office Re. Application No. 12714383.2.
Communication Relating to the Results of the Partial International Search dated Jun. 4, 2014 From the International Searching Authority Re. Application No. PCT/IL2014/050059.
International Preliminary Report on Patentability dated Sep. 12, 2013 From the International Bureau of WIPO Re. Application No. PCT/IL2012/050063.
International Preliminary Report on Patentability dated Jul. 30, 2015 From the International Bureau of WIPO Re. Application No. PCT/IL2014/050059.
International Preliminary Report on Patentability dated Jul. 30, 2015 From the International Bureau of WIPO Re. Application No. PCT/IL2014/050060.
International Search Report and the Written Opinion dated Dec. 20, 2012 From the International Searching Authority Re. Application No. PCT/IL2012/050360.
International Search Report and the Written Opinion dated Jun. 23, 2014 From the International Searching Authority Re. Application No. PCT/IL2014/050060.
International Search Report and the Written Opinion dated Jul. 30, 2012 From the International Searching Authority Re. Application No. PCT/IL2012/050063.
International Search Report and the Written Opinion dated Sep. 30, 2014 From the International Searching Authority Re. Application No. PCT/IL2014/050059.
Ansarifar et al. "Optimising the Chemical Bonding Between Silanised Silica Nanofiller and Natural Rubber and Assessing Its Effects on the Properties of the Rubber", International Journal of Adhesion and Adhesives, 26(6): 454-463, Sep. 2006. Abstract.
Bai et al. "Reinforcement of Hydrogenated Carboxylated Nitrile-Butadiene Rubber With Exfoliated Graphene Oxide", Carbon, 49: 1608-1613, 2011.
Bhattacharya et al. "Tailoring Properties of Styrene Butadiene Rubber Nanocomposite by Various Nanofillers and Their Dispersion", Polymer Engineering and Science, 49(1): 81-98, Jan. 2009.
Das et al. "Nanocomposite Based on Chloroprene Rubber: Effect of Chemical Nature and Organic Modification of Nanoclay on the Vulcanizate Properties", European Polymer Journal, XP025628032, 44(11): 3456-3465, Nov. 1, 2008.
Das et al. "Reinforcement and Migration of Nanoclay in Polychloroprene/Ethylene-Propylene-Diene-Monomer Rubber Blends", Composites Science and Technology, 71: 276-281, 2011.
Huang et al. CN 101735493, Database WPI [Online], Thomson Scientific, XP002725326, Week 201050, Database Accession No. 2010-J38836, 2010. Abstract.
Kim et al. "Fabrication of Aligned Carbon Nanotube-Filled Rubber Composite", Scripta Materialia, XP002678869, 54: 31-35, 2006.
Kim et al. "SBR/Organoclay Nanocomposites for the Application on Tire Tread Compounds" Macromolcular Research. 17(10): 776-784, 2009.

Koo "Closite Additives," Polymer Nanocomposites: Processing, Characterization, and Applications, Chapter 2: pp. 16-19. McGraw-Hill: New York, New York (2006).
Lv et al. CN 102504361, Database WPI [Online], Thomson Scientific, XP002725327, Week 201253, Database Accession No. 2012-J53639, 2012. Abstract.
Schwartz "Nanocomposites for Advanced Elastomers", The 4th International Conference on Nanotechnology for the Plastics & Rubber Industries, Ramat Gan, Israel, Feb. 2, 2009, 37 P., Feb. 2009.
Struktol "Struktol® TS 30, Struktol® TS 30-DL, Struktol® TS 35, Struktol® TS 35-DL. Tackifiers and Softeners", Technical Data Sheet, Schill + Seilacher Struktol Company of America, 1 P., 2004.
Zhang CN101058650, Database WPI [Online], Thomson Scientific, XP002725328, Week 200822, Database Accession No. 2008-D03393, 2008. Abstract.
Communication Pursuant to Article 94(3) EPC dated Jul. 19, 2016 From the European Patent Office Re. Application No. 14705582.6.
Communication Pursuant to Article 94(3) EPC dated Jul. 19, 2016 From the European Patent Office Re. Application No. 12714383.2.
Communication Pursuant to Article 94(3) EPC dated Sep. 27, 2016 From the European Patent Office Re. Application No. 14708959.3.
Baharvand et al. "SBR Composites Reinforced with N-Isopropyi-N'-Phenyl-P-Phenylenediamine-Modified Clay",Chinese Journal of Polymer Science, 29(2): 191-196, Published Online Oct. 18, 2010.
Communication Pursuant to Article 94(3) EPC dated Mar. 16, 2017 From the European Patent Office Re. Application No. 12714383.2. (8 Pages).
Communication Pursuant to Article 94(3) EPC dated Mar. 16, 2017 From the European Patent Office Re. Application No. 14705582.6. (9 Pages).
Office Action dated Mar. 15, 2017 From the Israel Patent Office Re. Application No. 220867 and Its Translation Into English. (6 Pages).
Official Action dated Jun. 1, 2017 From the US Patent and Trademark Office Re. U.S. Appl. No. 14/650,890. (19 pages).
Communication Pursuant to Article 94(3) EPC dated May 23, 2019 From the European Patent Office Re. Application No. 12714383.2. (7 Pages).
Communication Pursuant to Article 94(3) EPC dated Nov. 30, 2018 From the European Patent Office Re. Application No. 14708959.3. (3 Pages).
Search Report dated Aug. 2, 2019 From the National Institute of Industrial Property of Brazil Re. Application No. BR112013022375-8 and its English Summary. (5 Pages).
Technical Examination Report dated May 11, 2020 From the Servico Publico Federal, Ministerio da Economia, Instituto Nacional da Propriedade Industrial do Brasil Re. Application No. BR112013022375-8 and Its Summary in English. (8 Pages).
Communication Pursuant to Article 94(3) EPC dated Sep. 23, 2020 From the European Patent Office Re. Application No. 14708959.3. (5 Pages).
Notice of Allowance dated Oct. 15, 2020 from U.S. Appl. No. 16/297,664. (16 pages).

* cited by examiner

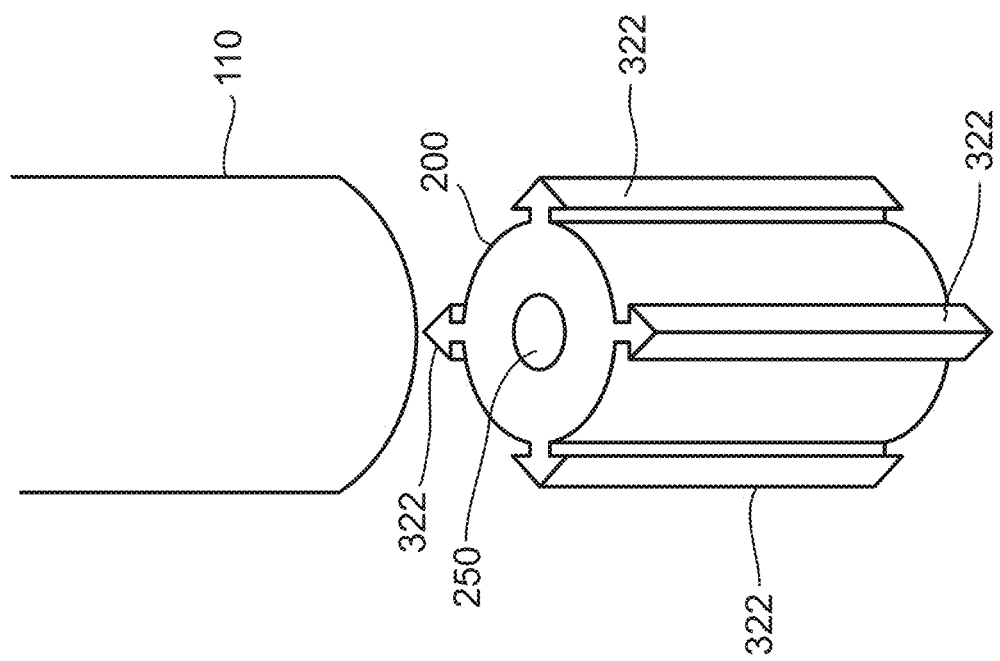

ELASTOMERIC COMPOSITES EXHIBITING HIGH AND LONG-LASTING MECHANICAL STRENGTH AND ELASTICITY AND DEVICES CONTAINING SAME

RELATED APPLICATIONS

This application is a National Phase of PCT Patent Application No. PCT/IL2014/050060 having International Filing Date of Jan. 16, 2014, which claims the benefit of priority under 35 USC § 119(e) of U.S. Provisional Patent Application Nos. 61/753,428 filed on Jan. 16, 2013 and 61/753,433 filed on Jan. 17, 2013. The contents of the above applications are all incorporated by reference as if fully set forth herein in their entirety.

FIELD AND BACKGROUND OF THE INVENTION

The present invention, in some embodiments thereof, relates to material science and, more particularly, but not exclusively, to novel elastomeric composites which exhibit high elastic modulus, high elasticity and low stress relaxation, and to articles or devices containing same.

An elastomer is a viscoelastic polymer, which generally exhibits low Young's modulus (Tensile Modulus) and high yield strain compared with other materials. Elastomers are typically amorphous polymers existing above their glass transition temperature, so that considerable segmental motion is possible. At ambient temperatures, rubbers are thus relatively soft (E of about 3 MPa) and deformable.

Elastomers are usually thermosetting polymers (or co-polymers), which require curing (vulcanization) for cross-linking the polymer chains. The elasticity is derived from the ability of the long chains to reconfigure themselves to distribute an applied stress. The covalent cross-linking ensures that the elastomer will return to its original configuration when the stress is removed. Elastomers can typically reversibly extend from 5% to 700%.

Synthetic elastomer is typically made by the polymerization of a variety of petroleum-based precursors called monomers. The most prevalent synthetic elastomers are styrene-butadiene rubbers (SBR) derived from the copolymerization of styrene and 1,3-butadiene. Other synthetic elastomers are prepared from isoprene (2-methyl-1,3-butadiene), chloroprene (2-chloro-1,3-butadiene), and isobutylene (methylpropene) with a small percentage of isoprene for cross-linking. These and other monomers can be mixed in various proportions to be copolymerized to produce products with a range of physical, mechanical, and chemical properties.

Natural rubber is known to be consisted mainly from isoprene monomers, and is typically characterized by high resilience (which reflects high elasticity), large stretch ratio, yet lower mechanical strength. By "natural rubber" reference is typically made to natural elastomers that form the rubber upon vulcanization. Such elastomers, in addition to being cost-effective and avoiding the need to synthesize elastomers, are further advantageous due to their properties (e.g., low viscosity and easy mixing) which facilitate their processing into rubbers.

Rubbery materials often further include, in addition to a rubbery polymer or copolymer (elastomer), ingredients which may impart to the rubber certain desirable properties. The most commonly utilized ingredients are those that cause crosslinking reactions when the polymeric mix is cured (or vulcanized), and are usually consisting of sulfur and one or more "accelerators" (e.g., sulfenamides, thiurams or thiazoles), which make the sulfur cross-linking faster and more efficient.

Two other ingredients that play an important role in vulcanization chemistry are known as "activators" and commonly include zinc oxide and stearic acid. These compounds react with one another and with accelerators to form zinc-containing intermediate compounds, which play a role in the formation of sulfur crosslinks.

Many other materials have been added to rubbery materials, mostly with the aim of hardening it or reducing its production cost. The most commonly practiced materials, which are referred to herein and in the art as "fillers" or "reinforcing agents", include finely divided carbon black and/or finely divided silica.

Both carbon black (CB) and silica, when added to the polymeric mixture during rubber production, typically at a concentration of about 30-50 percents by volume, raise the elastic modulus of the rubber by a factor of two to three, and also confer remarkable toughness, especially resistance to abrasion, on otherwise weak materials such as natural rubber. If greater amounts of carbon black or silica particles are added, the modulus is further increased, but the strength may be lowered.

However, reinforcement of rubbers with carbon black or silica may disadvantageously result in rubbers characterized by lower elongation, lower springiness (resilience) and decreased stiffness after flexing. Elastomeric composites containing carbon black and/or silica are thus relatively brittle at low temperatures. Furthermore, the preparation of elastomeric composites containing CB and/or silica is difficult.

Studies have shown that for a filler to be reinforcing, the filler particles must have small diameter, at the nanometer range, for instance 10-50 nm, and must be well-adhered by the elastomer.

To this effect, studies have focused in recent years on the developments of hybrid nanocomposites as an alternative to heavily filled elastomers. Such nanofillers are typically made of nanoparticles, such as nanoclays, which are clays modified so as to obtain clay complexes that are compatible with organic monomers and polymers (also referred to herein and in the art as compatibilizers).

Exemplary nanofillers are described in Das et al., European Polymer Journal 44 (2008) 3456-3465, available at www(dot)elsevier(dot)com/locate/europolj; Das et al. Composites Science and Technology, Issue 71 (2011), Pages 276-281, available atwww(dot)elsevier(dot)com/locate/compscitech; Yoong Ahm Kim wt al. Scripta Materialia, Issue 54 (2006), Pages 31-35, available atwww(dot)sciencedirect(dot)com; and Xin Bai, et al. Carbon, Volume 49, Issue 5, April 2011, Pages 1608-1613, available atwww(dot)elsevier(dot)com/locate/carbon.

Nanoclays are easily compounded and thus present an attractive alternative to traditional compatibilizers. Nanoclays have been known to stabilize different crystalline phases of polymers, and to possess the ability of improving mechanical and thermal properties. For improved performance and compatibility, nanoclays are typically modified so as to be associated with organic moieties, and the modified nanoclays are often referred to as organomodified nanoclays. Organomodified nanoclays are typically prepared by treatment with organic salts. Negatively charged nanoclays (e.g., montmorillonites) are typically modified with cationic surfactants such as organic ammonium salts or organic phosphonium salts, and positively charged nanoclays (e.g., LDH) are typically modified by anionic surfactants such as carboxylates, sulfonates, etc.

The effect of nanoclays modified by hydrolysed mercaptosilane, as a substitute for carbon black, on the properties of SBR compounds, was reported at the 4$^{th}$ International Conference on nanotechnology for the plastics & rubber industries, www(dot)plastic(dot)org(dot)il/nano/nano_02_09_shenkar/PresNanolFeb_09_adam(dot) ppt #2.

In short, it was reported that modified nanoclays may be produced by reacting nanoclays (NCs) such as organomodified montmorillonites (OMMT, e.g., Cloisite 30B), with mercaptosilanes. Such hybrids have been found useful in at least partially substituting for carbon black in elastomeric composites.

U.S. patent application Ser. Nos. 13/546,228 and 13/949,456 describe modified nanoclays made of a nanoclay, such as organomodified nanoclay, further modified so as to be in association with an amine-containing antioxidant and optionally also with a silyl-containing compound, such as mercaptosiloxane, processes of preparing same and elastomeric composites containing same.

Aerosol spray cans are known throughout modern society, and are used in myriad products found in food stores, pharmacies, tool shops, and more. Fire extinguishers also provide a stream of material under pressure.

Aerosol canisters typically deliver material pressurized to seven or eight bars. A few methods are popular. Single Compartment methods mix a deliverable material with a propellant (a compressed gas), and spray both through a valve. Dual Compartment methods separate the deliverable material from the propellant to avoid interaction between them, to increase shelf life of the product, and for various other reasons. Some Dual Compartment methods use a bag for deliverable material. Some separate material from propellant using a piston barrier. In both cases a compartment with a pressurized propellant is used to pressurize a compartment with a deliverable material, which can then be delivered under pressure through a valve. Practical considerations and in some jurisdictions also laws and regulations require that containers for aerosol products using a propellant (typically compressed to 7-8 bars) to be cylindrical in format, for safety reasons. Containers are also required to be metal or of thick glass or of rigid plastic, or in any case to be of sufficient strength and thickness to safely withstand this pressure. If made of metal other than aluminum (which is relatively expensive), containers are usually made out of TinPlate and coated with lacquers or other coatings to prevent them from rusting and releasing the pressure in unintended ways. As a result, aerosol containers are often relatively expensive to make, to transport, and to handle in bulk, are constrained to be in a standard shape, and are difficult to dispose of in an ecologically desirable manner.

For low pressure dispensing applications, the state of the art is generally that users use manual pressure to pump or squeeze products from containers, for example to get food and suntan lotion out of plastic squeeze bottles, or to get toothpaste and pharmaceuticals out of collapsible tubes, or press on a mechanical pump to deliver the product. In addition to the potential inconvenience attached to the use of many such packages, they suffer from the additional potential disadvantage that air entering such packages interacts with the material therein, reducing shelf life. An additional possible disadvantage is that it is often difficult or impossible to empty them completely, leading to either a messy operation or wastage of products, frustration of users, and/or unnecessary expense.

Some background art in this field includes U.S. Pat. No. 4,121,737, International Patent Application Publication No. WO 95/09784, U.S. Pat. No. 4,222,499, DE102004028734, U.S. Pat. No. 5,127,554, International Patent Application Publication No. WO 2004/080841, U.S. Pat. No. 2,966,282, GB2209056, International Patent Application Publication No. WO 01/15583, U.S. Pat. No. 3,981,415, EP0248755, FR2608137, U.S. Patent Application Publication No. 2009-045222, U.S. Patent Application Publication No. 2006-243741, GB2278823, U.S. Pat. No. 4,077,543, FR2707264 (A1), U.S. Pat. Nos. 3,791,557, 5,111,971, 4,251,032, 5,927,551, 4,964,540, 5,060,700, 4,981,238, International Patent Application Publication No. WO 2010/145677, International Patent Application Publication No. WO 2010/085979.

WO 2012/117401 discloses devices and methods for dispensing a fluid material under pressure but without using a gas propellant. Such devices may include an elastic sleeve to impart pressure to a bag containing the fluid material within the sleeve, to thereby pressurize the contents of the bag and dispense it through a valve.

SUMMARY OF THE INVENTION

The present inventors have sought for rubbery materials made from the cost-effective, highly elastic natural rubber, which would exhibit improved, long-lasting mechanical strength, while not compromising elasticity and resilience. To this end, the present inventors have devised and synthetically prepared and practiced elastomeric composites, which are based on natural rubber, yet exhibit the desired mechanical performance indicated hereinabove.

The designed elastomeric composites are characterized by improved elastic modulus, high elasticity (e.g., high % elongation) and reduced relaxation (stress relaxation), and are capable, for example, of being used for forming articles that maintain high compressive pressure also when elongated for prolonged time periods.

According to an aspect of some embodiments of the present invention there is provided an elastomeric composite comprising an elastomer that comprises natural rubber, a nanofiller and a filler, the filler being in an amount lower than 50 parts per hundred rubber (phr).

According to an aspect of some embodiments of the present invention there is provided an elastomeric composite comprising an elastomer than comprises natural rubber, a filler and a nanofiller, wherein an amount of the filler is at most 40 phr and an amount of the nanofiller ranges from 10 phr to 30 phr.

According to some of any one of the embodiments described herein, an amount of the filler is 40 phr and an amount of the nanofiller ranges from 10 phr to 15 phr.

According to some of any one of the embodiments described herein, an amount of the nanofiller is 13.33 phr.

According to some of any one of the embodiments described herein, an amount of the filler is 20 phr and an amount of the nanofiller ranges from 15 phr to 25 phr.

According to some of any one of the embodiments described herein, an amount of the nanofiller is 10 phr.

According to some of any one of the embodiments described herein, an amount of the filler is 30 phr and an amount of the nanofiller ranges from 15 phr to 20 phr.

According to some of any one of the embodiments described herein, an amount of the nanofiller is 17 phr.

According to some of any one of the embodiments described herein, the filler is carbon black.

According to some of any one of the embodiments described herein, the nanofiller comprises modified nanoclays.

According to some of any one of the embodiments described herein, the modified nanoclays comprise nanoclays being in association with an amine-containing compound that exhibits an antioxidation activity.

According to some of any one of the embodiments described herein, the nanoclay is montmorillonite.

According to some of any one of the embodiments described herein, the nanoclay is an organomodified nanoclay, in which the nanoclay is in association with a surface modifying agent.

According to some of any one of the embodiments described herein, the surface modifying agent is a cationic surfactant.

According to some of any one of the embodiments described herein, the amine-containing compound featuring an anti-oxidation activity is selected from the group consisting of a para-phenylenediamine (p-PDA), a substituted ethylene diurea (EDU) and a substituted amine having at least one hydrocarbyl chain of at least 4 carbon atoms.

According to some of any one of the embodiments described herein, the para-phenylene diamine compound is selected from the group consisting of a N,N-dialkyl-p-PDA and a N-alkyl-N-aryl-p-PDA.

According to some of any one of the embodiments described herein, the modified nanoclays further comprising a silyl-containing compound.

According to some of any one of the embodiments described herein, the silyl-containing compound is a mercaptosilyl compound.

According to some of any one of the embodiments described herein, the silyl-containing compound is a siloxane.

According to some of any one of the embodiments described herein, the silyl-containing compound is a mercaptosiloxane.

According to some of any one of the embodiments described herein, the composite is further comprising a vulcanizing agent, a vulcanization activator and an accelerator.

According to some of any one of the embodiments described herein, the vulcanizing agent is sulfur.

According to some of any one of the embodiments described herein, an amount of the sulfur ranges from 1.50 to 2.50 phr.

According to some of any one of the embodiments described herein, an amount of the sulfur is 1.80 phr.

According to some of any one of the embodiments described herein, the vulcanization activator comprises zinc oxide and/or stearic acid.

According to some of any one of the embodiments described herein, an amount of the zinc oxide is 5.0 phr.

According to some of any one of the embodiments described herein, an amount of the stearic acid is 2.0 phr.

According to some of any one of the embodiments described herein, the accelerator comprises a benzothiazole.

According to some of any one of the embodiments described herein, an amount of the benzothiazole accelerator ranges from 1.5 to 2.0 phr.

According to some of any one of the embodiments described herein, the accelerator comprises a guanidine accelerator.

According to some of any one of the embodiments described herein, an amount of the guanidine accelerator ranges from 0.4 to 1.5 phr or from 0.4 to 0.6 phr.

According to some of any one of the embodiments described herein, the elastomeric composite is further comprising a plasticizer.

According to some of any one of the embodiments described herein, an amount of the plasticizer ranges from 1.0 phr to 2.0 phr, or is 1.5 phr.

According to some of any one of the embodiments described herein, the elastomeric composite is further comprising a retarder.

According to some of any one of the embodiments described herein, the retarder comprises PVI.

According to some of any one of the embodiments described herein, an amount of the plasticizer ranges from 0.1 to 1.0 phr, or is 0.2 phr.

According to some of any one of the embodiments described herein, the composite is further comprising a processing aid.

According to some of any one of the embodiments described herein, the processing aid comprises Struktol WB16, Struktol ZEH, an equivalent thereof and any combination thereof.

According to some of any one of the embodiments described herein, an amount of the processing aid ranges from 2.0 phr to 5.0 phr.

According to some of any one of the embodiments described herein, an amount of the Struktol WB16 is 3.0 phr.

According to some of any one of the embodiments described herein, an amount of the Struktol ZEH ranges from 1.0 phr to 2.0 phr.

According to some of any one of the embodiments described herein, the composite is further comprising a silyl-containing compound.

According to some of any one of the embodiments described herein, the silyl-containing compound is a mercaptosiloxane.

According to some of any one of the embodiments described herein, an amount of the silyl-containing compound ranges from 1.0 phr to 5.0 phr, or from 2.0 phr to 3.0 phr.

According to some of any one of the embodiments described herein, the elastomeric composite is exhibiting at least one of:
an elongation of at least 200%;
an elastic modulus, at 200% elongation, higher than 10 MPa;
relaxation lower than 10% change in M200 per year; and
creep rate lower than 300 mm per 3 years.

According to some of any one of the embodiments described herein, the elastomeric composite is exhibiting at least one of:
Yerzley elasticity higher than 65%, or higher than 70%;
a toughness of at least 4 Joules; and
a tear resistance of at least 50 N/mm.

According to an aspect of some embodiments of the present invention there is provided an elastomeric composite comprising an elastomer that comprises natural rubber, a nanofiller and a filler, the filler being in an amount lower than 50 parts per hundred rubber (phr), the elastomeric composite exhibiting:
an elongation of at least 200%;
an elastic modulus, at 200% elongation, higher than 10 MPa; and
relaxation lower than 10% change in M200 per year.

According to some of any one of the embodiments described herein, the composite is further exhibiting at least one of:

Creep rate lower than 300 mm per 3 years;
Yerzley elasticity higher than 65%, or higher than 70%;
a toughness of at least 5 Joules; and
a tear resistance of at least 50 N/mm.

According to some of any one of the embodiments described herein, the filler is carbon black.

According to some of any one of the embodiments described herein, an amount of the carbon black is 40 phr or lower.

According to some of any one of the embodiments described herein, an amount of the nanofiller is in a range of from 10 phr to 30 phr.

According to some of any one of the embodiments described herein, an amount of the filler and an amount of the nanofiller is as described in any one of claims 2-7.

According to some of any one of the embodiments described herein, the nanofiller is as described hereinbelow.

According to some of any one of the embodiments described herein, further comprising a vulcanization agent, a vulcanization activator and a vulcanization accelerator, as described hereinbelow.

According to some of any one of the embodiments described herein, the composite is further comprising a plasticizer, a retarder, a processing aid and/or a silyl-containing compound, as described hereinbelow.

According to some of any one of the embodiments described herein, the elastomer comprises at least 50 phr natural rubber.

According to some of any one of the embodiments described herein, the natural rubber comprises at least 80 phr natural rubber.

According to some of any one of the embodiments described herein, the elastomer comprises 90 phr natural rubber and 10 phr polybutadiene.

According to some of any one of the embodiments described herein, any of the elastomeric composites is usable for manufacturing an elastic article being at most 3 mm thick and being capable of exerting a compressive pressure of at least seven atmospheres for a time period of at least one year.

According to an aspect of some embodiments of the present invention there is provided an elastic article comprising the elastomeric composite as described in any of the embodiments herein.

According to an aspect of some embodiments of the present invention there is provided a device for dispensing a material under pressure, comprising
  a) a chamber having at least one wall formed at least in part by an elastic material and containing material for dispensing therein;
  b) an outlet positioned to release material from within the chamber, wherein the chamber and the elastic material are configured so that elastic contraction forces in the elastic material exert compressive pressure on the material, urging the material out of the outlet, the elastic material comprising the elastomeric composite as described herein which comprises a natural rubber According to an aspect of some embodiments of the present invention there is provided a device for dispensing a material under pressure, comprising
  a) a chamber having at least one wall formed at least in part by an elastic material and containing material for dispensing therein;
  b) an outlet positioned to release material from within the chamber, wherein the chamber and the elastic material are configured so that elastic contraction forces in the elastic material exert compressive pressure on the material, urging the material out of the outlet, the elastic material comprising an elastomer and a nanofiller as described hereinbelow and respective embodiments and any elastomer.

According to some of any one of the embodiments described herein, the chamber is in the form of a sleeve formed, at least in part, of the elastic material.

According to some of any one of the embodiments described herein, the device comprises a bag enclosing the material, located in the chamber and comprising a valve in the outlet resisting outflow of the material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1 and 2 are based on photographs of an exemplary embodiment for dispensing materials under pressure, according to an embodiment of the present invention;

FIG. 3 is a simplified schematic of an alternative filling scheme, according to an embodiment of the invention;

FIGS. 4 and 5 are simplified schematics showing alternative methods of construction of a sleeve, according to an embodiment of the present invention;

FIG. 6 is a simplified schematic showing details of a method for mounting a sleeve and bag so that they are anchored to each other, according to an embodiment of the present invention;

FIG. 7A is a simplified schematic of a delivery module combined with a container, according to an embodiment of the present invention;

FIGS. 7B and 7C are simplified schematics of an alternative arrangement for bag and sleeve, according to an embodiment of the present invention;

FIGS. 8A-8D are simplified schematics of sleeves which comprise multiple layers and/or multiple strips of elastic material, according to embodiments of the present invention;

FIG. 8E is a simplified schematic of a sleeve having an external shape which differs from a shape of its internal lumen, according to an embodiment of the present invention;

FIG. 8F is a simplified schematic of a transfusion module 305, according to an embodiment of the present invention;

FIGS. 9-11 are simplified schematics showing a method for expanding a sleeve by pulling its sides outward during a manufacturing process, according to an embodiment of the present invention;

FIGS. 12-15 are simplified images of an apparatus 400 for expanding a sleeve by applying pressure from within outwards, according to an embodiment of the present invention;

Figure 16:
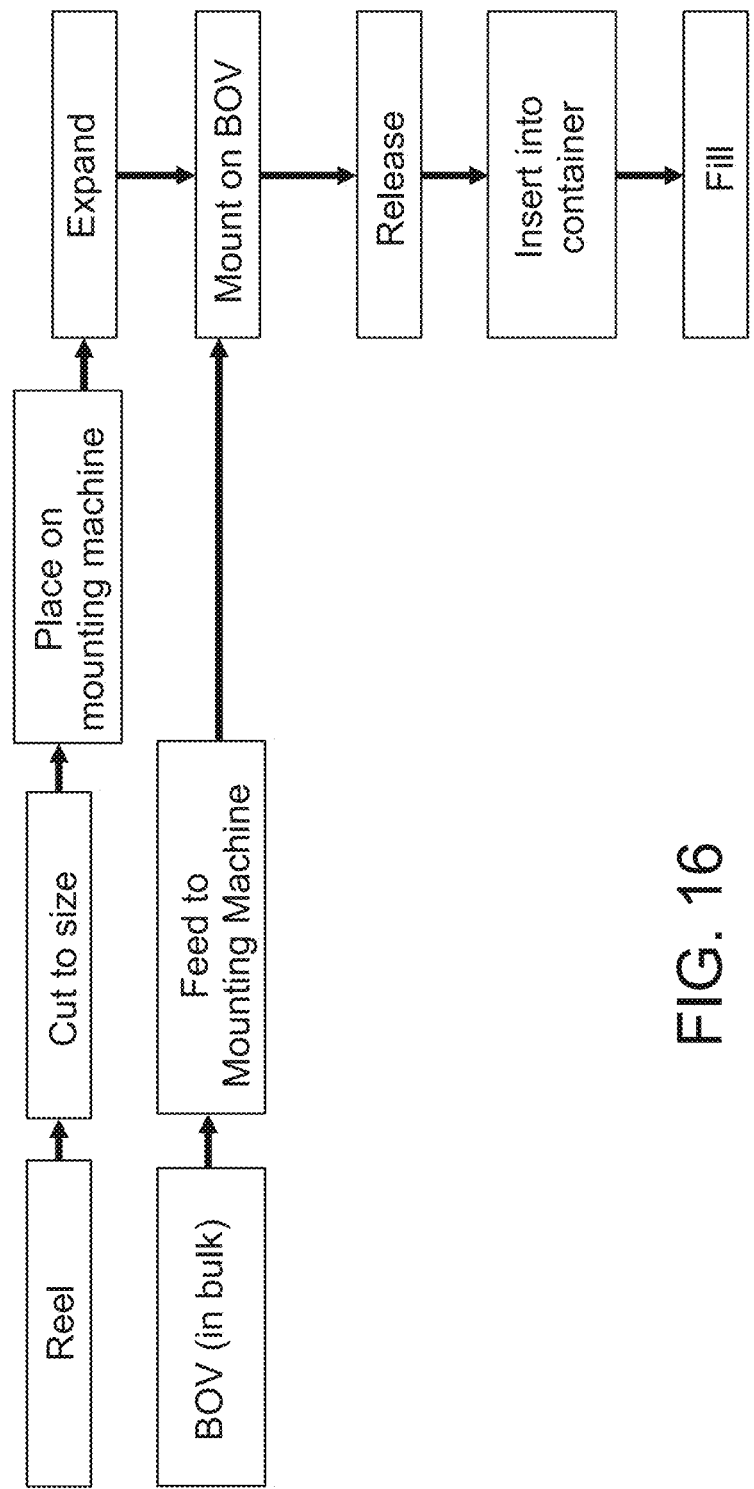
Figure 17:
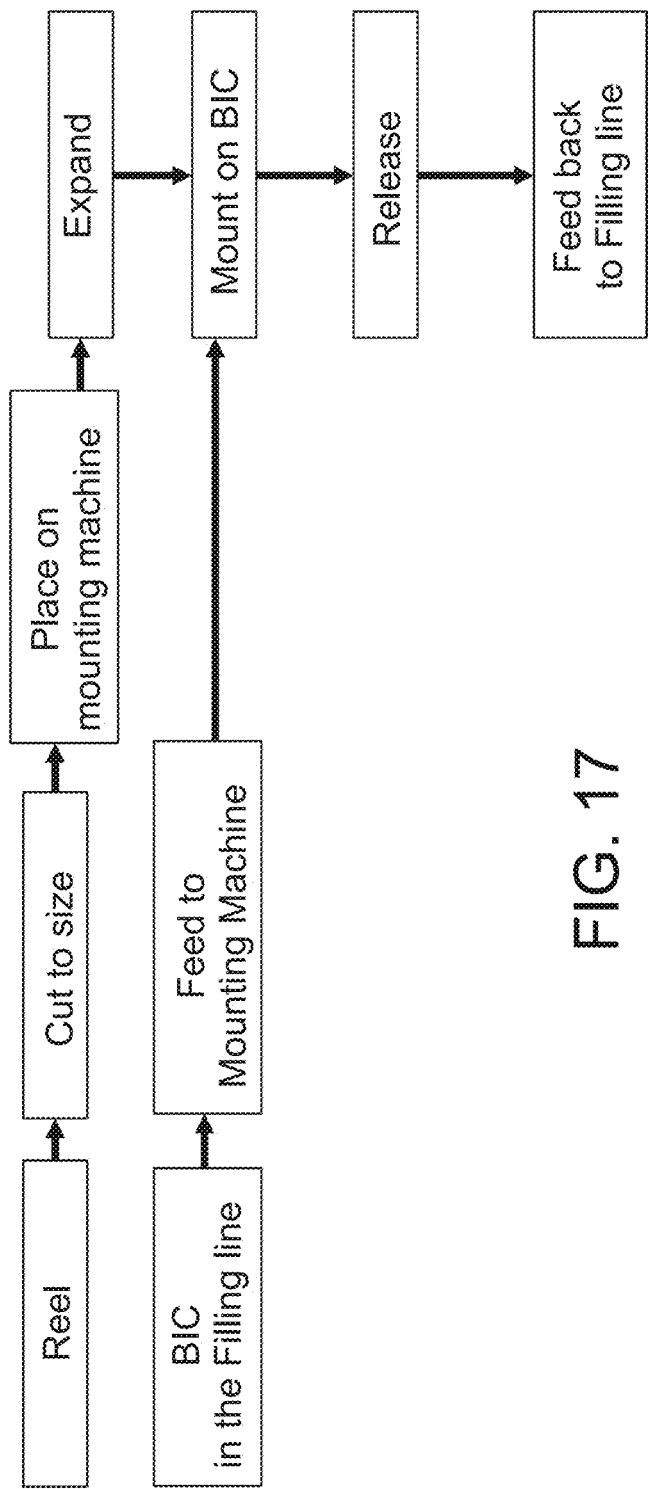

FIGS. 16 and 17 are simplified flow charts of processes for mass production of products, according to embodiments of the present invention.

Figure 18:
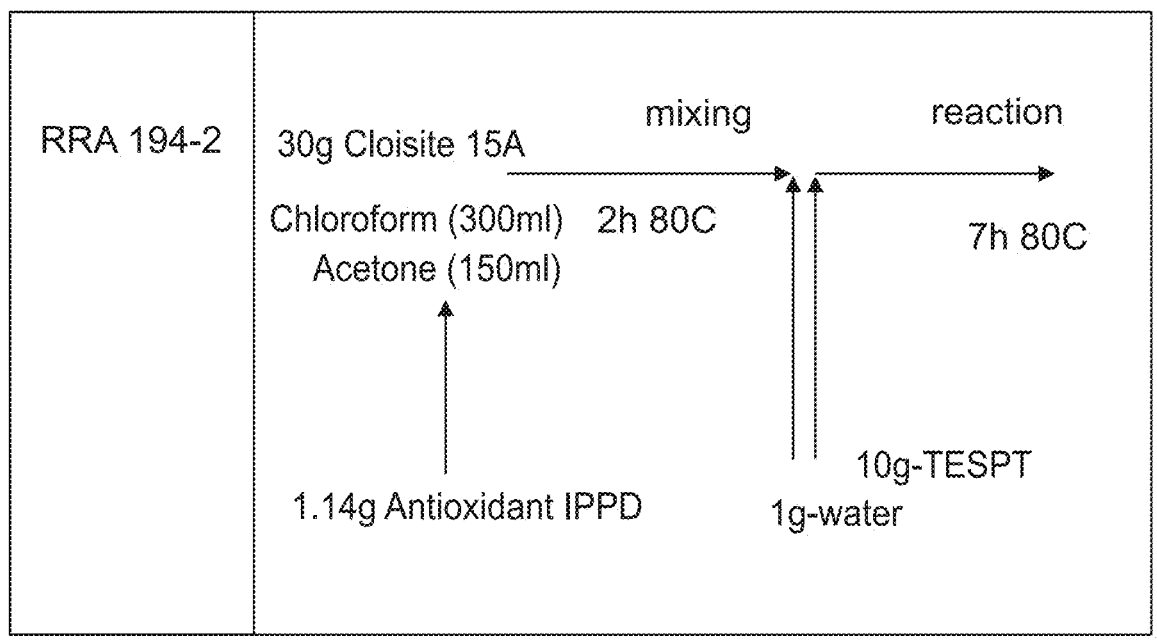
Figure 19:
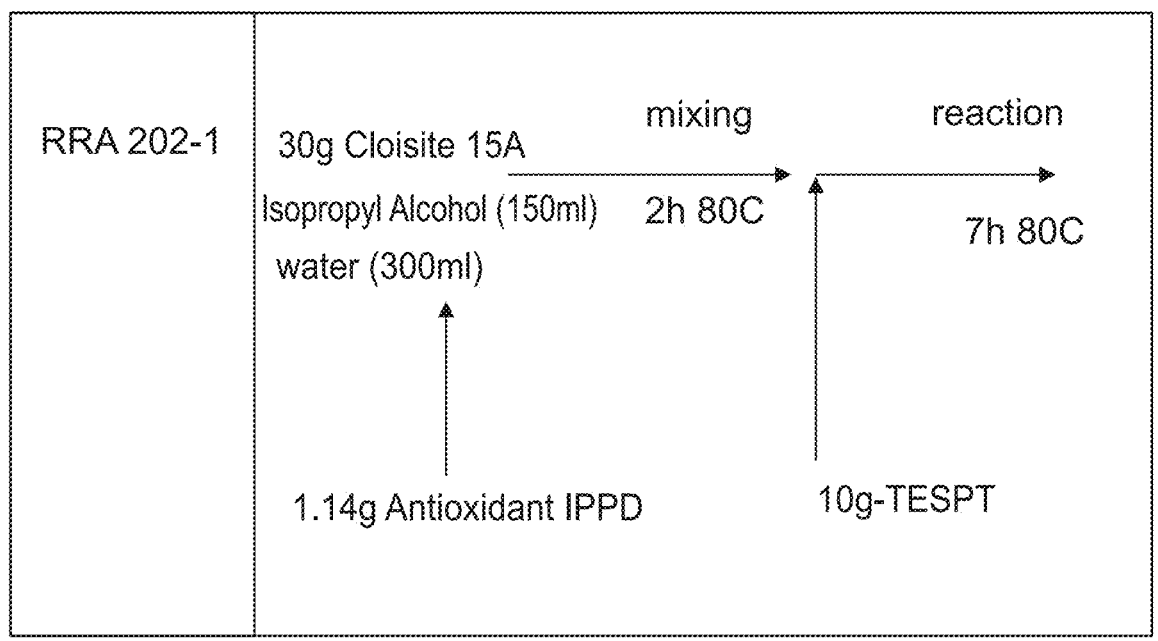
Figure 20:
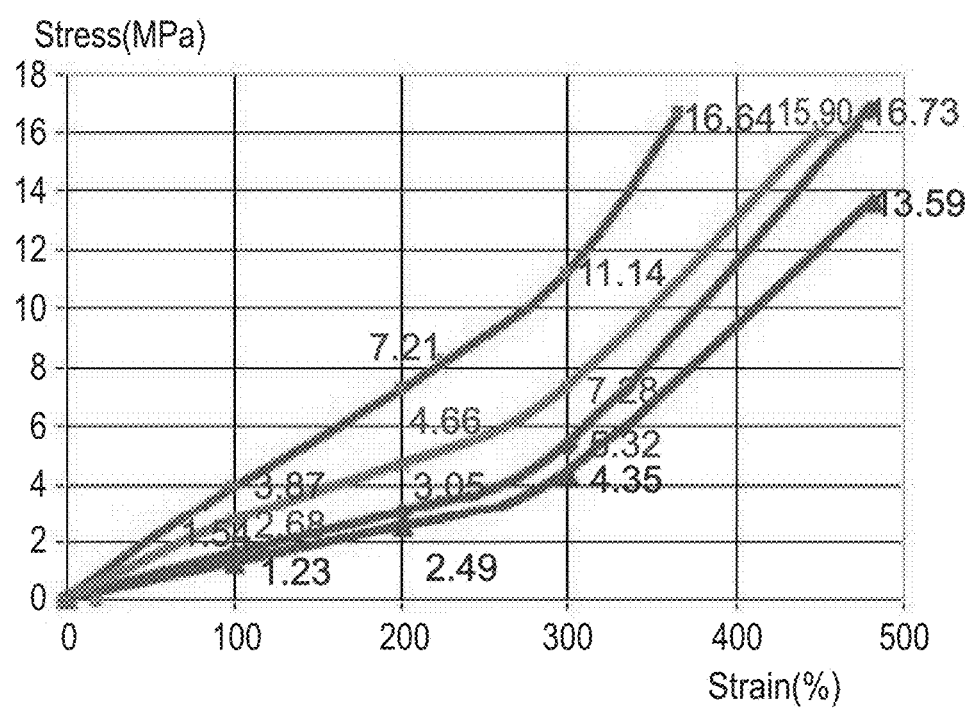
Figure 21:
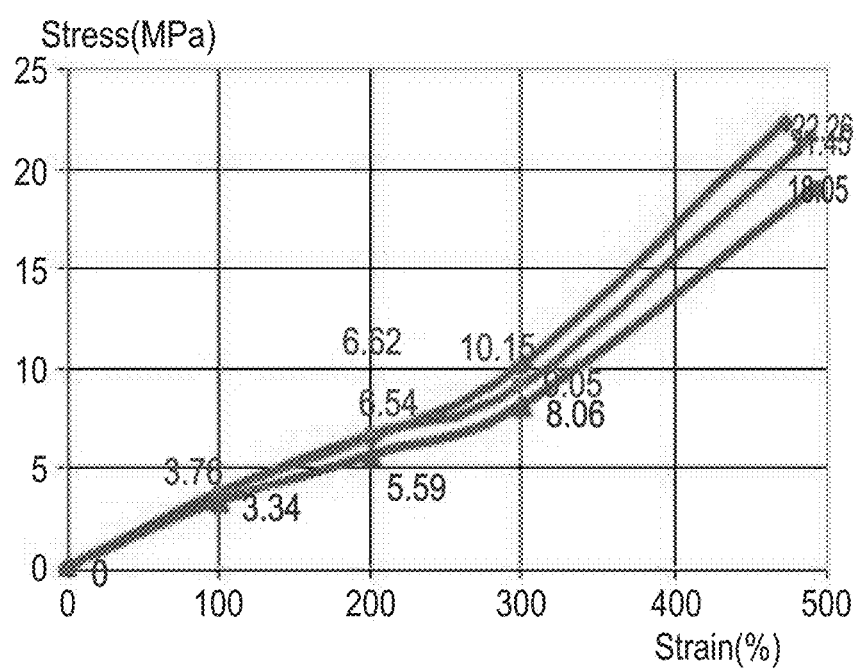
Figure 22:
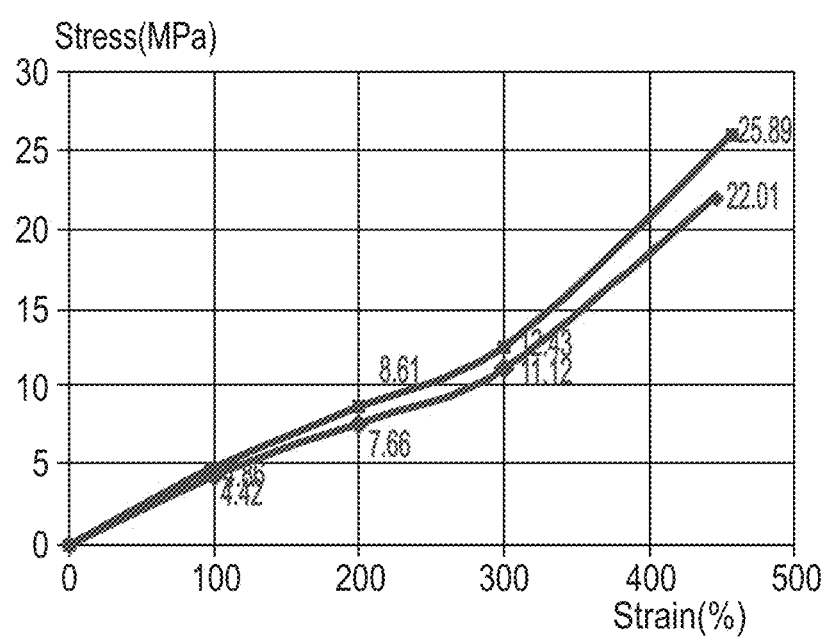
Figure 23A:
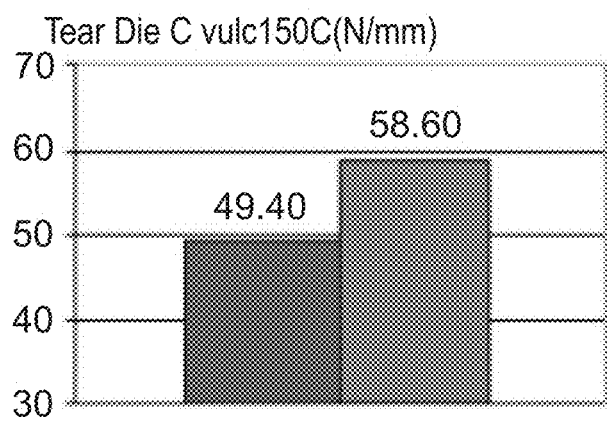
Figure 23B:
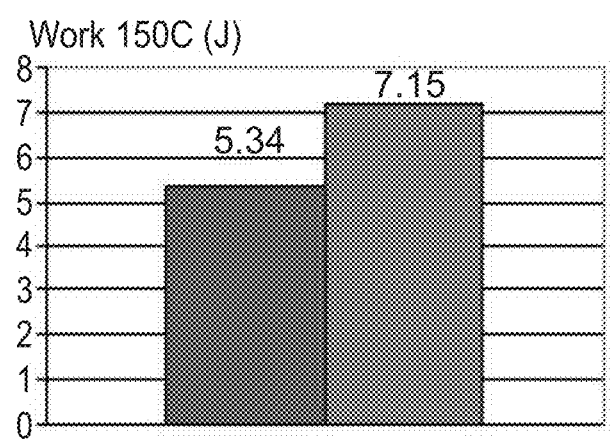
Figure 24:
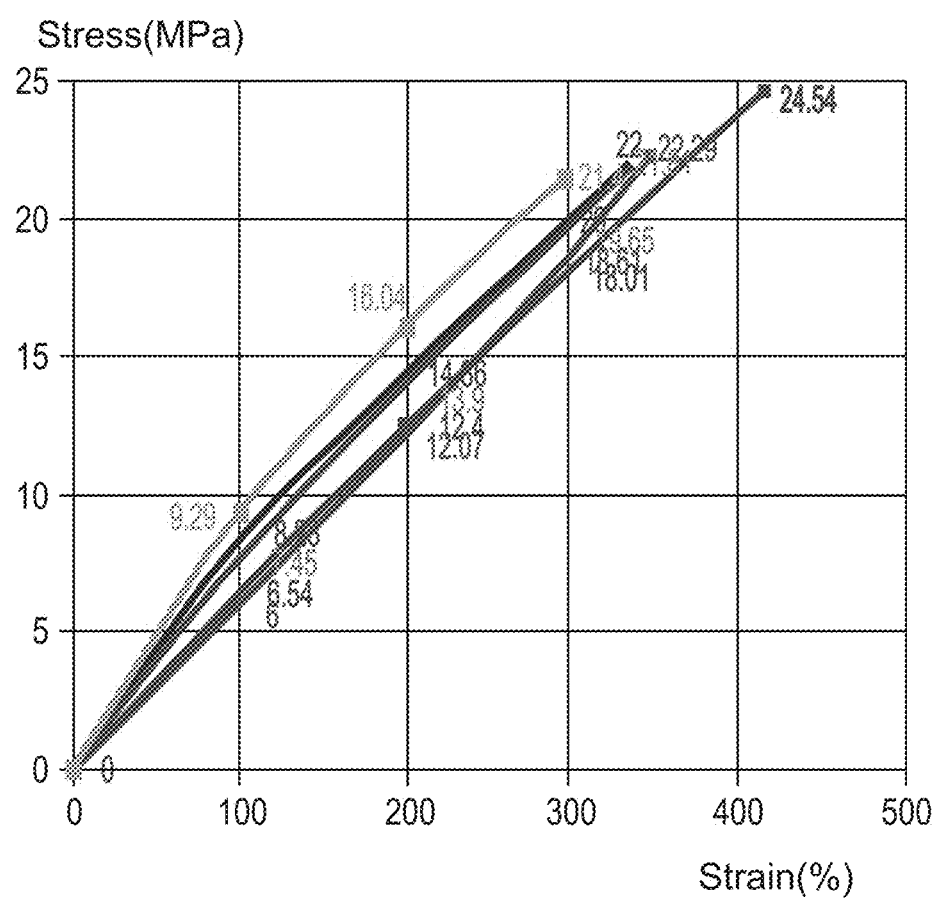
Figure 25A:
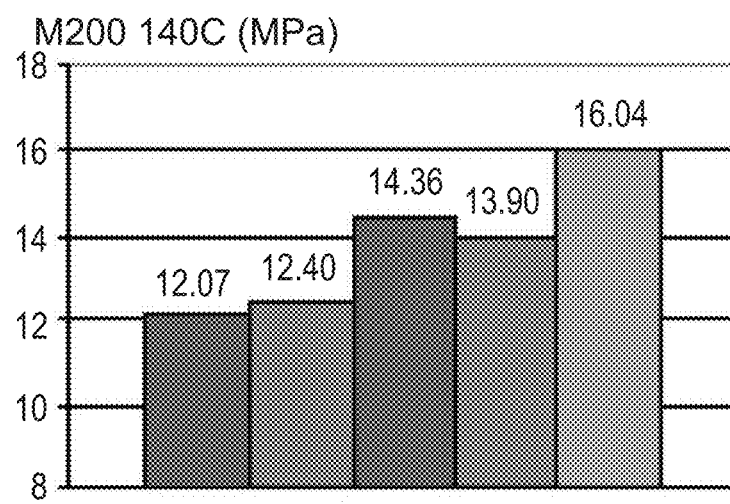
Figure 25B:
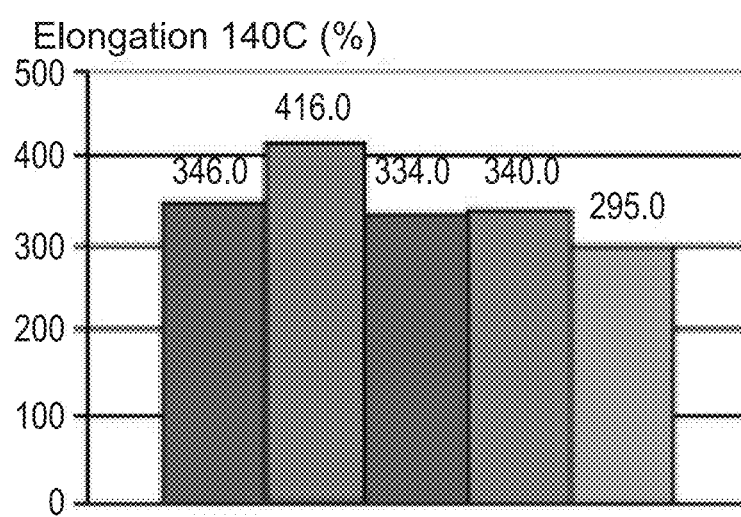
Figure 26:
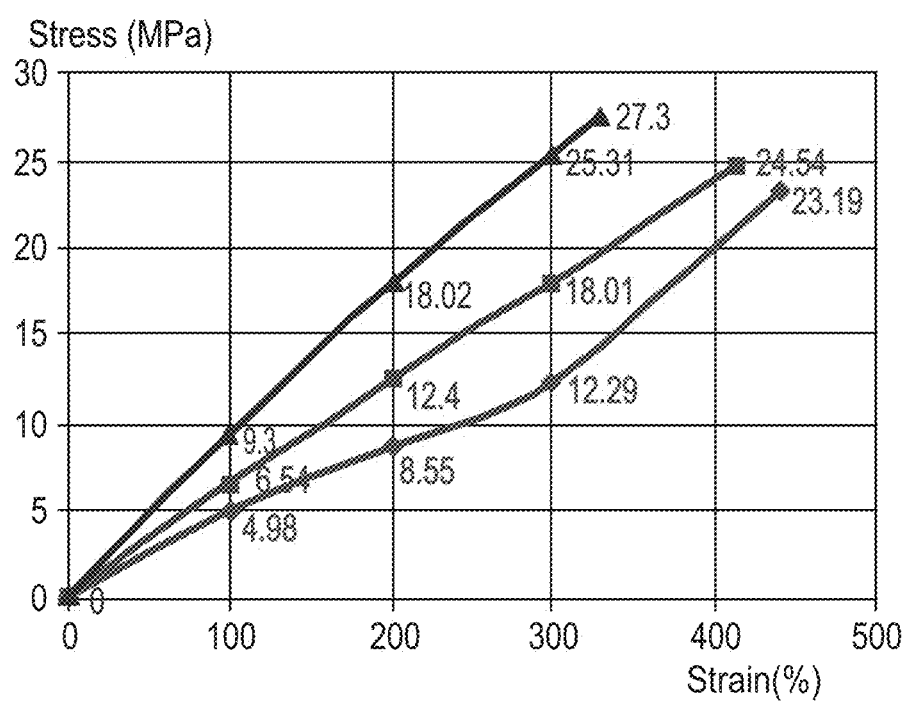
Figure 27:
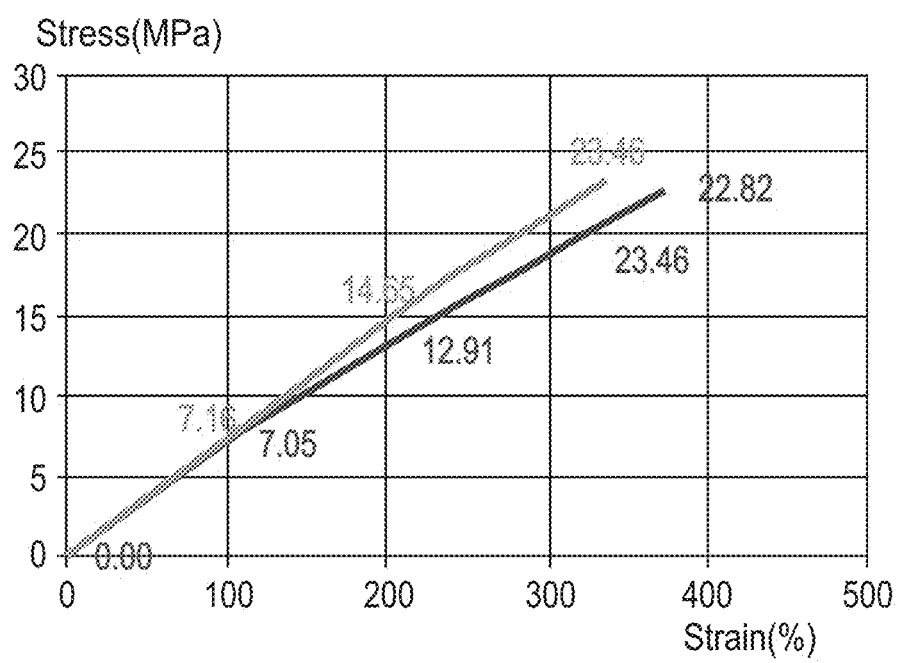
Figure 28A:
Figure 28B:
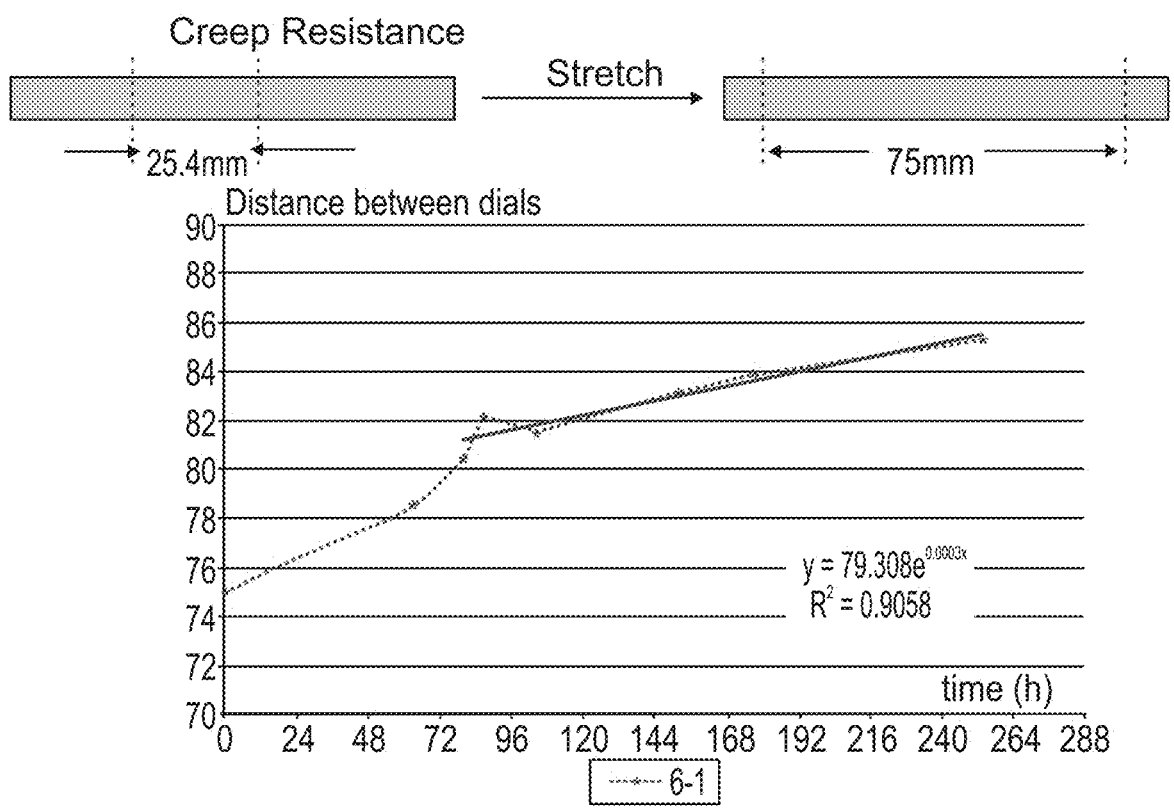

FIG. 18 presents a scheme depicting a process of preparing an exemplary modified nanoclay according to some embodiments of the present invention, referred to herein as RRA 194-2, by mixing NC Cloisite 15A and IPPD and thereafter adding Si69 (TE5PT), while using a mixture of chloroform and acetone (2:1) as the reaction solvent;

FIG. 19 presents a scheme depicting a process of preparing an exemplary modified nanoclay according to some embodiments of the present invention, referred to herein as RRA 202-1, by mixing NC Cloisite 15A and IPPD and thereafter adding Si69 (TE5PT), while using a mixture of isopropyl alcohol (IPA) and water (1:2) as the reaction solvent;

FIG. 20 presents comparative plots showing stress-versus-strain data recorded for exemplary elastomeric composites according to some embodiments of the present invention, made in a one-pot method from natural rubber and polybutadiene (90:10 phr), in the presence of, inter alia, mercaptosilyl, and in the presence of Cloisite 30B nanoclays (5.00 phr) (ED01; red), Cloisite 15B nanoclays (5.00 phr) (ED02; green), Cloisite 30B nanoclays (5.00 phr) and plasticizer DOS (13.50 phr) (ED03; blue), or Cloisite 15B nanoclays (5.00 phr) and plasticizer DOS (13.50 phr) (ED04; pink);

FIG. 21 presents comparative plots showing stress-versus-strain data recorded for exemplary elastomeric composites according to some embodiments of the present invention, made in a one-pot method from natural rubber and polybutadiene (90:10 phr), in the presence of, inter alia, mercaptosilyl, a retarder and Cloisite 15B nanoclays (5.00 phr) (ED53G; red), Cloisite 15B nanoclays (5.00 phr) plasticizer DOS (3.25 phr) (ED56G; green), or Cloisite 15B nanoclays (5.00 phr) and plasticizer DOS (6.50 phr) (ED59G; blue);

FIG. 22 presents comparative plots showing stress-versus-strain data recorded for exemplary elastomeric composites according to some embodiments of the present invention, made from natural rubber and polybutadiene (90:10 phr), in the presence of mercaptosilyl (5.00 phr) and Cloisite 15B nanoclays (10.00 phr) (ED11-RG; red), or Nanohybrids RRA 194-2 (10.00 phr) (ED34G; green);

FIGS. 23A-B are bar graphs demonstrating Tear Resistance (FIG. 23A) and Work (FIG. 23B), as measured at 150° C., for exemplary elastomeric composites according to some embodiments of the present invention, made in a one-pot method from natural rubber and polybutadiene (90:10 phr), in the presence of mercaptosilyl (5.00 phr) and Cloisite 15B nanoclays (10.00 phr) (ED11-RG; red), or Nanohybrids RRA 194-2 (10.00 phr) (ED34G; green);

FIG. 24 presents comparative plots showing stress-versus-strain data recorded for exemplary elastomeric composites according to some embodiments of the present invention, made from natural rubber and polybutadiene (90:10 phr), in the presence of, inter alia, CB (45.00 phr), Nanohybrids RRA 202-1 (15.00 phr), sulfur (1.80 phr) and a retarder PVI (0.50 phr) (ED60-252; red), of CB (40.00 phr), Nanohybrids RRA 202-1 (13.33 phr), sulfur (1.80 phr) and a retarder PVI (0.75 phr) (ED60-253; green), or of CB (40.00 phr), Nanohybrids RRA 202-1 (13.33 phr), sulfur (2.20 phr) and a retarder PVI (0.50 phr) (ED60-254; blue), or of CB (40.00 phr), Nanohybrids RRA 202-1 (13.33 phr), sulfur (1.80 phr) and a retarder PVI (0.75 phr) (ED60-255; pink), or of CB (45.00 phr), Nanohybrids RRA 202-1 (13.33 phr), sulfur (2.20 phr) and a retarder PVI (0.50 phr) (ED60-256; light green);

FIGS. 25A-B are bar graphs depicting the Elastic Modulus M200 (FIG. 25A) and Elongation (FIG. 25B) of the elastomeric composites of FIG. 24;

FIG. 26 presents comparative plots showing stress-versus-strain data recorded for exemplary elastomeric composites according to some embodiments of the present invention, made from natural rubber and polybutadiene (90:10 phr), in the presence of, inter alia, Nanohybrids RRA 194-2R (15.00 phr), sulfur (1.80 phr) and various amounts of accelerators (ED34-G; red), of CB (40.00 phr), Nanohybrids RRA 202-1 (13.33 phr), sulfur (1.80 phr), various amount of accelerators and a retarder PVI (0.75 phr) (ED60-253; green), or of CB (40.00 phr), Nanohybrids RRA 202-1 (13.33 phr), sulfur (1.80 phr) and various amounts of accelerators (ED253-OPT32; blue);

FIG. 27 presents comparative plots showing stress-versus-strain data recorded for the exemplary elastomeric composite denoted ED60-253R2, prepared by extrusion+steam vulcanization (green) and by plate molded vulcanization (light green);

FIGS. 28A-B present a photograph of an apparatus used for performing an exemplary procedure for measuring the creep rate of elastomeric composites (FIG. 28A) and the data obtained in this procedure for an exemplary elastomeric composite according to some embodiments of the present invention (FIG. 28B).

Figure 29:
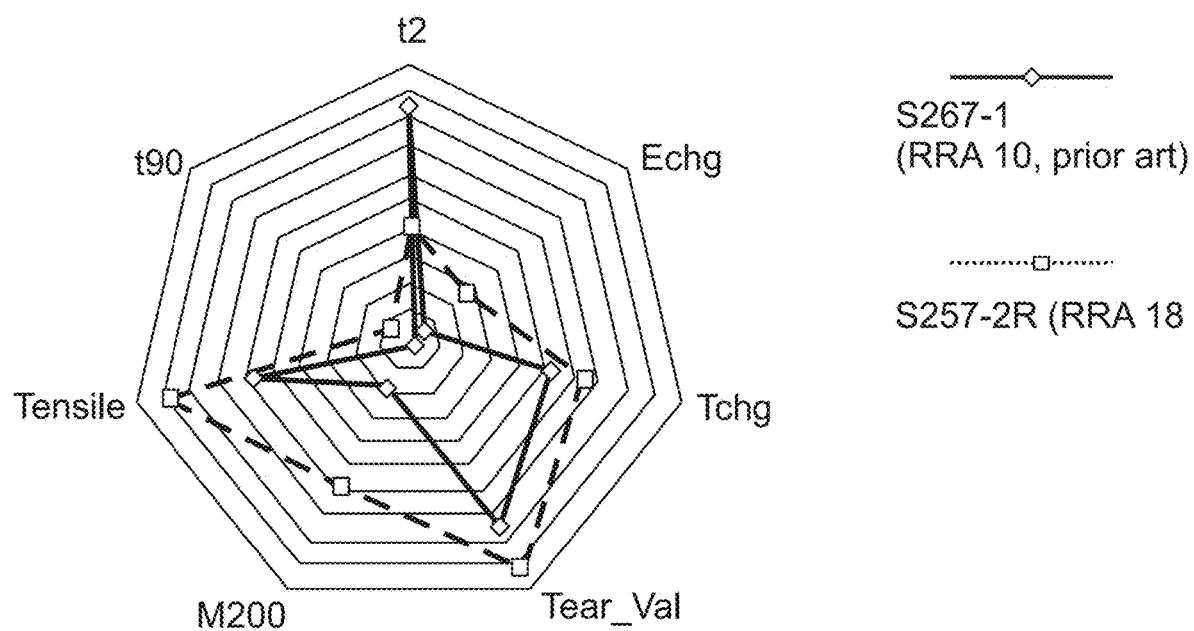
Figure 30:
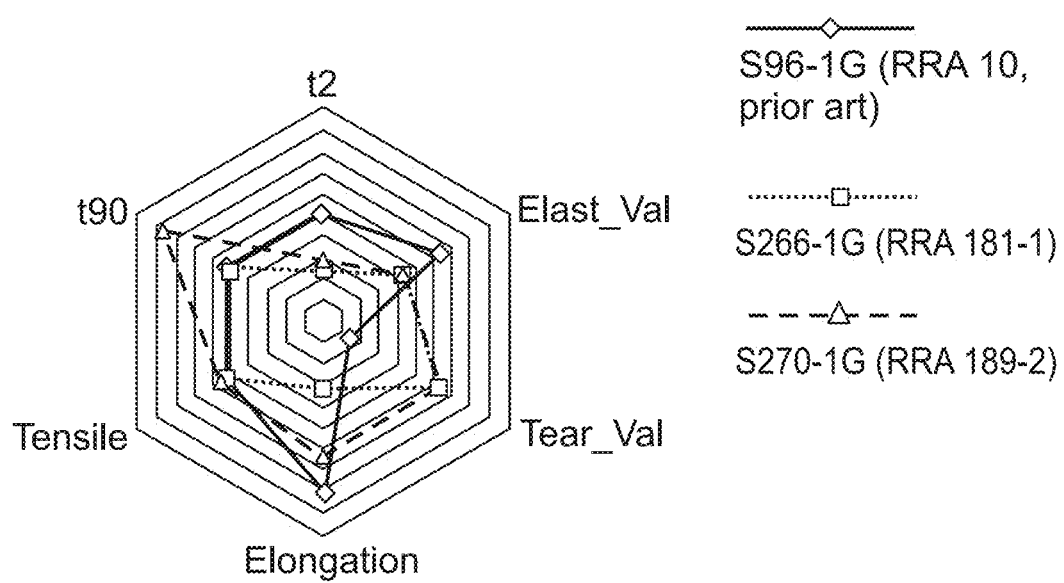
Figure 31:
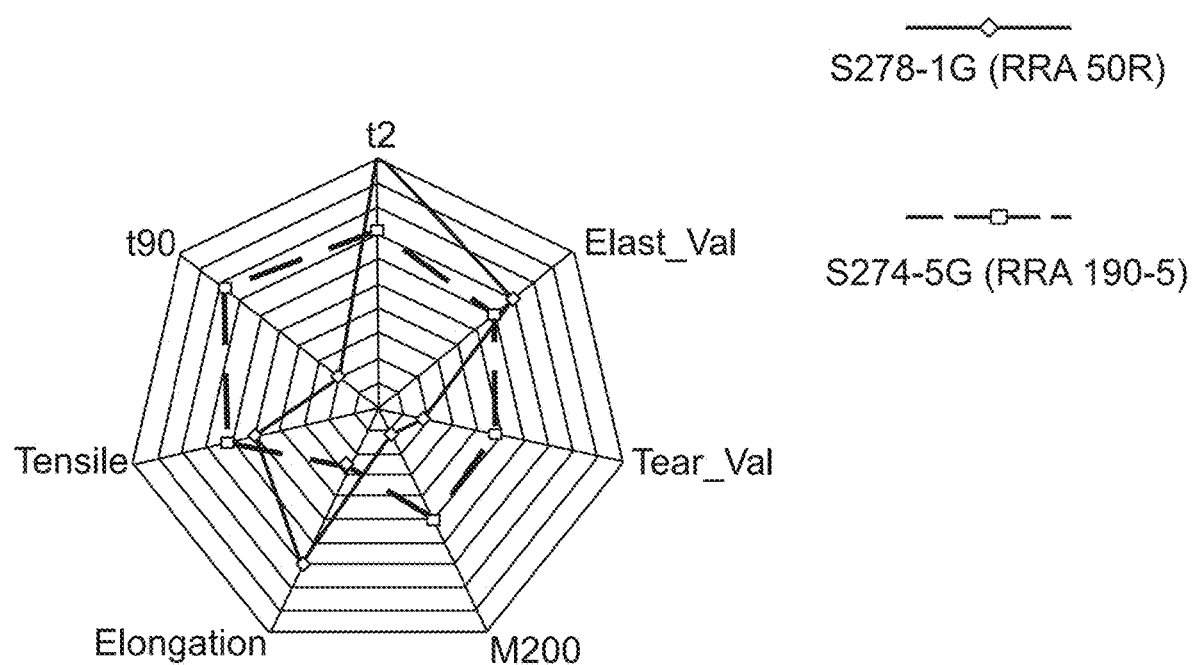
Figure 32:
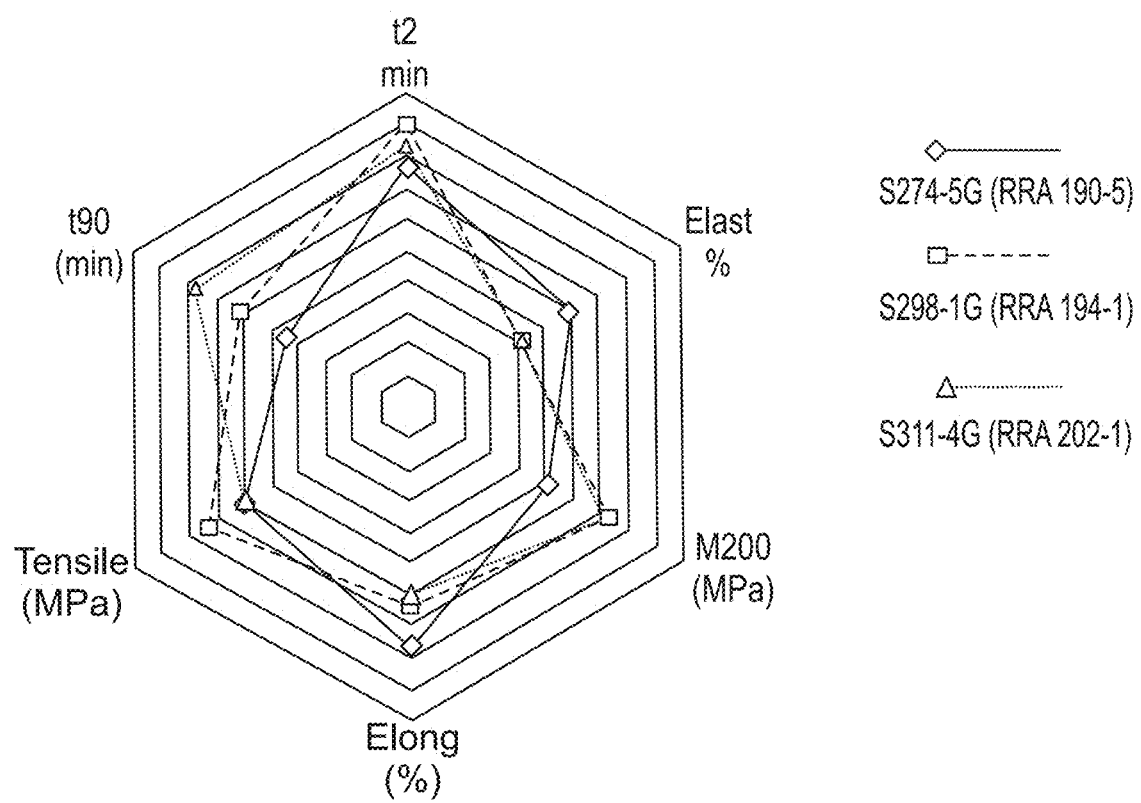
Figure 33:
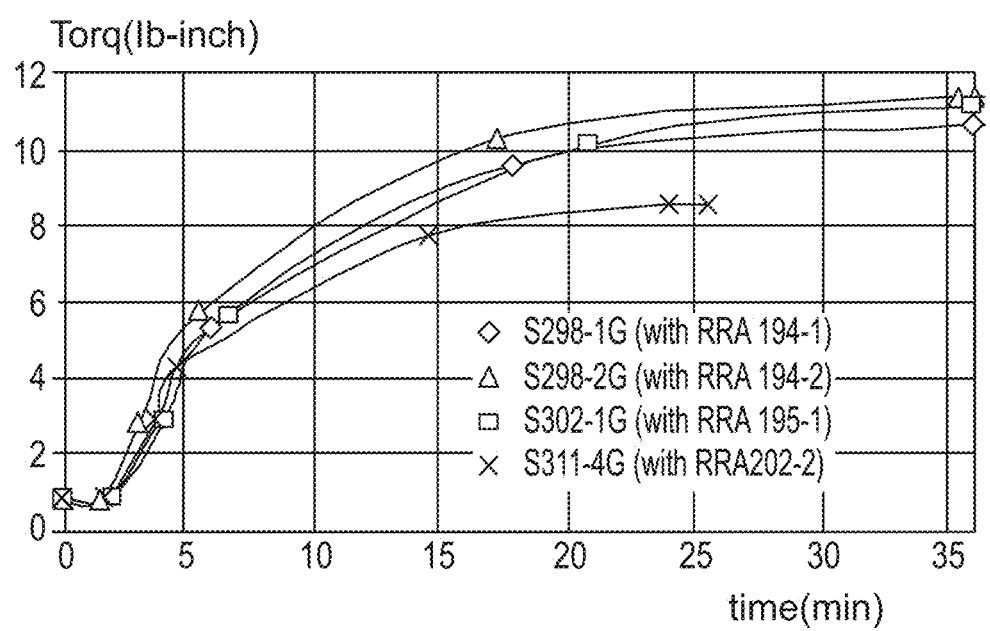
Figure 34:
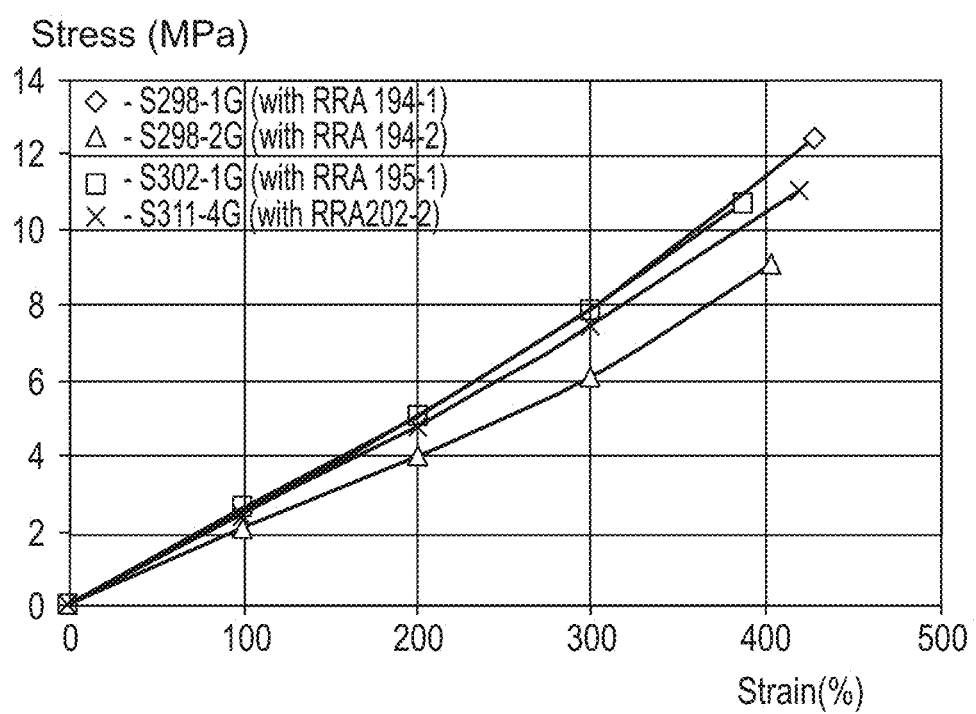

FIG. 29 is a graphical presentation of some of the physical characteristics of elastomeric composites made from NC hybrids, comparing an elastomeric composite containing a hybrid RRA 10 (solid line and diamonds), and an elastomeric composite containing the exemplary modified nanoclay according to some embodiments of the present invention, referred to herein as RRA 181-1 (broken line and squares);

FIG. 30 is a graphical presentation of some of the physical characteristics of elastomeric composites made from NC hybrids, comparing an elastomeric composite containing a RRA 10 (solid line and diamonds), and the exemplary modified nanoclays according to some embodiments of the present invention, referred to herein as RRA 181-1 (dotted line and squares) and 189-2 (broken line and triangles);

FIG. 31 is a graphical presentation of some of the physical characteristics of elastomeric composites made from NC hybrids, comparing an elastomeric composite containing a hybrid RRA 50R (S278-1G, solid line and diamonds), and an elastomeric composite containing an exemplary modified nanoclay according to some embodiments of the present invention, referred to herein as RRA 190-5 (S274-5G, broken line and squares);

FIG. 32 is a graphical presentation of some of the physical characteristics of elastomeric composites made from NC hybrids, comparing elastomeric composites containing RRA 190-5 (diamonds and solid line), RRA 194-1 (S298-1G, squares and broken line) and RRA 202-1 (S331-4G, triangles and dotted line);

FIG. 33 presents comparative plots showing data recorded by a rheometer (Alpha Technologies MDR2000) at 150° C. for exemplary elastomeric composites according to some embodiments of the present invention, made from the nanoclay hybrids RRA 194-1 (S298-1G, diamonds), RRA 194-2 (S298-2G, triangles), and RRA 195-1 (S302-1G, squares) and RRA 202-1 (S311-4G, crosses); and FIG. 34 presents comparative stress-strain curves recorded for exemplary elastomeric composites according to some embodiments of the present invention, made from the nanoclay hybrids RRA 194-1 (S298-1G, diamonds), RRA 194-2 (S298-2G, triangles), and RRA 195-1 (S302-1G, squares) and RRA 202-1 (S311-4G, crosses).

DESCRIPTION OF SPECIFIC EMBODIMENTS OF THE INVENTION

The present invention, in some embodiments thereof, relates to material science and, more particularly, but not exclusively, to novel elastomeric composites which exhibit high elastic modulus, high elasticity and low relaxation, and to articles and devices comprising same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventor has uncovered that elastomeric composites made from natural rubber (mainly) can be manipulated so as exhibit improved mechanical performance (e.g., high elastic modulus and low stress relaxation, namely, long-lasting high elastic modulus), while maintaining high elasticity, and while avoiding the use of high amount of fillers such as carbon black.

The present inventor has thus devised elastomeric composites made from natural rubber (mainly), which include a filler such as carbon black, in an amount lower than 50 parts (or phr), nanofillers such as nanoclays, preferably modified nanoclays, and which exhibit long-lasting high elastic modulus, while maintaining high elasticity. Such elastomeric composites were further manipulated by selecting type and amounts of the nanofillers, and other components of elastomeric composites, such as, but not limited to, vulcanizing agent (e.g., sulfur), combination of accelerators, plasticizers, retarders, and processing aids, so as to achieve desirable rheological and mechanical properties.

Herein throughout, high elasticity of an elastomeric composite is reflected by high % elongation.

Referring now to the drawings, FIGS. 1-17 present exemplary features of articles and devices in which elastomeric composites as described herein are usable.

FIGS. 18 and 19 present synthetic pathways for preparing exemplary nanofillers according to some embodiments of the present invention.

FIG. 20 presents mechanical properties of embodiments of elastomeric composites made from natural rubber, organomodified nanoclays, and a mercaptosilane compound and which are devoid of carbon black, and demonstrate high elongation yet low elastic modulus of these composites. FIG. 21 presents the effect of a plasticizer content on the elastic modulus of such composites, and demonstrates lowered elastic modulus at higher plasticizer content.

FIGS. 22 and 23 present mechanical properties of embodiments of elastomeric composites made from natural rubber, modified nanoclays in which a nanoclay is in association with an antioxidant and a mercaptosilane, demonstrating the improved elastic modulus of such composites as a result of the type of nanofiller.

FIGS. 24 and 25 present comparative mechanical properties of embodiments of elastomeric composites made from natural rubber, modified nanoclays in which a nanoclay is in association with an antioxidant and a mercaptosilane, with various amounts of CB, nanofiller, sulfur, and a retarder, suggesting an advantageous combination of 40 phr CB and 13.33 phr RRA 202-1 nanoclays.

FIG. 26 presents comparative mechanical properties of embodiments of elastomeric composites made from natural rubber, 40 phr CB and modified nanoclays in which a nanoclay is in association with an antioxidant and a mercaptosilane, demonstrating an effect of combinations of various amounts of accelerators and retarder. It is shown therein that elastomeric composites of natural rubber can exhibit M200 (elastic modulus at 200% elongation) of about 18 MPa and elongation of more than 300%.

FIG. 27 presents the effect of vulcanization method on elastic modulus of exemplary elastomeric composites.

FIG. 28 presents exemplary measurements of creep rate, as a model for determining relaxation pattern of the elastomeric composites, and demonstrate low creep rate, suggesting low relaxation modulus of the elastomeric composites.

Additional data is presented in the Examples section that follows, and present further manipulations made to the elastomeric composites described herein, for example, by manipulating the filler to nanofiller ratio, the type and amount of the accelerators, processing aids, and other components, so as to arrive at elastomeric composites with even improved performance in terms of stress relaxation, creep, elastic modulus and % elongation.

FIGS. 29-34 present characteristics of elastomeric composites comprising modified nanoclays according to some embodiments of the present invention and SBR elastomer.

Herein, the terms "parts" and "phr" are used interchangeably.

Herein throughout and in the art, "phr" refers to parts per hundred of rubber. That is, if Mr represents the mass of an elastomer or of a mixture of monomers for composing an elastomer (a rubber), and Mx represents the mass of a component added to the rubber, then the phr of this component is: 100×Mx/Mr.

Herein throughout, an elastomeric composite refers to a composition comprising an elastomeric material (e.g., an elastomeric polymer and/or co-polymer), either before or after vulcanization (e.g., cross-linking)). The elastomeric composite may further comprise additional components, which are typically added to elastomeric polymer and/or co-polymer mixtures in order to provide elastomers such as rubbers. These include, for example, accelerators, activators, vulcanization agents (typically sulfur), and optionally dispersants, processing aids, plasticizers, fillers, and the like.

The phrase "elastomeric composite" as described herein refers to both a composition containing all components required for providing an elastomeric composite (e.g., before vulcanization is effected), and the composite product resulting from subjecting such a composition to vulcanization. Mechanical properties typically refer to the composite after vulcanization, unless otherwise indicated.

Elastomeric composites according to some embodiments of the present invention comprise nanofillers as described herein. In general, elastomeric composites which comprise nanofillers are also referred to herein and in the art as nanocomposites or elastomeric nanocomposites.

In some embodiments, the phrases "nanocomposite(s)" and "nanocomposite composition(s)", as used herein interchangeably, describe a polymeric material (including polymer and/or copolymer) having dispersed therein a plurality of individual filler nanoparticles (a nanofiller).

The phrase "elastomeric composite" as used herein encompasses also elastomeric nanocomposites, nanocomposites, and nanocomposite compositions.

Hereinthroughout, the term "nanofiller" is used herein and in the art collectively to describe nanoparticles useful for making nanocomposites as described herein, which particles can comprise layers or platelet particles (platelets) obtained from particles comprising layers and, depending on the stage of production, can be in a stacked, intercalated, or exfoliated state.

In some embodiments, the nanofillers comprise particles of a clay material and are referred to herein and in the art as nanoclays (or NCs).

In some embodiments, the nanofiller is made of carbon and includes, for example, carbon nanotubes, graphene particles, and any other nanofiller as defined herein and as known in the art.

In some embodiments, the nanofillers are treated nanofillers, typically organomodified nanofillers, as described herein.

The elastomeric nanocomposite can comprise more than one type of a nanofiller.

Additional embodiments pertaining to a nanofiller are provided hereinbelow.

In some embodiments, the mechanical properties of the elastomeric composites are as defined in the Examples section that follows and/or as commonly acceptable in the related art.

In general, the elastomeric composites as defined herein exhibit high mechanical strength, yet high elasticity, and both these properties are long-lasting, as reflected in low relaxation or, alternatively, in low creep rate or creep % change per year or per several years (e.g., 3 years).

In some embodiments, high elasticity can be reflected as high elongation, as defined herein, high Yerzley elasticity, and/or low tangent.

In some embodiments, high elasticity is reflected as high elongation, e.g., of % elongation higher than 200%, or higher than 300%, as described herein.

In some embodiments, high mechanical strength is reflected by high elastic modulus (e.g., M200), high toughness (work), and/or high Tear resistance.

In some embodiments, low relaxation is reflected as small change in elastic modulus per a time period, as indicated herein, hence defined by long-lasting elastic modulus.

Alternatively, low creep rate or low change in creep (%), as defined and described herein, is indicative for low relaxation.

According to an aspect of some embodiments of the present invention, there is provided an elastomeric composite comprising an elastomer that comprises natural rubber, a nanofiller and a filler, the filler being in an amount lower than 50 parts per hundred rubber (phr).

In some embodiments, the elastomer comprises at least 50 phr natural rubber, at least 60 phr natural rubber, at least 70 phr natural rubber, at least 80 phr, 85 phr, or 90 phr natural rubber, or a higher content of natural rubber.

The natural rubber can be of any source, and of any type of fraction of that source. Any of the commercially natural rubbers are contemplated.

In some embodiments, the natural rubber is Standard Malaysian Rubber (SMR) such as, for example, SMR 10 and/or SMR CV60. Any other natural rubber is also contemplated.

In some of any one of the embodiments described herein, the elastomer is made of a mixture of natural rubber at the indicated content and additional one or more polymers and/or copolymers (additional one or more elastomers). The additional polymer(s) and/or copolymer(s) can be any elastomer useful for producing rubbery materials including any mixture of such elastomers.

In some embodiments, the additional polymer is polybutadiene.

In some of any one of the embodiments described herein, the total content of the additional polymer(s) and/or copolymer ranges from 1 phr to 50 phr, depending on the content of the natural rubber, such that the total content of the elastomers is 100 phr.

In exemplary embodiments, the elastomer comprises 90 phr natural rubber, as described herein, and 10 phr of the other elastomer(s) as described herein.

In exemplary embodiments, the elastomer comprises 90 phr natural rubber, as described herein, and 10 phr polybutadiene.

Such elastomers are typically characterized by high elasticity yet low modulus.

For example, natural rubber has modulus of elasticity (Young Modulus) of about 20 MPa, Tensile strength of about 17 MPa and % elongation about 500.

As discussed hereinabove, while the use of natural rubber is advantageous, some applications require elastomeric composites which exhibit high elasticity (e.g., high elongation), yet, at the same time, high modulus, and particularly, high and long-lasting modulus when strained. As further discussed hereinabove, fillers are often used to increase the modulus of natural rubbers, yet, the elasticity (e.g., elongation) is decreased as a result of filler's addition.

The present inventors have devised elastomeric composites which comprise natural rubber as described in any one of the embodiments described herein, and which exhibit high elasticity, high modulus and low stress relaxation.

In some of any one of the embodiments described herein, there is provided an elastomeric composite which comprises natural rubber as described in any one of the embodiments described herein, and which is exhibiting one or more of the following characteristics:

an elongation of at least 200%;

an elastic modulus, at 200% elongation (M200), higher than 10 MPa; and a relaxation lower than 15% change in M200 within one year and/or an average creep rate lower than 2 mm/day.

In some embodiments, the elongation is higher than 200%, and can be at least 250%, at least 300%, at least 350%, at least 400%, including any value therebetween, and including values higher than 400%. In some of any of the embodiments described herein, the elastomeric composite exhibits elongation that ranges from about 300% to about 480%, or from about 300% to about 450%, or from about 350% to about 480%, or from about 370% to about 480%, or from about 390% to about 480%, or from about 400% to about 450%, including any value between these ranges.

In some of any one of the embodiments described herein, there is provided an elastomeric composite comprising a natural rubber as described herein, which exhibits an elastic modulus M200 higher than 10 MPa, or higher than 11 MPa, or higher than 12 MPa, or even higher than 13 MPa. Higher values are also contemplated.

In some of any one of the embodiments described herein the elastic composite exhibits an elastic modulus M200 that ranges from 8 MPa to 15 MPa, or from 8 MPa to 13 MPa, or from 9 MPa to 13 MPa, or from 10 MPa to 12 MPa, or from 10 MPa to 13 MPa. Any subranges between these ranges and any value between these ranges are also contemplated. Exemplary values of elastic modulus M200 are presented in the Examples section that follows.

In some of any one of the embodiments described herein, there is provided an elastomeric composite comprising a natural rubber as described herein, which exhibits % elongation higher than 200%, as described in any one of the embodiments relating to elongation, and which further exhibits elastic modulus M200 higher than 10 MPa or an elastic modulus as described in any one of the embodiments relating to elastic modulus.

It is to be noted that elastomeric composites made of natural rubber and exhibiting such high modulus at relatively low content of a filler are not a trivial task to achieve.

It is to be noted that elastomeric composites made of natural rubber and exhibiting high modulus M200 as described herein, while maintaining high elasticity, and while further maintaining low relaxation, are also not a trivial task to achieve. Elastomeric composites exhibiting high elastic modulus M200, typically exhibit low elasticity and high stress relaxation. The elastomeric composites presented herein therefore advantageously exhibit high modulus M200 and high elasticity altogether.

In some embodiments, elastomeric composites as presented herein advantageously exhibit high modulus M200 and low stress relaxation, as described herein.

As used herein, the term "stress relaxation", which is also used herein simply as "relaxation", describes time dependent change in stress while maintaining a constant strain. Stress of strained elastomeric composite decreases with time due to molecular relaxation processes that take place within the elastomer.

In some embodiments, relaxation is defined as the change in % of the elastic modulus during a time period (e.g., a year). In some embodiments, relaxation is defined as the change in % of the elastic modulus M200 during a time period (e.g., a year).

In some of any one of the embodiments described herein, there is provided an elastomeric composite which comprises natural rubber as described herein, and which exhibits a relaxation of 15% (change in M200) or lower, within a year. In some embodiments, the relaxation of the composite is 10% (change in M200) or lower, within a year. It is noted that relaxation of elastomeric composites is typically exponential, and is lowered within time. In some embodiments, relaxation is of an average of 10% (change in M200) per year. In some embodiments, the relaxation of the composite is 20% (change in M200) or lower, e.g., 15% or lower, per two years.

A relaxation characteristic of an elastomeric composite can be reflected also by creep or creep rate. As used herein, "creep" represents the time dependent change is strain while maintaining a constant stress. In some embodiments, creep is presented as the change in the strain of an elastomeric composite within 3 years (upon application of a stress); or as the percentage in the change of strain within 3 years (upon application of a stress).

Similarly, since the creep rate or change is typically non-linear for elastomeric composites, in some embodiments, the composite exhibits an average creep rate lower than 2 mm/day, or lower than 1 mm/day.

In some embodiments, the elastomeric composite exhibits a creep rate lower than 300 mm/3 years, or lower than 280 mm/3 years or lower than 250 mm/3 years and optionally even lower than 230 mm/3 years.

In some embodiments, such an averaged creep rate is exhibited within one month, two months or within a year. In some embodiments, even lower creep rate (e.g., lower than 1 mm/day, or lower than 0.8 mm/day, or lower than 0.5 mm/day) is exhibited after one month, two months or within a year, upon application of stress.

In some of any one of these embodiments, the values of the creep as provided herein are given when an elastomeric specimen comprising an elastomeric composite as described herein is subjected to a stress of about 110 or 110.61 Kg/cm$^2$.

The above values are for a creep as measured as described in the Examples section that follows.

In some embodiments, elastomeric composites as presented herein advantageously exhibit high modulus M200, as described in any one of the embodiments presented herein, high % elongation, as described in any one of the embodiments presented herein, and low stress relaxation and/or creep, as described in any one of the embodiments as presented herein.

In some embodiments, any one of the elastomeric composites described herein are further characterized by one or more of the following:

A Yerzley elasticity which is higher than 65%, and can be, for example, 70%, 75%, 80%, including any value therebetween, and even higher;

A toughness (Work) of the composition which is higher than 4 Joules, or higher than 5 Joules, and can be, for example, any value between 4 to 7 Joules or 5 to 7 Joules or 4 to 6 Joules; and A Tear resistance of the elastomeric composite which is higher than 50 N/mm, and can be 55, 60, 65, 70 N/mm and even higher, including any value between the indicated values.

It is noted that while Yerzley elasticity of natural tuber is very high (around 90%), addition of a filler is known to substantially reduce it to below 65%. Thus, Yerzley elasticity higher than 65% is not a trivial task to achieve for elastomeric compositions made of natural rubber (with or without additional polymer or copolymer) and a filler.

In some embodiments, the composite exhibits all of the characteristics described hereinabove, including any combination of specific embodiments of the characteristics described hereinabove.

An elastomeric composite made of natural rubber as described in any one of the embodiments described herein further comprises a filler.

In some embodiments, the filler is carbon black (CB). However, any other suitable filler, for example, silica or amorphous silica, is contemplated. As is widely recognized in the art, for natural rubber-based elastomer as described herein to exhibit high mechanical performance (e.g., high M200), as defined herein, typically at least 50 phr CB are required.

In any one of the embodiments of the present invention, the amount of CB (or any other filler) in an elastomeric composite as described herein is lower than 50 phr, and can be, for example, 48, 45, 42, 40, 35, 30, 25, 20 phr (including any value between these values) and even lower.

In some of any one of the embodiments described herein, an amount of carbon black or any other filler in the elastomeric composition is about 40 parts per hundred rubber.

In some of any one of the embodiments described herein, an amount of carbon black or any other filler in the elastomeric composition is about 30 parts per hundred rubber.

In some of any one of the embodiments described herein, an amount of carbon black or any other filler in the elastomeric composition is about 20 parts per hundred rubber.

In some of any one of the embodiments described herein, the elastomeric composite further comprises a nanofiller, as defined herein.

It has been uncovered by the present inventor that at certain amounts and/or ratio of a filler (e.g., CB) and a nanofiller, the properties of the composite as defined herein are exhibited.

In some embodiments, an amount of the nanofiller is in a range of from 5 phr to 30 phr, or from 5 phr to 20 phr, or from 10 phr to 25 phr, or from 10 phr to 20 phr, including any subrange and value therebetween.

In some embodiments, a ratio between the amount of the nanofiller and the amount of the filler is 1:5, or 1:3 or 1:2 or 1:1.8, or even 1:1, including any value therebetween and including any subrange between 1:5 to 1:1.

In some embodiments, a ratio between the amount of the nanofiller and the amount of the filler is 1:3. In some of these embodiments, an amount of the filler (e.g., CB) is 40 phr and an amount of the nanofiller is 13.33 phr.

In some embodiments, a ratio between the amount of the nanofiller and the amount of the filler is 1:1. In some of these embodiments, an amount of the filler (e.g., CB) is 20 phr and an amount of the nanofiller is 20 phr.

In some embodiments, a ratio between the amount of the nanofiller and the amount of the filler is about 1:8 or about 1:76. In some of these embodiments, an amount of the filler (e.g., CB) is 30 phr and an amount of the nanofiller is 17 phr. The nanofiller can be any nanofiller as described herein and/or is known in the art.

In some embodiments, the nanofiller is a nanoclay, as defined herein and/or is known in the art.

In some embodiments, the nanofiller is a modified nanofiller.

Modified nanofillers are nanofillers as described herein which have been treated so as to modify the surface thereof by inclusion of organic moieties (e.g., treated with cationic or anionic surfactants, or surface active agents, as described herein).

As used herein, the term "surfactant", which is also referred to herein interchangeably as "a surface-active agent" describes a substance that is capable of modifying the interfacial tension of the substance with which it is associated.

In some embodiments, the modified nanofiller includes organomodified nanoclays. In some embodiments, the nanoclay is montmorillonite.

In some embodiments, the nanoclay comprises montmorillonite treated with a cationic surfactant such as an organic ammonium salt or organic aminium salt. Such cationic surfactants typically include primary, secondary or tertiary amines comprising at least one hydrocarbyl chain, preferably a hydrocarbyl that comprises at least 4 carbon atoms, or at least 5, 6, 7, 8, 9, 10, 11, 12, and even more carbon atoms.

As used herein, a "hydrocarbyl" collectively encompasses chemical groups with a backbone chain that is composed of carbon atoms, mainly substituted by hydrogens. Such chemical groups include, for example, alkyls, alkenyls, alkynyls, cycloalkyls, aryls, alkaryl and aralkyls, as these terms are defined herein, and any combination thereof. Some of the hydrogen atoms can be substituted.

Exemplary cationic surfactants include salts of tallow amines.

Tallow is a hard fat consists chiefly of glyceryl esters of oleic, palmitic, and stearic acids (16-18 carbon chains). Tallow amines are tallow based alkyl amines, or fatty amines. Non-limiting examples of tallow based alkyl amines include: Tallow amine (CAS RN: 61790-33-8), Hydrogenated tallow amine (CAS RN: 61788-45-2), Di(hydrogenated tallow)amine (CAS RN: 61789-79-5), Dihydrogenated tallow methyl amine (CAS RN: 61788-63-4), and N-(Tallow alkyl)dipropylenetriamine (CAS RN: 61791-57-9). Additional examples include, but are not limited to, hydrogenated tallow dimethyl benzyl amine, dihydrogenated tallow dimethylamine, hydrogenated tallow dimethylamine, N-2-ethylhexyl tallow amine, and methyl tallow, bis-2-hydroxyethyl.

Nanoclays modified by tallow amines or any other surface active agent can be modified by one or more of the salts described herein.

Exemplary commercially available organomodified nanoclays include, but are not limited to, Cloisite 10A, 15A, 20A, 25A and 30B of Southern Clays; Nanomer 1.31ps, 1.28E and 1.34 TCN of Nanocor. In general, the commercially available organomodified NCs are montmorillonites in which sodium ions are exchanged with ammonium or aminium ions.

In all embodiments where the nanofiller comprises organomodified nanoclays, it may include one type of organomodified nanoclays or two or more types of differently modified nanoclays or a mixture of organomodified and non-modified nanoclays.

In some embodiments, the nanofiller is a nanoclay as described herein, including an organomodified nanoclay, which is further modified so as to be in association with a an amine-containing compounds that exhibits an antioxidation activity.

Herein, an "amine-containing compound featuring an antioxidation activity" is also referred to as "antioxidant".

As known in the art, and is used herein, an antioxidant is a substance which is added, typically in small quantities, to formulations or products which are susceptible to oxidation, so as to inhibit or slow oxidative processes, while being oxidized by itself or otherwise interacting with the oxidative species.

In the context of elastomeric compositions or composites, antioxidants are typically used for inhibiting or slowing oxidative degradation of the polymeric network. Oxidative degradation of polymers often occurs as a result of free radicals, and antioxidants of polymeric materials are often free radical scavengers. Such antioxidants are often called antiozonates. Such antioxidants typically act by donating an electron or hydrogen atom to the formed radical, to thereby inhibit the free-radical degradation.

Herein, an antioxidant encompasses any anti-oxidant that is suitable for use in the elastomeric formulation/rubber fields.

In some embodiments, the antioxidant is a compound containing at least one amine group, as defined herein, and preferably two or more amine groups. Without being bound by any particular theory, it is assumed that such amine-containing compounds exhibit a dual effect: binding to the nanoclay (e.g., via one or more amine groups), and acting as an antioxidant (e.g., via one or more free, non-bound amine groups). Binding to the nanoclay via more than one amine group in an amine-containing compound as described herein may improve the strength of the elastomeric composite containing the composition-of-matter.

Antioxidants containing one or more amine groups include, but are not limited to, compounds comprising stearically hindered amines, such as, for example, p-phenylene diamines (p-PDA), ethylene diurea derivatives, substituted dihydroquinolines, alkylated diphenyl amines, substituted phenolic compounds having one or more bulky substituents, as defined herein, diphenylamine-acetone reaction products, tris(nonyl phenyl) phosphates or amine compounds substituted by one or more alkyls and/or one or more bulky substituents, as defined herein. Other amine-containing compounds that exhibit antioxidation activity, preferably as free radical scavengers or as antiozonates in the rubber field, are contemplated.

In some embodiments, the amine-containing compound is a para-phenylenediamine (p-PDA). In some embodiments, the p-PDA is a N,N'-disubstituted-p-phenylenediamine, including symmetrical N,N'-dialkyl-p-phenylenediamines and N,N'-diaryl-p-phenylenediamines, and non-symmetrical The N-alkyl, N'-aryl-p-phenylenediamines.

Non-limiting examples of p-PDAs which are suitable for use in the context of the present embodiments are depicted in Scheme 1 below.

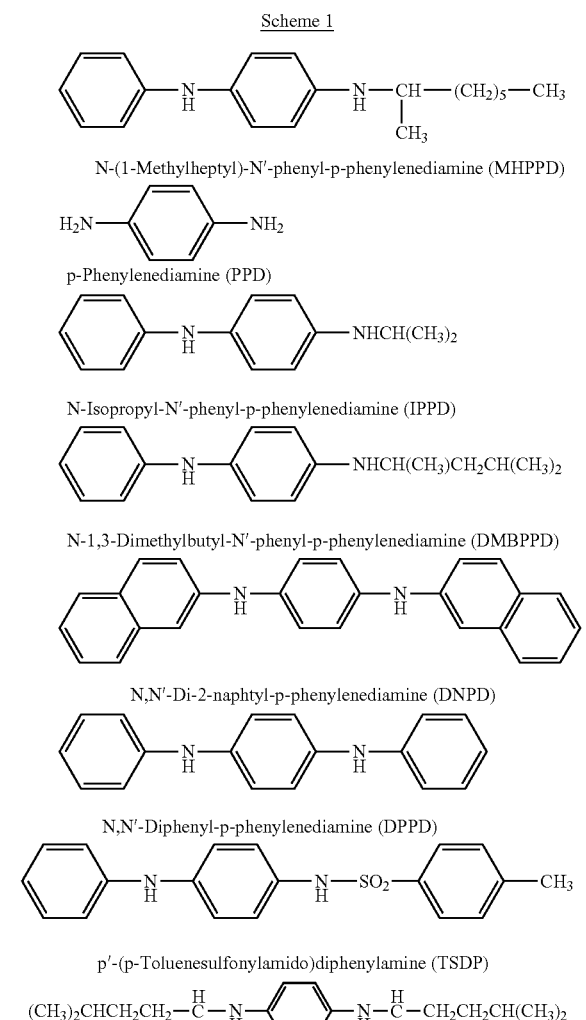

Herein, ethylene diurea derivatives are compounds which can be collectively represented by the general formula:

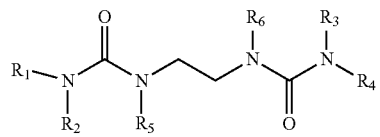

wherein:

$R_1$, $R_2$, $R_3$ and $R_4$, and/or $R_5$ and $R_6$ are each independently selected from the group consisting of hydrogen, alkyl, alkenyl, alkynyl, cycloakyl, aryl, alkaryl, aralkyl, alkenyl, alkynyl, each being optionally substituted as defined herein, and optionally and preferably, at least one of $R_1$, $R_2$, $R_3$ and $R_4$, and/or $R_5$ and $R_6$ is a bulky substituent, as described herein.

An exemplary bulky substituent in the context of these embodiments is 3,5-dihydrocarbyl-4-hydroxyphenylalkyl group.

In some embodiments, the antioxidant is a p-PDA, such as IPPD or DMBPPD (also referred to as 6PPP).

In some embodiments, the antioxidant is an amine substituted by one or more alkyl and/or other bulky substituents. Such antioxidants include, for example, tertiary amines such as triethylamine or any other amine substituted by 3 hydrocarbyl groups, as defined herein, whereby each hydrocarbyl group can independently be of 2-24 carbon atoms, such as, N,N-dimethyldodecan-1-amine (DDA; CAS number: 83855-88-1); and primary amines such as, but not limited to, dodecylamine.

As used herein, the phrase "bulky", in the context of a substituent, describes a group that occupies a large volume. A bulkiness of a group is determined by the number and size of the atoms composing the group, by their arrangement, and by the interactions between the atoms (e.g., bond lengths, repulsive interactions). Typically, lower, linear alkyls are less bulky than branched alkyls; bicyclic molecules are more bulky than cycloakyls, etc.

Exemplary bulky groups include, but are not limited to, branched alkyls such as tert-butyl, isobutyl, isopropyl and tert-hexyl, as well as substituted alkyls such as triphenylmethane (trityl) and cumaryl. Additional bulky groups include substituted or unsubstituted aryl, alkaryl, aralkyl, heteroaryl, cycloakyl and/or heteroalicyclic, as defined herein, having at least 6 carbon atoms.

In some embodiments, a bulky substituent comprises more than 4 atoms, more than 6 atoms, preferably more than 8 atoms, or more than 12 atoms.

The term "amine" describes a —NR'R" group, with R' and R" being hydrogen, alkyl, cycloakyl or aryl, as defined herein. Other substituents are also contemplated. The term "amine" also encompasses an amine group which is not an end group, such as, for example, a —NR'— group, in which R' is as defined herein.

The term "alkyl", as used herein, describes a saturated aliphatic hydrocarbon including straight chain and branched chain groups. In some embodiments, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. In some embodiments, the alkyl is a lower alkyl having 1 to 4 carbon atoms. The alkyl group may be substituted or unsubstituted, as indicated herein.

The term "alkenyl", as used herein, describes an alkyl, as defined herein, which contains a carbon-to-carbon double bond.

The term "alkynyl", as used herein, describes an alkyl, as defined herein, which contains carbon-to-carbon triple bond.

The term "cycloalkyl" describes an all-carbon monocyclic or fused ring (i.e., rings which share an adjacent pair of carbon atoms) group where one or more of the rings does not have a completely conjugated pi-electron system. The cycloalkyl group may be substituted or unsubstituted, as indicated herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted, as indicated herein.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine.

The term "heteroalicyclic" or "heterocyclyl" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

The term "alkaryl", as used herein, describes an alkyl substituted by one or more aryls. Examples include benzyl, cumaryl, trityl, and the like.

The term "aralkyl", as used herein, describes an aryl substituted by one or more alkyls. Examples include toluene, styrene, and the like.

Each of the alkyl, alkenyl, alkynyl, cycloalkyl, aryl, alkaryl, aralkyl, heteroalicyclic and heteroaryl groups described herein may be substituted by one or more substituents, whereby each substituent group can independently be, for example, halogen, alkyl, alkoxy, cycloalkyl, alkoxy, nitro, amine, hydroxyl, thiol, thioalkoxy, thiohydroxy, carboxy, amide, aryl and aryloxy, depending on the substituted group and its position in the molecule. Additional substituents are also contemplated.

The term "halide", "halogen" or "halo" describes fluorine, chlorine, bromine or iodine.

The term "haloalkyl" describes an alkyl group as defined herein, further substituted by one or more halide(s).

The term "hydroxyl" or "hydroxy" describes a —OH group.

The term "thiohydroxy" or "thiol" describes a —SH group.

The term "thioalkoxy" describes both an —S-alkyl group, and a —S-cycloalkyl group, as defined herein.

The term "thioaryloxy" describes both an —S-aryl and a —S-heteroaryl group, as defined herein.

The term "alkoxy" describes both an —O-alkyl and an —O-cycloalkyl group, as defined herein.

The term "aryloxy" describes an —O-aryl, as defined herein.

The term "carboxy" or "carboxylate" describes a —C(=O)—OR' group, where R' is hydrogen, alkyl, cycloalkyl, alkenyl, aryl, heteroaryl (bonded through a ring carbon) or heteroalicyclic (bonded through a ring carbon) as defined herein.

The term "carbonyl" describes a —C(=O)—R' group, where R' is as defined hereinabove.

The above-terms also encompass thio-derivatives thereof (thiocarboxy and thiocarbonyl).

The term "thiocarbonyl" describes a —C(=S)—R' group, where R' is as defined hereinabove.

A "thiocarboxy" group describes a —C(=S)—OR' group, where R' is as defined herein.

A "sulfinyl" group describes an —S(=O)—R' group, where R' is as defined herein.

A "sulfonyl" group describes an —S(=O)$_2$—R' group, where Rx is as defined herein.

A "carbamyl" group describes an —OC(=O)—NR'R" group, where R' is as defined herein and R" is as defined for R'.

A "nitro" group refers to a —NO$_2$ group.

A "cyano" or "nitrile" group refers to a —C≡N group.

As used herein, the term "azide" refers to a —N$_3$ group.

The term "sulfonamide" refers to a —S(=O)$_2$—NR'R" group, with R' and R" as defined herein.

The term "phosphonyl" describes an —O—P(=O)(OR')$_2$ group, with R' as defined hereinabove.

The term "phosphinyl" describes a —PR'R" group, with R' and R" as defined hereinabove.

In some embodiments, the modified nanoclay is such that a silyl-containing compound is in association with the nanoclay, as described herein.

As used herein, a "silyl-containing compound" is a compound which comprises one or more Si atoms, whereby the Si atom is substituted by one or more organic substituents.

In some embodiments, the silyl containing compound is a siloxane-containing compound, comprising a Si atom substituted by one or more hydroxy or alkoxy groups, as defined herein. Such compounds may react, via condensation, with free hydroxy groups on the surface of the nanoclay.

In some embodiments, the silyl-containing compound or the siloxane-containing compound comprises a sulfur-containing moiety, such as, but not limited to, a moiety that comprises a thiol group, as a substituent of the Si atom. An exemplary such substituent is a thioalkyl, such as, for example, an alkyl, as described herein (e.g., ethyl, propyl, butyl, etc.) substituted by one or more thiol groups or sulfide groups.

Silyl-containing compounds or siloxane-containing compounds which comprise a sulfur-containing substituent are also referred to herein as mercaptosilanes or mercaptosiloxanes. Such compounds are advantageous since the sulfur moiety may participate in the vulcanization of an elastomeric composition containing the nanofiller.

In some embodiments, the silyl-containing compound comprises one or more siloxanes (e.g., triorthosilicate) substituted by one or more alkyl sulfides or thioalkyls.

An exemplary silyl-containing compound is bis(triethoxysilylpropyl)tetrasulfane (TE5PT).

An exemplary silyl-containing compound is Si69 as described herein.

In some embodiments, additional components are added during modification of a nanoclay and hence are included within a modified nanoclay as described herein or within a composition-of-matter comprising the nanoclay.

In some embodiments, the modified nanoclay further comprises an accelerator.

Exemplary accelerators which are suitable for use in the context of embodiments of the present invention include, but are not limited to, TBBS, MBS, CBS, MBT, TMDM, and any other accelerator that is usable in the elastomer industry.

In some embodiments, silica is added to the modified nanoclay as described herein. Modified nanoclays comprising silica provide improved reinforcement when added to elastomeric composites, as discussed and demonstrated hereinafter.

Exemplary modified nanofillers which are nanoclays in association with an antioxidant as described herein are presented in Example 1 hereinbelow.

Modified nanofillers which are nanoclays in association with an antioxidant as described herein can be prepared as described in Example 1 hereinbelow.

According to some embodiments of the present invention, a process of preparing nanoclays in association with an antioxidant as described herein is generally effected by reacting (e.g., by mixing) a nanoclay (either non-treated or an organomodified nanoclay, as described herein) and an amine-containing compound (an antioxidant) as described herein, in a solvent.

When the modified nanoclay is further in association with a silyl-containing compound, as described herein, the process is generally effected by reacting (e.g., by mixing) the nanoclay (either non-treated or an organomodified nanoclay, as described herein), the amine-containing compound and the silyl-containing compound.

In some embodiments, the nanoclay used in the process as described herein is an organomodified nanoclay, as described herein, which is further treated with an amine-containing compound as described herein.

An organomodified nanoclay can be a commercially available nanoclay or be synthetically prepared and then used in the process as described herein.

In some embodiments, the nanoclay and the amine-containing compound are first reacted and then the silyl-containing compound is added and the reaction is continued.

In cases where the reaction is performed in an organic solvent, the process further comprises adding water, prior to, concomitant with, or subsequent to the addition of the silyl-containing compound. Without being bound by any particular theory, it is assumed that the addition of water facilitates generation of free hydroxy groups within the silyl-containing compound, which can then react with free hydroxy groups on the nanoclay surface.

Additional ingredients, if present, can also be added, either concomitant with or subsequent to, mixing the nanoclay and the antioxidant.

For example, an accelerator, as defined herein, can be added to a mixture of the nanoclay and the antioxidant, and then, upon reacting this mixture (by, e.g., mixing) a silyl-containing compound is added and reaction is continued.

In another example, silica is added after mixing a nanoclay and an antioxidant, and optionally an accelerator, and after further mixing, the silyl-containing compound is added. In some embodiments, such mixing is performed for about 10 hours, at elevated temperature (e.g., 80-100° C.).

In some embodiments, the silyl-containing compound is added with water and/or an acid (e.g., acetic acid). When acid is added, it is such that generates pH of about 3 in the reaction mixture. Exemplary acids include Ufacid and acetic acid (glacial). It is noted, however, that preferably, an acid is not added.

In some embodiments, reacting any of the components described herein, and in any combination thereof (e.g., by mixing a reaction mixture containing these components or combination thereof) is effected at elevated temperature. In some embodiments, the temperature is determined by the boiling temperature of the solvent. In some embodiments, reacting is effect at a temperature that ranges from 50° C. to 150° C., or from 50° C. to 100° C., or from 60° C. to 100° C.

In some embodiments, the reacting (e.g., by mixing) is effected for a time period that ranges from 2 hours to 30 hours, or from 2 hours to 20 hours, or from 2 hours to 15 hours, or from 5 hours to 10 hours. Higher reaction times are also contemplated and may depend on the presence and nature of additional components.

If ingredients are added to the reaction mixture after initially mixing the nanoclay and the antioxidant (and optionally an accelerator), the initial mixing can be effected for 1-3 hours (e.g., 2 hours), and then, upon adding further reactants, for additional 2-10 hours (e.g., 7 hours), depending on the nature of the additional component.

Other conditions (e.g., time and temperature of mixing) are also contemplated.

Figure 1:
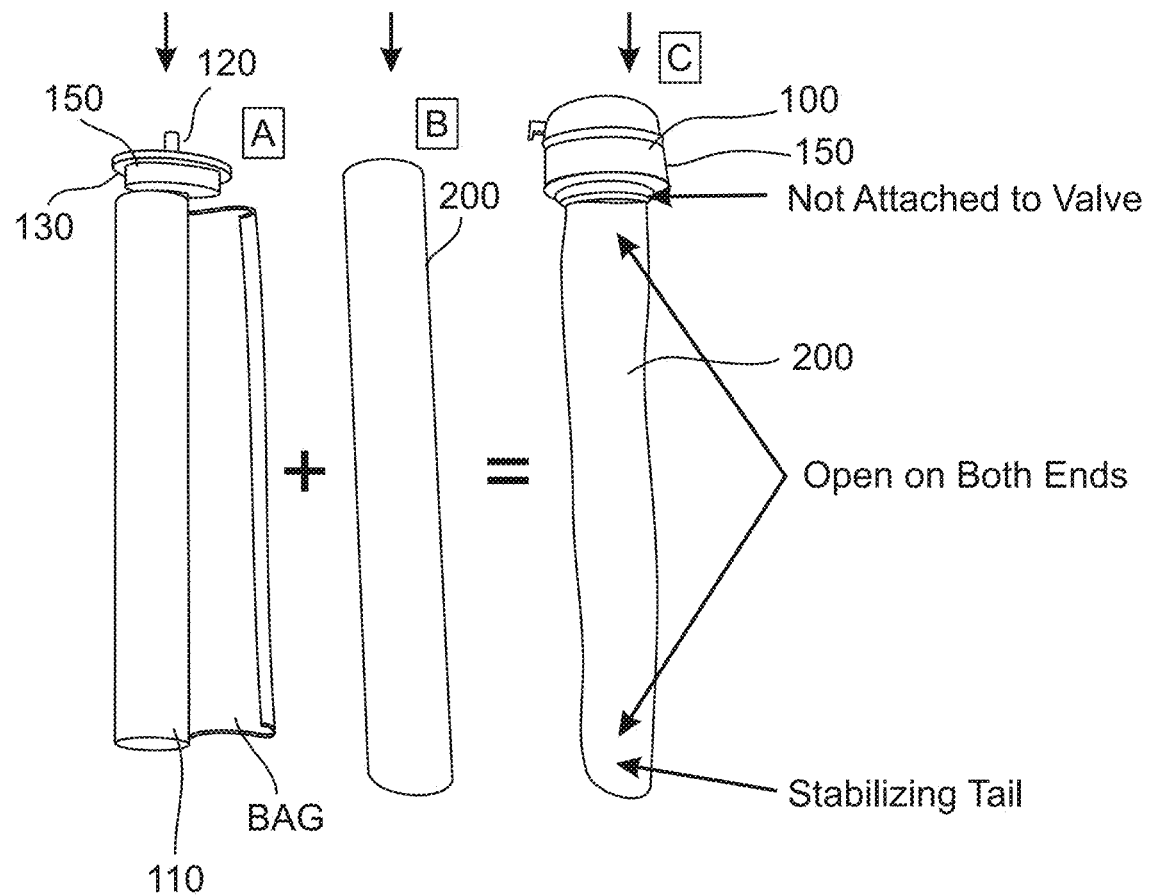

Mixing can be effected using any methods known in the art of synthetic chemistry. An exemplary system is depicted in FIG. 1.

Once the reaction is stopped by e.g., cooling, the obtained reaction mixture can be dried, to thereby obtain the composition-of-matter.

As discussed in detail in the Examples section that follows, the solvent in which the process is effected can be any of an organic solvent and a mixture of organic solvent and water.

Suitable organic solvents include, but are not limited to, polar solvents such as acetone, chloroform, alcohols, and the like.

In some embodiments, the organic solvent is a non-flammable solvent such as, but not limited to, isopropyl alcohol and/or chloroform.

In some embodiments, when a mixture of an organic solvent as described herein and water is used, the organic solvent:water ratio can range from 5:1 to 1:5, or from 3:1 to 1:3 or from 2:1 to 1:2, including any intermediate ratios between these values, or is 1:1.

Without being bound by any particular theory, it is assumed that treating nanoclays, including organomodified nanoclays, in an organic solvent, renders modification of the nanoclays more efficient as it enables efficient dispersion of particles in the solvent, thus rendering the surface thereof accessible to further association with the antioxidant and any of the other components within the composition-of-matter.

In some embodiments, these modified nanoclays are prepared in a non-flammable solvent, such as, for example, a mixture of water and isopropyl alcohol. See, for example, RRA 202-1 and RRA 206-2.

In some embodiments, the modified nanoclays are as described in U.S. patent application Ser. Nos. 13/546,228 and 13/949,456, which are incorporated by reference as if fully set forth herein.

Modified nanofillers which are nanoclays or nanoparticles in association with an antioxidant (an amine-containing compound which exhibits an antioxidation activity) and a silyl-containing compound, as described herein, or compositions-of-matter comprising the same, are also referred to herein collectively as nanohybrids or as hybrid nanoclays.

In some of any one of the embodiments described herein, an amount of the nanofiller (any of the nanofillers as described herein) ranges from 10 phr to 15 phr. In some embodiments, it is 13.33 phr.

In some of any one of the embodiments described herein, an amount of the nanofiller (any of the nanofillers as described herein) ranges from 10 phr to 20 phr or from 15 phr to 20 phr. In some embodiments, it is 17 phr.

In some of any one of the embodiments described herein, an amount of the nanofiller (any of the nanofillers as described herein) ranges from 10 phr to 30 phr or from 15 phr to 25 phr. In some embodiments, it is 20 phr.

In some embodiments, an amount of a nanofiller which is a nanoclay in association with an antioxidant and with a silyl-containing compounds as described herein ranges from 10 phr to 15 phr. In some embodiments, it is 13.33 phr.

In some embodiments, an amount of a nanofiller which is a nanoclay in association with an antioxidant and with a silyl-containing compounds as described herein ranges from 10 phr to 20 phr or from 15 phr to 20 phr. In some embodiments, it is 17 phr.

In some embodiments, an amount of a nanofiller which is a nanoclay in association with an antioxidant and with a silyl-containing compounds as described herein ranges from 20 phr to 30 phr or from 15 phr to 25 phr. In some embodiments, it is 20 phr.

According to an aspect of some embodiments of the present invention, there is provided an elastomeric composite comprising a natural rubber (mainly), as described herein in any of the respective embodiments, and further comprising a filler in an amount lower than 50 phr, as described in any one of the respective embodiments herein, and a nanofiller, as described in any one of the respective embodiments described herein. Any combination of the embodiments described herein for a natural rubber, a filler and a nanofiller, and an amount thereof is contemplated.

In some of these embodiments, the nanofiller is a modified nanofiller as described herein, and in some embodiments, it comprises a nanoclay in association with an antioxidant and with a silyl-containing compounds as described herein.

According to an aspect of some embodiments of the present invention, there is provided an elastomeric composite comprising a natural rubber (mainly), and further comprising a filler in an amount lower than 50 phr, as described in any one of the respective embodiments herein, and a nanofiller which comprises a nanoclay in association with an antioxidant and with a silyl-containing compounds, as described in any one of the respective embodiments described herein. Any combination of the embodiments described herein for a filler and a nanofiller, and an amount thereof is contemplated.

As demonstrated in the Examples section that follows, elastomeric composites as described herein, which exhibit the above-indicated performance and/or characteristics, may be such that comprise 40 phr CB and 13.33 phr of a nanofiller, for example, a nanofiller which is a nanoclay in association with an antioxidant and optionally also in association with a silyl-containing compound, as described herein. Elastomeric composites as described herein, which exhibit the above-indicated performance and/or characteristics, may also be such that comprise 20 phr CB and 20 phr of a nanofiller, for example, a nanofiller which is a nanoclay in association with an antioxidant and optionally also in association with a silyl-containing compound, as described herein. Elastomeric composites as described herein, which exhibit the above-indicated performance and/or characteristics, may also be such that comprise 30 phr CB and 17 phr of a nanofiller, for example, a nanofiller which is a nanoclay in association with an antioxidant and optionally also in association with a silyl-containing compound, as described herein.

According to an aspect of some embodiments of the present invention, there is provided an elastomeric composite comprising an elastomer than comprises natural rubber, as defined herein, carbon black and a modified nanofiller, wherein an amount of said carbon black is 40 phr and an amount of the modified nanofiller ranges from 10 phr to 15 phr. In some embodiments, an amount of the modified nanofiller is 13.33 phr.

According to an aspect of some embodiments of the present invention, there is provided an elastomeric composite comprising an elastomer than comprises natural rubber, as defined herein, carbon black and a modified nanofiller, wherein an amount of said carbon black is 20 phr and an amount of the modified nanofiller ranges from 10 phr to 30 phr or from 15 phr to 25 phr. In some embodiments, an amount of the modified nanofiller is 20 phr.

According to an aspect of some embodiments of the present invention, there is provided an elastomeric composite comprising an elastomer than comprises natural rubber, as defined herein, carbon black and a modified nanofiller, wherein an amount of said carbon black is 30 phr and an amount of the modified nanofiller ranges from 10 phr to 20 phr or from 15 phr to 20 phr. In some embodiments, an amount of the modified nanofiller is 17 phr.

In some of these embodiments, the modified nanofiller comprises nanoclay in association with an antioxidant and optionally also in association with a silyl-containing compound, as described herein in any of the respective embodiments.

In some embodiments, such elastomeric composites exhibits one or more of the following characteristics:

an elongation of at least 200%, as defined in any one of the respective embodiments herein;

an elastic modulus, at 200% elongation, higher than 10 MPa, as defined in any one of the respective embodiments herein;

a relaxation lower than 15% change in M200, as defined in any one of the respective embodiments herein; and/or a creep rate lower than 300 mm/3 years, as defined in any one of the respective embodiments herein.

In some embodiments, such elastomeric composites exhibit one or more of the following characteristics:

an elongation of at least 200%, as defined in any one of the respective embodiments herein;

an elastic modulus, at 200% elongation, higher than 10 MPa, as defined in any one of the respective embodiments herein;

a relaxation lower than 15% change in M200, as defined in any one of the respective embodiments herein; and/or a creep rate lower than 300 mm/3 years, as defined in any one of the respective embodiments herein;

Yerzley elasticity higher than 65%, or higher than 70%, as defined in any one of the respective embodiments herein;

a toughness of at least 4 Joules, as defined in any one of the respective embodiments herein; and a tear resistance of at least 50 N/mm, as defined in any one of the respective embodiments herein.

Any one of the elastomeric composites described herein can further comprise a vulcanizing agent, a vulcanization activator and an accelerator, as commonly practiced in rubbery materials.

The combination of a vulcanization agent, activator and accelerator, and optionally other components as described herein, is also referred to herein and in the art as a vulcanization system.

In some embodiments, the vulcanizing agent is sulfur.

In some embodiments, an amount of sulfur ranges from 1.50 to 2.50 phr.

In some embodiments, an amount of said sulfur is 1.80 phr.

In some embodiments, a vulcanization activator comprises stearic acid and zinc oxide, at amounts commonly used (e.g., 1-5 phr for each).

In some embodiments, a vulcanization activator comprises or consists of 5 phr zinc oxide and/or 2 phr stearic acid.

In some of any of the embodiments described herein, the vulcanization system comprises sulfur in an amount ranging from 1.50 to 2.50 phr, or from 1.50 to 2.0 phr, zinc oxide in an amount of 1.0 to 5.0 phr, or 3.0 to 5.0 phr, and stearic acid in an amount of 1.0 to 5.0 phr, or 1.0 to 3.0 phr.

In some of any of the embodiments described herein, the vulcanization system comprises sulfur in an amount of 1.80 phr, zinc oxide in an amount of 5.0 phr and stearic acid in an amount of 2.0 phr.

The accelerator (also referred to as accelerant) can be any suitable accelerator or a combination of accelerators practiced in rubbery materials and/or described herein.

Exemplary accelerators comprise sulfenamide, guanidine, thiuram and/or thiazole compounds.

Exemplary accelerators comprise benzothiazole-containing accelerators such as, for example, MBS; thiuram-containing accelerators such as, for example, TMTM; and guanidine-containing accelerators such as, for example, DPG, and any combination thereof.

Exemplary accelerators comprise MBS, DPG and/or TMTM.

In some of any of the above-described embodiments, the accelerator comprises a mixture of MBS, DPG and/or TMTM.

In some of any of the above-described embodiments, in such a mixture, each accelerator is in an amount ranging from 0 to 2 phr, including any subrange and/or value therebetween.

In some embodiments, an amount of DPG is from 0.1 to 1.5 phr, for example, from 0.5 to 1.5 phr (e.g., 1.2 phr).

In some embodiments, an amount of DPG is from 0.1 to 1 phr, for example, from 0.2 to 0.6 phr (e.g., 0.4 phr, 0.5 phr, 0.55 phr).

In some embodiments, an amount of TMTM is from 0 to 1 phr, for example, 0.2 to 0.5 phr (e.g., 0.3 phr). In some embodiments, the accelerator does not include TMTM.

In some embodiments, an amount of MBS is from 0.2 to 2 phr, for example, 1 phr to 2 phr (e.g., 1.8 phr).

In some embodiments, the accelerator comprises 1.80 phr MBS and 1.2 phr DPG.

In some embodiments, the accelerator comprises 1.80 MBS and 0.4-0.6 phr DPG.

In some of the above embodiments, the accelerator further comprises TMTM, in an amount of 0.3 phr.

In any of the above-described embodiments, the elastomeric composite (or the vulcanization system) further comprises processing aids, plasticizers and/or retarders. Such agents are desired for facilitating processing the composite (e.g., by extrusion) and/or for contributing to the desired mechanical performance of the composite.

The amount and type of such agents, as well as of the vulcanization agent and accelerants, in some embodiments, is selected so as to achieve desired rheological properties, such as scorch time, mV and the like, for facilitating processing, while not compromising, and optionally contributing to, the mechanical performance of the composite, as defined herein.

Suitable plasticizers can be, for example, DOS or plasticizers of the Cumar family (coumarone indole resins). Any other plasticizers known as useful in the elastomeric industry are also contemplated.

In some embodiments, an amount of the plasticizer is from 0.5 to 2 phr, for example, from 1 to 2 phr (e.g., 1.5 phr), including any subranges and values therebetween.

Suitable retarders can be, for example, PVI. Any other retarders known as useful in the elastomeric or rubber industry are also contemplated.

A suitable amount of a retarder can be from 0.5 to 1.5 phr (e.g., 1 phr), or from 0.05 phr to 2 phr, or from 0.05 phr to 1 phr, or from 0.05 phr to 0.5 phr, or from 0.1 to 0.5 phr, or from 0.1 to 0.3 phr (e.g., 0.2 phr), including any subranges or values therebetween.

Suitable processing aids can be, for example, soap-like materials, such as fatty-acid soaps or soaps of other hydrophobic materials. Exemplary processing aids are zinc soaps of fatty acids or fatty acid-esters. Calcium salts and zinc-free agents are also contemplated. Any processing aid useful in the elastomer or rubber industry is contemplated.

A "processing aid" is also referred to herein and in the art as "processing agent" or "processing aid agent".

Exemplary processing aids are the commercially available Struktol WB16 and Struktol ZEH or ZEH-DL, or any commercially available or equivalent thereof.

Struktol ZEH or ZEH-DL are processing aids that may also act as activators in a vulcanization system.

In some of any one of the embodiments described herein, an amount of the processing aid ranges from 1.0 to 5.0 phr, or from 2.0 to 5.0 phr, or from 3.0 to 5.0 phr, or from 4.0 to 5.0 phr.

In exemplary embodiments, the processing aid comprises Struktol WB16 in an amount of 3.0 phr, and Struktol ZEH is an amount of 1.3 phr, whereby any commercially available or other equivalent of these agents is contemplated.

It is to be noted that the composition of the vulcanization system in any one of the elastomeric composites described herein may affect the mechanical characteristics of the composite, and that by manipulating the type of amount of the components of the vulcanization system (namely, the vulcanization agent, activator, accelerator, plasticizer, retarder and processing aid), control of the final characteristics of the elastomeric composite can be achieved.

In some of any one of the embodiments described herein for an elastomeric composite as described herein, which comprises natural rubber (mainly) as an elastomer, a filler and a nanofiller, the elastomeric composite may further comprises a vulcanization system which comprises:

Sulfur, in an amount as described herein in any one of the respective embodiments;

Zinc oxide and stearic acid, in an amount as described herein in any one of the respective embodiments;

A mixture of accelerators, the types and amounts of which are as described herein in any one of the respective embodiments;

A plasticizer, in an amount and/or type as described herein in any one of the respective embodiments;

A retarder, in an amount and/or type as described herein in any one of the respective embodiments; and A processing aid, in an amount and/or type as described herein in any one of the respective embodiments.

Exemplary elastomeric composites as described herein comprise a vulcanization system which comprises:

Sulfur—about 1.80 phr;
Zinc oxide—about 5.0 phr;
Stearic acid—about 2.0 phr;

An accelerator which comprises at least a benzothiazole and a guanidine-type accelerators, and optionally a thiuram-type accelerator, wherein an amount of a benzothiazole accelerator (e.g., MBS) is about 1.8 phr; and an amount of the guanidine-type accelerator (e.g. DPG) is about 0.4-0.6 phr; and an amount of the thiuram-type accelerator, of present, is about 0.1-0.3 phr;

A retarder (e.g. PVI)—about 0.2 phr;

A plasticizer (e.g., Cumar 80)—about 1.5 phr; and

Processing aids which comprise agents such as Struktol WB 16 and Struktol ZEH—about 3.0 phr and about 1.30 phr, respectively.

In some embodiments, the above-described vulcanization system is included in an elastomeric composite that comprises 30 phr carbon black, and 17 phr modified nanofiller which includes nanoclay in association with an antioxidant and a silyl-containing compounds as described herein (e.g., RRA 206-2).

In some of any one of the embodiments described herein, an elastomeric composite as described herein further comprises a silyl-containing compound as described herein. An exemplary silyl-containing compound is a mercaptosilane or mercaptosiloxane, as described herein (e.g., Si69).

An amount of the silyl-containing compound can range from about 1.0 to 5.0 phr, or from about 1.5 phr to 5.0 phr, or from 1.5 phr to 3.5 phr The above-described elastomeric composites are characterized by any one of the characteristics described herein, including any one of the embodiments thereof.

Additional ingredients in the elastomeric composite can be selected from dispersants, coloring agents and reinforcing agents (such as reinforcing fibers).

Any of the elastomeric composites as described herein can be prepared by any method known in the art, including any type of extrusion and any type of molding.

In some embodiments, the elastomeric composites are prepared by mixing all of its components, in any order.

In some embodiments, the elastomeric composites are prepared by adding the activator(s) as described herein, after all other components are mixed.

In some embodiments, the elastomeric composites are prepared by first mixing an elastomer with a nanofiller and a filler, then adding all components of a vulcanization system except from the activator(s), and then adding the activator(s) (e.g., zinc oxide and stearic acid).

Any of the elastomeric composites as described herein can be shaped as desired, so as to produce, for example, articles (e.g., rubbery articles) shaped as cylindrical bodies (e.g., sleeves), sheets, or as open or closed bodies such as spherical bodies, triangular bodies, oval, concave and any other geometric or irregular shaped bodies, and the like.

In some embodiments, the elastomeric composites as described herein are beneficially used for providing articles (e.g., sleeves) having a low thickness, of, for example, lower than 3 mm (e.g., 2 mm), which are capable of exerting a compressive pressure of at least seven atmospheres (e.g., 7, 8, 9, and even higher pressures).

In some embodiments, such articles are capable of maintaining such pressure for a time period of at least one year, due to the low relaxation of the elastomeric composite.

In some embodiments, such articles are capable of exerting the indicated compressive pressure when expanded (elongated) by more than 200%, or more than 300% or more than 400% (e.g., 450%).

According to some embodiments of the present invention, there are provided articles containing any of the elastomeric composites as described herein, such as the articles described herein.

According to some embodiments of the present invention, there are provided devices containing the articles as described herein.

An exemplary such device is described in WO 2012/117401, which is incorporated by reference as if fully set forth herein.

Hence, according to an aspect of some embodiments of the present invention, there is provided a device as described in WO 2012/117401, in which the elastomeric material as described therein is an elastomeric composite as described in any one of the embodiments described herein.

According to an aspect of some embodiments of the present invention, there is provided a device as described in WO 2012/117401, in which the elastomeric material described therein comprises organomodified nanoclays, such as described in U.S. patent application Ser. Nos. 13/546,228 and 13/949,456.

The following describes exemplary illustration of a device for providing a compressive force for material delivery, for example for replacement of aerosol cans or other material dispensing devices. In some embodiments of the present invention, any one of the herein described elastomeric composites can be used as or within an elastomeric material in such a device. In some embodiments, any one of the elastomeric composites which comprise a modified nanoclay as described herein can be used as or within an elastomeric material in such a device.

Exemplary Devices Comprising an Elastomeric Composite:

In an exemplary embodiment of the invention, an enhanced elastomeric material as described herein (e.g., elastomeric materials with or without nanomaterials added thereto and/or nano materials added to other elastomeric materials) are used as part of a device which provides motive force to a dispensed material. In an exemplary embodiment of the invention, the dispensed material is provided in a chamber, optionally within a bag. In an exemplary embodiment of the invention, the chamber is caused to contract n volume and/or change n shape due to the force applied by the contraction of an elastic material, for example, a material as described herein. One example of such a chamber is a sleeve (e.g., as described with reference to many of FIGS. 1-17) which contracts radially to dispense a material from a bag located in a lumen of the chamber. In some of such examples, an elastic material is formed into a tube and stretched to fit around a bag with a valve and filled (or later filled) with a material to be dispensed. It should be appreciated that the materials as described herein can be used for other dispenser designs.

When pressurizing a bag of deliverable material by means of an elastic sleeve 200 (e.g., FIG. 1), it can be useful to have a sleeve with a high elasticity modulus, providing a high energy storage density. In some embodiments, threads or narrow bands or other connecting or elastic materials may be added to a rubber or other material to enhance elastic characteristics of a sleeve.

In some embodiments, the device as described herein comprises:

a) a flexible bag for containing said material and a valve positioned at a first extremity of the bag and operable to control exit of the material from the bag, as, for example, described herein; and b) an elastic sleeve, as described herein, being at most 2 mm thick, which comprises a lumen, the sleeve being fitted over the bag and containing the bag within the lumen;

the sleeve and the bag being sized and positioned so that elastic contraction forces in the sleeve exert a compressive pressure of at least seven atmospheres on the bag when the bag is filled with the material.

In some embodiments, the volume of the sleeve lumen is at least 250% greater when the bag is filled than when the bag is empty.

In some embodiments, the volume of the sleeve lumen is at least 400% greater when the sleeve is exerting the at least seven atmospheres of pressure on the bag than when the sleeve is unexpanded and the lumen is empty.

In some of any of the embodiments described herein, the sleeve is constructed of an elastic material (also referred to herein and rubber or rubbery material) or an elastomeric composite, as described and defined herein.

In some embodiments, threads or narrow bands or fibers or other connecting or elastic materials may be added to a rubber or other material to enhance elastic characteristics of a sleeve. In some embodiments, nano-particles of clay or other materials are added to rubber used to construct sleeve 200. In general, rubbers having high ultimate elongation have low modulus. In some embodiments, a reinforcing material is incorporated in a rubber, to increase rigidity of the rubber while enabling a desired level of elongation (elasticity). In some embodiments nano-particles, also referred to herein as nanofillers, are used as the reinforcing material.

Selection of quantity and type of nanofillers and/or other reinforcing materials, and methods of processing them, may depend on desired performance characteristics and/or thickness or other desired physical characteristics of an apparatus designed for a particular application.

Sleeves Made of Elastomeric Composites Comprising Nanoclays being in Association with an Amine-Containing Compound that Exhibits an Antioxidation Activity:

In some of any of the embodiments described herein, the sleeve is made of an elastomeric composite that comprises an elastomer and a modified nanoclay or a composition-of-matter comprising the nanoclay, as described herein for any one of the embodiments of a nanofiller.

In some of any of the embodiments described herein, the sleeve is made of an elastomeric composite that comprises an elastomer and a modified nanoclay or a composition-of-matter comprising the nanoclay, wherein the modified nanoclay or a composition-of-matter comprising the nanoclay is as described in any one of the embodiments described herein for a nanoclay hybrid, or nanoclays being in association with an amine-containing compound that exhibits an antioxidation activity.

For example, the modified nanoclay is such that is treated with compounds that are typically used as antioxidants, and optionally further treated with a mercaptosilane, such as mercaptosiloxane, as described herein in any one of the respective embodiments. Such nanoclay hybrids are advantageous by for example, imparting higher tear and/or abrasion resistance to elastomeric composites containing same and by reducing ageing of the elastomeric composites. Further manipulations in the process of preparing nanoclay hybrids were also shown to improve performance of the nanoclays, when incorporated in an elastomeric composite.

In some embodiments, the amount of the modified nanoclays or of a composition-of-matter containing same in the elastomeric composite ranges from 5 phr to 50 phr, preferably from 5 to 30 phr, or from 5 to 25 phr, or from 7.5 to 25 phr, or from 10 to 25 phr, or from 7.5 to 15 phr, or from 10 to 15 phr. Any value therebetween is contemplated.

In some embodiments, the elastomeric composite is devoid of a filler such as carbon black.

In some embodiments, the elastomeric composite comprises silica as a filler. In some of these embodiments, the silica is included in the composition-of-matter as described herein. In some embodiments, the elastomeric composite is devoid of additional silica.

By "devoid of" it is meant that the amount of the filler is less than 1 weight percents or one phr, less than 0.1 weight percents or phr, and even less than 0.01 weight percents or phr.

In some embodiments, an elastomeric composite as described herein comprises a filler such as carbon black, yet, an amount of the filler is lower than acceptable by at least 20%, for example, by 20%, by 30%, by 40% and even by 50% or more.

In some embodiments, an elastomeric composite that comprises a lower amount of a filler as described herein exhibits substantially the same performance as an elastomeric composite with an acceptable filler content.

That is, for example, considering an averaged acceptable CB content of 30 phr, an elastomeric composite as described herein exhibits the same performance when comprising 30 phr, 15 phr and even 10 phr or lower amount of CB.

In another example, if an elastomeric composite that is designed to have a certain tear resistance comprises 50 phr CB, when such an elastic composite comprises a composition-of-matter as described herein, it exhibits the same tear resistance, yet comprises 40 phr, or 30 phr, or 20 phr or even a lower amount of CB.

In exemplary embodiments, elastomeric composites as described herein, which comprise SBR as the elastomer, and which are devoid of CB or any other filler that is added to the elastomeric compositions, exhibit one or more of the following exemplary mechanical properties:

Shore A hardness higher than 50;
Tensile strength higher than 10 MPa;
Elongation of at least 400%, or at least 450%;
Modulus at 200% elongation of at least 3 MPa, or at least 3.5 MPa;
Tear resistance of at least 30 N/mm; and
Elasticity (Yerzley) of at least 75%.

In exemplary embodiments, elastomeric composites as described hereinabove in which silica is added to the composition-of-matter, exhibit one or more of the following exemplary mechanical properties:

Shore A hardness higher than 50;
Tensile strength higher than 11 MPa;
Elongation of at least 400%;
Modulus at 200% elongation of at least 4 MPa;
Tear resistance of at least 40 N/mm; and
Elasticity (Yerzley) of at least 75%.

In further exemplary embodiments, elastomeric composites as described hereinabove, which further include CB, in an amount of 15 phr, exhibit one or more of the following exemplary mechanical properties:

Shore A hardness of about, or higher than, 70;
Tensile strength higher than 20 MPa;
Elongation of at least 400%;
Modulus at 200% elongation of about, or higher than, 10 MPa;
Tear resistance of at least 50 N/mm, or at least 55 N/mm, or at least 60 N/mm; and
Elasticity (Yerzley) of at least 75%.

In some embodiments, the elastomeric composite comprises SBR as the elastomer.

Other suitable elastomers include, but are not limited to, an isoprene elastomer, a polybutadiene elastomer, a butadiene acrylonitrile elastomer, an EPDM elastomer, a natural rubber, an ethylene norbornene elastomer, and any combination thereof. Any other elastomer is also contemplated.

The performance of elastomeric composites comprising such elastomers and a composition-of-matter as described herein, can be improved similarly to the above-described improvement of an SBR elastomer.

Any of the elastomeric composites as described herein can be prepared by methods known in the art of elastomers, including, for example, plate molding and extrusion (e.g., with steam). In general, elastomeric composites as described in these embodiments were shown to exhibit improved properties over elastomeric composites containing a similar content of other modified nanoclays (e.g., devoid of an antioxidant). Exemplary improvements are demonstrated in elastic properties such as rebound (Yerzley resilience, tangent), tear resistance and ageing properties. In addition, lighter products are obtained for the same degree of reinforcement, as compared to elastomer composites with prior art components.

For example, it has been demonstrated that elastomeric composites containing the herein disclosed modified nanoclays exhibit very high tear resistance, even higher than 60 N/mm. Elastomers, which do not contain NCs, and which are designed to have such high tear resistance, typically contain as much as 50-60 parts CB (carbon black), yet, may still fail to accomplish the desired mechanical properties.

In contrast, in some of these elastomeric composites as described herein, replacing up to 35 parts of the CB or about 30 phr silica, with merely about 15-20 parts NCs was found to achieve the same strength.

Sleeves Made of Elastomeric Composites Comprising Natural Rubber and a Nanofiller:

In some of any of the embodiments described herein, the sleeve is made of an elastomeric composite that comprises an elastomer that comprises natural rubber, which have been manipulated so as exhibit improved mechanical performance (e.g., high elastic modulus and low relaxation, namely, long-lasting high elastic modulus), while maintaining high elasticity, and while avoiding the use of high amount of fillers such as carbon black.

Such elastomeric composites can be made from natural rubber (mainly), which include a filler such carbon black, in an amount lower than 50 parts (or phr), nanofillers such as nanoclays, preferably modified nanoclays, and which exhibit long-lasting high elastic modulus, while maintaining high elasticity. Such elastomeric composites can be further manipulated by selecting type and amounts of the nanofillers, and other components of elastomeric composites, such as, but not limited to, vulcanizing agent (e.g., sulfur), combination of accelerators, plasticizers, retarders, and processing aids, so as to achieve desirable rheological and mechanical properties, as described in any one of the embodiments described herein for elastomeric composites comprising natural rubber.

Elastomeric composites according to some embodiments of the present invention comprise nanofillers as described herein. In general, elastomeric composites which comprise nanofillers are also referred to herein and in the art as nanocomposites or elastomeric nanocomposites, as defined herein.

Any of the elastomeric composites as described herein are optionally manipulated and/or shaped so as to construct a sleeve as described herein.

Further Embodiments of the Sleeve and/or a Device Containing Same:

In some embodiments, any one of the elastomeric composites as described herein are beneficially used for constructing a sleeve as described herein, having a low thickness, of, for example, lower than 3 mm (e.g., 2 mm), which is capable of exerting a compressive pressure of at least seven atmospheres (e.g., 7, 8, 9, and even higher pressures), as described herein.

In some embodiments, such articles are capable of maintain such pressure for a time period of at least one year, due to the low relaxation of the elastomeric composite.

In some embodiments, such articles are capable of exerting the indicated compressive pressure when expanded (elongated) by more than 200%, or more than 300 5 or more than 400% (e.g., 450%).

Some embodiments of the present invention comprise a device for dispensing a material under pressure, the device comprising a flexible bag for containing the material and a valve positioned at a first extremity of the bag and operable to control exit of the material from the bag, and an elastic sleeve having an average thickness of at most 2 mm and comprising a lumen, the sleeve fitting over the bag and containing the bag within that lumen. In some of these embodiments the sleeve and bag are sized and positioned in such a way that elastic contraction forces in the sleeve exert a compressive pressure of at least seven atmospheres on the bag when the bag is filled with the material.

Optionally, the sleeve is constructed of any one of the elastomeric composites as described herein.

In some of these devices, volume of the sleeve lumen is at least 250% greater when the bag is filled than when the bag is empty. In some of these devices, volume of the sleeve lumen is more than 400% greater when the sleeve is exerting seven or more atmospheres of pressure on the bag than when the sleeve is unexpanded and the lumen is empty.

In some embodiments a liquid or paste or foam or powder or mixture or other fluidly deliverable substance is dispensed under pressure provided by an elastic sleeve used to compress a bag comprising or connected to a valve, which bag contains the material to be dispensed. Compressive pressure from the sleeve pressurizes material in the bag, which consequently flows out of the bag under pressure when the valve is opened.

Some embodiments are aerosol dispensers and provide an alternative to prior art aerosol containers by providing a propellant-free device which stores contents at pressures appropriate for aerosol, and dispenses them through a valve. Some embodiments do not require tough, metallic, cylindrical containers: the bag+sleeve combination, which may optionally be placed within an external container for distribution and sale, does not subject that container to pressure. In some aerosol embodiments compressive pressure generated by the device is greater than 6 bar when the device is full (for example between 6.5 and 9 bar, for example between 7 and 8.5 bar), and is less than 5 bar (e.g. between 2-4 bar) when the device is empty.

Some embodiments provide a felicitous means for dispensing food, cosmetics, creams, ointments, medicines, IV transfusion materials, and other materials, under low pressure (e.g. slightly above ambient atmospheric pressure, or between 1-2 bar, 2-3 bar or 2-4.5 or 2-6 bar), and/or at low delivery rates.

It is anticipated that embodiments comprising a bag+sleeve combination will be used in markets for (to dispense), inter alia:

self-dispensing food containers (e.g. for mayonnaise, ketchup, mustard, sauces, desserts, spreads, oil, pastry components), containers for cosmetics such as creams and lotions, skin care products and hair gels, industrial/technical applications such as paints, lacquers, glues, grease and other lubricants, sealants, pastes and other viscous materials, personal care products such as shaving, shower and shampooing gels, toothpaste, liquid soap and shampoo, sun care products, household products such as polishes and glass, bathroom and furniture and other cleaners, insecticides, air fresheners, and for plant irrigation, pharmaceutical and medical products such as medications (including dosage packages) and ointments, oral and nasal sprays, intravenous and intra-arterial transfusion of blood and/or fluids.

All the above are considered to be within the scope of some embodiments of the invention, however the above list is not to be considered limiting.

Some embodiments provide pressures of between 8-20 bar, useful for example in fire extinguishers and other specialized devices.

Some embodiments of the invention provide devices for dispensing material under pressure which are simpler and cheaper to make, lighter, require less expensive components, enable greater variety of shapes and sizes, can be adapted to a greater range of products, and are more ecologically sound than prior art devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention, in some embodiments thereof, relates to methods and devices for dispensing a material under pressure.

In some embodiments a section of an extruded rubber-based sleeve is used. Other mechanisms for producing compressive (i.e. centripetal) pressure on a bag contained within a compressing device are presented herein, and all sleeves and all such other mechanisms are included in the term "sleeve" as used herein.

For simplicity of exposition, in some cases, reference is made to the "top" and "bottom" of a dispensing device or a component thereof. As used herein, "top" refers to a portion of a device near the valve of the device, and "bottom" refers to the opposite end of the device, so that the "top" and "bottom" of the device are defined with respect to the device structure without reference to the device's temporary position in space.

In some embodiments the bag and valve are comprised in a "Bag-on-valve" (herein "BOV") module, a module well known in the art and used in many Dual Compartment aerosol product dispensers. In some embodiments, the well-known "Bag-in-can" (herein "BIC") structure is used.

Figure 2:
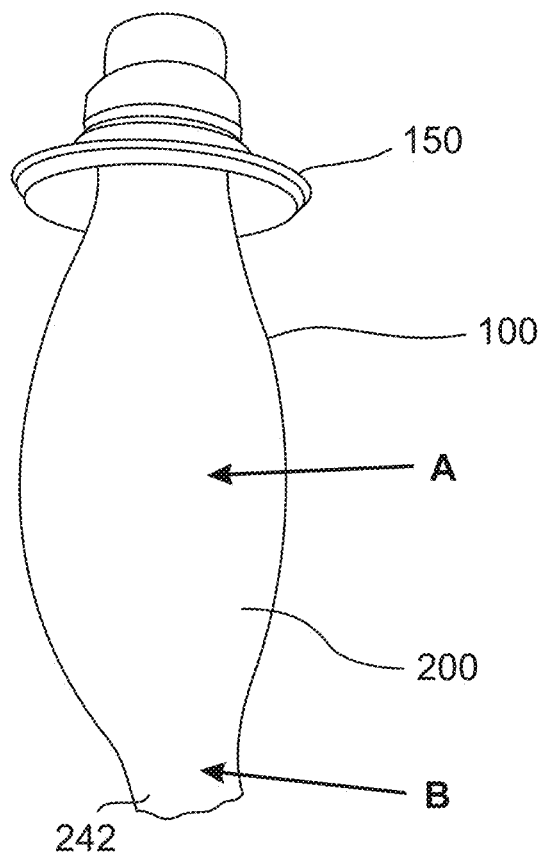

Exemplary Sleeve/Bag Module for Pressurizing Dispensable Materials:

Referring now to the drawings, FIGS. 1 and 2 are photographs of an exemplary embodiment, a pressure dispenser 100 (also called a "delivery module 100" herein) for dispensing fluidly dispensable materials under pressure, according to an embodiment of the present invention. In some embodiments discussed below, dispenser 100 placed within and connected to an external container. In other embodiments discussed below, dispenser 100 may be provided with only a consmetic external layer. In some embodiments dispenser 100 may be sold and used without any external covering.

FIG. 1 presents at position 'A' a flexible bag 110 attached to a valve 120. Bag 110 is a bag or pouch capable of holding a material to be dispensed, and capable of being connected to a valve. Bag 110 will generally be constructed of a substance not expected to interact chemically with whatever material it is expected to hold and to dispense.

In the exemplary embodiment shown in the figure, bag 110 is shown as a Bag-on-valve combination ("BOV" herein), here labeled BOV 150. BOV 150 is a standard component of aerosol products and is well known in the industry.

A BOV 150 shown in the figure comprises a valve 120 and a valve assembly structure 130 which holds valve 120 and attaches it to bag 110. As shown in the figure, bag 110 is empty and partially rolled upon itself below valve 120. BOV valves generally comprise a spring holding the valve closed. When these valves are pressed against the spring a pathway is opened, enabling pressurized material to flow past the valve. However it is to be understood that other valves known in the art may be used.

Figure 3:
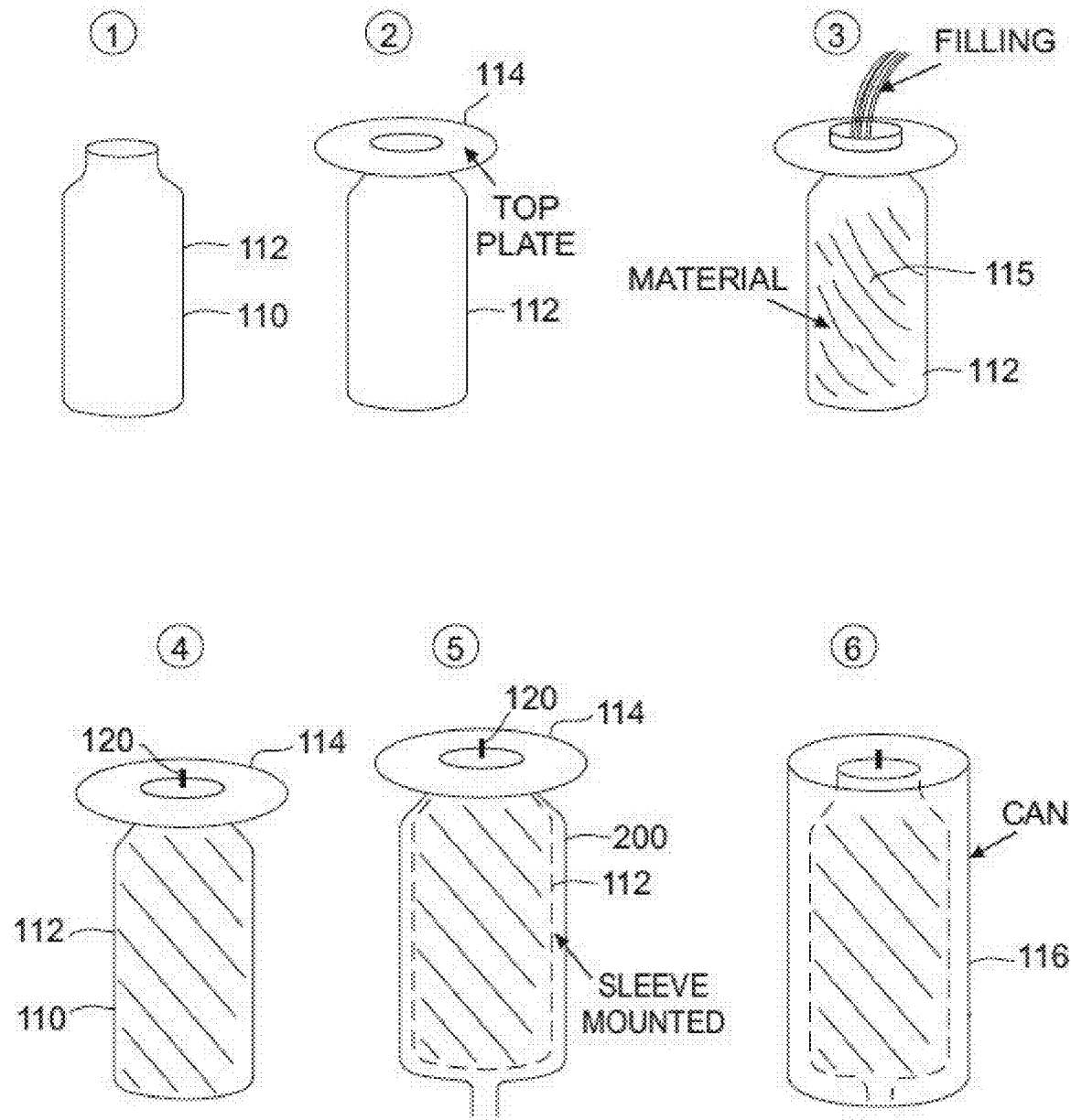

At position 'B' in FIG. 1 an elastic sleeve 200 is presented. In the exemplary embodiment shown in FIG. 1 a cut section of a continuously extruded rubber-based tube is used as sleeve 200. However, the example of sleeve 200 shown in the figure should be considered exemplary and not limiting. Sleeve 200 is not necessarily extruded and not necessarily cut from a longer tube of similar material. Some additional optional constructions of sleeve 110 are shown in FIGS. 2 and 3. In general, sleeve 200 is characterized being sized and shaped to be able to contain bag 110 and to exert pressure on bag 110 when bag 110 is filled with material to be dispensed. In various embodiments discussed in detail below sleeve 200 is open on top and bottom, yet in some optional embodiments sleeve 200 is closed at the bottom. Optionally, sleeve 200 may be of non-uniform thickness or have a non-uniform distribution of other physical characteristics. For example, in some optional embodiments a sleeve 200 might be thinner near the ends, where less force is required.

At position 'C' in FIG. 1, sleeve 200 is shown enclosing bag 110, thereby forming a pressure dispensing module 100. According to manufacturing processes discussed below, bag 110, before or after being inserted into sleeve 200, may be filled with a dispensable material. Once bag 110 is filled and sleeve 200 is in place, sleeve 200 exerts a centripetal pressure on bag 110 by virtue of its elasticity. In some embodiments sleeve 200 exerts centripetal pressure on bag 110 even when bag 110 is empty, and sleeve 200 must be stretched to some degree in order for bag 110 to be inserted therein.

FIG. 2 shows dispensing module 100 after bag 110 has been filled with a material to be dispensed. In some embodiments bag 110 is filled through valve 110, dispensable material being optionally forced under pressure into bag 110 after bag 110 is positioned within sleeve 200. As may be seen in the figure, sleeve 200 is stretched to give place to material contents which have been inserted in bag 110, and which are being held under pressure, with bag 110 holding the contents and sleeve 200 applying the pressure. FIG. 2 is an example of a BOV implementation shown without a container so as to make visible the shape of sleeve 200 when a BOV bag within is filled. In some embodiments and in normal use, assembly of a BOV aerosol comprises placing the BOV bag within a sleeve 200 (methods for doing this are discussed below), optionally placing the bag/sleeve combination in a container (such as a prior art type of aerosol container), and then filling bag 110 through its valve under pressure, precisely as is done with prior art aerosol products.

In some embodiments, a bag 110 may be filled, at least in part, before bag 110 is subjected to pressure from sleeve 200. For example, FIG. 3 is a simplified schematic of an alternative filling scheme, using components known in the industry as "Bag in can", or "BIC", according to an embodiment of the invention. Filling stages 1-6 are shown in the figure.

Stage 1 shows an empty BIC pouch 112, a form of bag 110.

Stage 2 shows pouch 112 attached to a top plate 114, which will become the top of an aerosol can.

Stage 3 shows pouch 112 being filled with a material 115 to be dispensed. (Gravity or low-pressure filling is often used in BIC manufacture.)

Stage 4 shows a valve 120 added to top plate 114.

Stage 5 shows a sleeve 200 positioned around filled pouch 112. (Methods for accomplishing this are presented below.)

At stage 6, pouch 112 and sleeve 200 are together introduced into a can or canister 116, which is then attached to top plate 114, completing the assembly process.

Typical (non-limiting) dimensions for an exemplary embodiment:

Sleeve 200 length: 60-260 mm
Diameter of lumen 250 before expansion: 4-8 mm
Thickness of sleeve 200 before stretching: about 2-3 mm
Diameter of lumen 250 after stretching (i.e. after filling of bag 110): 30-70 mm (BOV and BIC)

Figure 4:
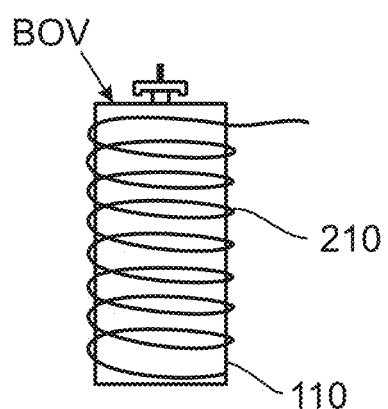
Figure 5:
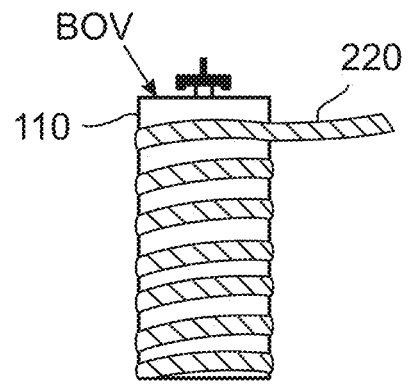

Alternative Constructions for Sleeve 200:

FIGS. 4 and 5 are simplified schematics showing alternative methods of construction of sleeve 200, according to an embodiment of the present invention. In FIG. 4, at least one spring 210, optionally of metallic or plastic construction, is used to compress a bag 110 (optionally, a BOV 150). Spring 210 may be a helical spring expanded beyond its natural resting position, and which therefore exerts a centripetal force on bag 110 so long as it is so expanded. This configuration is shown in FIG. 4. Alternatively spring 210 may be formed of geometrical shapes (for example, squiggles and polygons) arranged circumferentially and having a tendency to contract and thereby apply radial pressure to a volume within the spring(s), such as configurations used in medical stents.

In FIG. 5, a helical elastic band 220 is wrapped under tension around a bag 110, optionally from top to bottom. Elastic qualities of elastic band 220 cause it to apply centripetal pressure to bag 110 in a manner similar to that of solid sleeve 200 shown in FIG. 2.

It is to be noted that FIGS. 1-5 present several examples of types of sleeve 200. These examples are exemplary only, and should not be considered limiting. In some embodiments sleeve 200 may be an extruded rubber tube, or a rubber tube made in some manner other than extrusion, and/or may be made of other elastic materials (for example Silicone, Polyethylene, EPDM, EP, SBR, Natural Rubber, and similar materials) or a combination of materials, may comprise nano-particles as discussed below, or may be constructed of one or more springs 210 or one or more elastic bands 220, or comprise a combination of these and/or other elements capable of containing a bag 110 and exerting and sustaining an elastic force towards bag 110 while at least partially surrounding it. In some optional embodiments, it is contemplated that a sleeve 200 may be presented in an airtight container (closed at ambient pressure or at a slightly higher pressure, for example a pressure between 1-1.5 bar) which will present some resistance to shocks or pressure from outside sources. Most of the exemplary embodiments presented by the figures herein comprise a sleeve 200 cut to a selected length from a long tube of continuously extruded rubber, but this embodiment is exemplary and not limiting, and the word "sleeve" and the designation "sleeve 200" should be understood to include all embodiments mentioned in the present paragraph, and all embodiments which are physically similar or have similar effects.

Exemplary Pressure Ranges:

With reference to the amount of pressure made available by sleeve 200, for some uses, called "low pressure" applications herein, such as for example, dispensers for food or food components, cosmetics, medicines, salves, creams, ointments, glue, toothpaste and the like, a maximum pressure of 1.5-4 bar when bag 110 is full may be appropriate. Optionally, for aerosol applications, pressure in the neighborhood of 7-8 bar when bag 110 is full is considered appropriate, with a minimum pressure optionally falling two between 2-5 bar as the device is emptied. For some applications, higher pressures are indicated: between 10 and 20 bar might be indicated for a fire extinguisher, for example. All such pressure ranges, and indeed any pressure above room pressure and up to 20 bar or more may be appropriate as embodiments of the present invention, though those specific ranges are not to be considered limiting. Embodiments delivering a material at low pressure but at a fast rate, or at high pressure but at a slow rate, are also contemplated.

Providing Residual Pressure as Bag Empties:

With reference to the minimum pressure provided by sleeve 200, in some embodiments little or no significant pressure is applied by sleeve 200 to bag 110 unless and until bag 110 is filled or partially filled with a dispensable material 115. However, in some embodiments, sleeve 200 provides a minimum pressure, for example a pressure of between 1.5 and 4.5 bar, even when bag 110 is empty, and that pressure rises when bag 110 is filled. One possible purpose of this minimum pressure, which is the residual pressure that remains when bag 110 empties out during use, is to force substantially all or almost all of contents 115 to exit bag 110 as bag 110 empties out. Under that residual pressure, free-to-flow contents of bag 110 will find their way to valve 120, if valve 120 is held open and every other flow direction encounters a residual pressure of somewhere between 1.5 and 4.5 bar. It should be noted that this fact constitutes a potentially significant advantage of low pressure embodiments over prior art low-pressure systems, where the difficulty of getting the last bit of contents out of, say, a ketchup bottle or a toothpaste tube, are well known to all.

For many embodiments it may be considered desirable to minimize the difference between maximum and minimum pressures, but in general these values will be chosen with specific uses and materials in mind. Some exemplary ranges include max/min pressure values of about 8/3 or 7/3 or 9/3.5, the choice for a particular application depending, among other considerations, on the viscosity of the material and the delivery rate that is required. A pressure of 8 bar, diminishing to 3 bar as bag 110 empties, may be considered to provide adequate performance for some aerosols.

Attachment of Sleeve to Bag or 'Boy':

In some embodiments a first end portion of a sleeve is positioned so that it surrounds a portion of the BOV valve assembly structure 130 (or any other structure that comprises a valve and attaches that valve to a bag), so that pressure applied by the sleeve end portion on the valve assembly structure binds sleeve, valve, and bag to each other. In some embodiments that pressure and induced friction between sleeve and valve assembly structure 130 suffice to hold the two together, though some movement may take place during construction or operation. This arrangement comprises a method for mounting sleeve and BOV (or other bag and valve module) together, and is convenient for manufacture because no gluing, welding, screwing, crimping, nor other similar methods of attachment are needed. (Optionally, a pressure adhesive can be used.)

Figure 6:
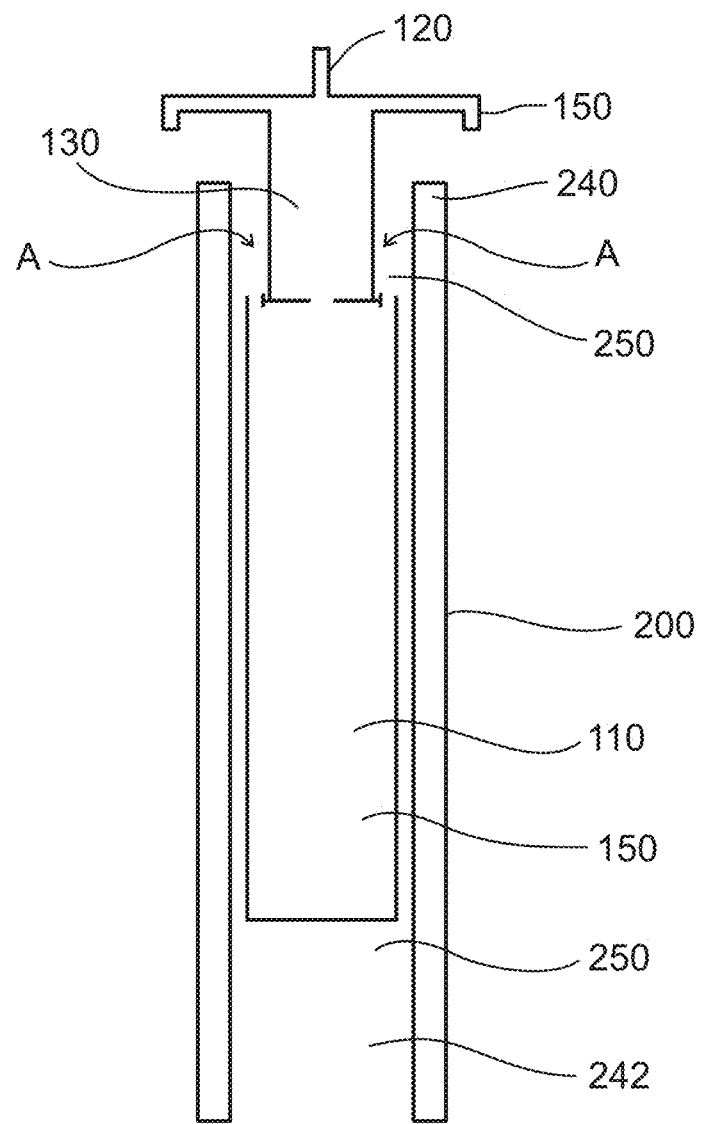

FIG. 6 is a simplified schematic showing details of such a method for mounting a sleeve 200 and bag 110 (optionally a BOV 150) so that they are anchored to each other, according to an embodiment of the present invention. FIG. 6 shows a valve assembly structure 130 of a BOV or of any other configuration combining a valve 120 with a bag 110. Valve assembly structure 130 contains valve 120, connects to bag 110, and possesses a surface which can come in contact with a top end region 240 of sleeve 200. In some embodiments, as discussed in detail herein below, during manufacture of dispenser 100 sleeve 200 is caused to expand so that bag 110 may be inserted therein. In some embodiments valve assembly structure 130 is also introduced into internal lumen 250 of sleeve 200. On the figure, for clarity, a space is shown at positions 'A' between valve assembly structure 130 and top end 240 of sleeve 200, as might be the case during insertion of bag 110 and structure 130 into sleeve 200. However, once insertion is completed and sleeve 200 is cause to relax, sleeve 200 optionally contracts around bag 110 and top end 240 of sleeve 200 optionally contracts around valve assembly structure 130, effectively grasping structure 130 and binding structure 130 and sleeve 200 together. (If desired, a spacer can optionally be added between bag and sleeve or between sleeve and valve assembly structure, to ensure a desired minimal pressure and/or contact quality.)

In some embodiments this optional method of construction can be significant, because of its simplicity: in some embodiments sleeve 200 is caused to expand, bag 110 and structure 130 are inserted, and sleeve 200 contracts, and no crimping, gluing, welding, snapping, screwing, or other complex forms of attachment are necessarily required.

Providing a Sleeve Longer than a Bag Contained in the Sleeve:

In some embodiments the sleeve is longer than the bag, so that when a top end of a sleeve is attached to a valve or to a portion of a bag near a valve, the bottom end of the sleeve) extends beyond the end of the bag.

FIG. 6 shows such a configuration. As seen in the figure, "top" end 240 of sleeve 200 (the end which will be near the valve) is positioned near and somewhat above the top end of bag 110, while the 'bottom' end 242 of sleeve 200 (also called "distal end 242") extends well below the bottom of bag 110. For example, in an exemplary embodiment using a bag 110 15 cm long from top to bottom, a sleeve 200 might extend between 1 and 2 cm below the bottom of bag 110.

This configuration may help to provide adequate pressure containment for the pressurized contents of bag 110, despite the fact that sleeve 200 is open at both ends. If sleeve 200 were no longer than bag 110 and open at top and/or bottom, the related top and/or bottom of bag 110 would be unsupported and subjected to a high pressure differential, with highly pressurized contents 115 within bag 110 and no support outside the bag ends. However, as may be seen in the optional configuration shown in the FIG. 6, sleeve 200 extends both above the top of bag 110 and below the bottom of bag 110. Since sleeve 200 is not expanded by pressure from bag 110 at this top and bottom ends, these ends tend to be forced into a somewhat funnel-like configuration, as may be seen in FIG. 2. Material from bag 110 (and in particular the content-empty supporting edges of the bag of a BOV according to standard BOV manufacture) may 'bunch up', folding upon itself within these funnel-like end sections above and below the content-filled portions of bag 110, where they may provide support and strength in these end regions which would otherwise receive less direct support than that received by the sides of bag 110, since sleeve 200 presses directly on the sides of bag 110 but does not press directly on the ends of bag 110 because of the open-ended construction of sleeve 200. In some embodiments wherein a standard BOV bag is used, it is the non-fillable bag material which surrounds the fillable portion of the bag which may bunch up near valve assembly structure 130 and within distal end 242, where it adds sufficient support to enable bag 110 to hold contents pressurized to 7 or 8 bar or higher without danger of a 'blowout'.

(Optional additional methods for providing support for portions of bag 110 at positions near an open end of sleeve 200 include positioning a foam spacer or similar object within the sleeve end, closing or partially closing an and of sleeve 200 by cutting or folding its end, adding an end-cap, and providing a funnel-shaped end portion of bag 110 so that it better conforms to sleeve 200.)

Figure 7A:
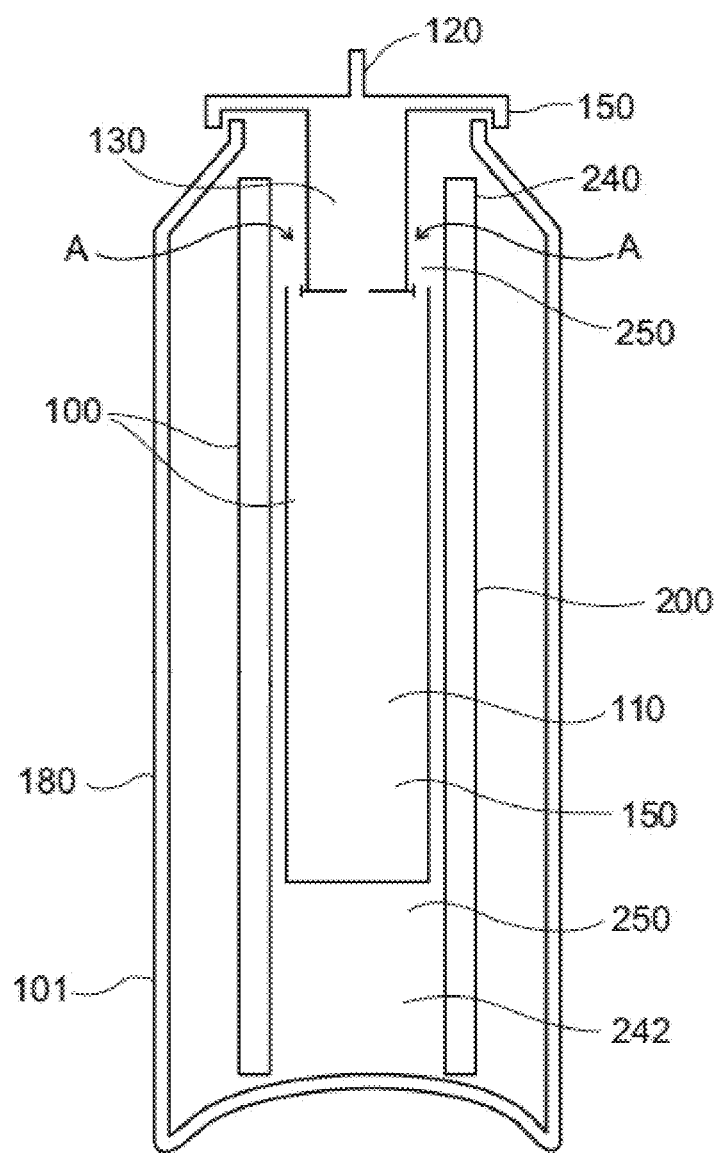

An additional potential advantage of a configuration in which distal end 242 of extends beyond a distal end of bag 110 is shown in FIG. 7A, which is a simplified schematic of a delivery module 100 combined with a container 180 to form a contained dispenser 101 (also called a contained delivery module 101 herein), according to an embodiment of the present invention.

In some embodiments bag 110 and sleeve 200 are contained in and attached to an external container, and the bottom end of sleeve 200 is sized so as to touch (and optionally be supported by) the bottom of that external container, which may optionally be shaped to facilitate this contact. This configuration may immobilize or inhibit movement of the sleeve within the container, and may provide support against gravity for the sleeve/bag combination, which in some embodiments may be filled with 200-500 grams or more of material 115. Without support provided to delivery module 100, bag 110 would be left hanging on the valve assembly, and would be in danger of tearing off that assembly, resulting in catastrophic decompression, if the package were mishandled or subject to sudden acceleration, for example if it were to fall and sharply strike a hard floor.

FIG. 7A shows a configuration which may solve this potential problem. To the configuration of FIG. 6, a container 180 has been added. Note the position of distal end 242 with respect to container 180: in some embodiments, the length of sleeve 200 is adjusted so that distal end 242 can rest on the distal (i.e. the bottom) end of container 180. In this position end 242 provides support for bag 110, whether bag 110 is empty or full. (Note: in FIG. 7A a slight separation is present for clarity of the figure, but it is to be understood that in some embodiments, distal end 242 touches the bottom of container 180 and is supported by it.) This configuration may be contrasted to some configurations of prior art, in which an expandable bag containing content to be dispersed hangs unsupported from its connection near a valve, and swings around within its container without support from beneath it.

Figure 7B:
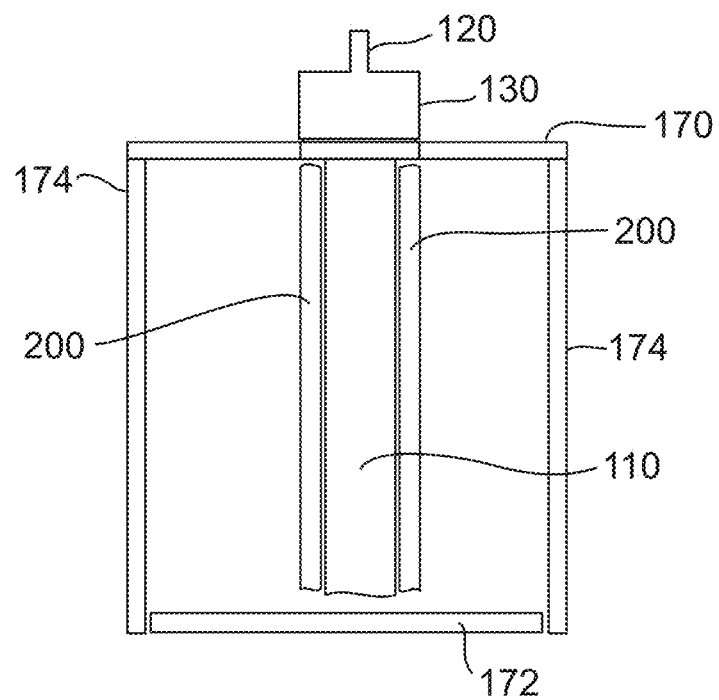
Figure 7C:
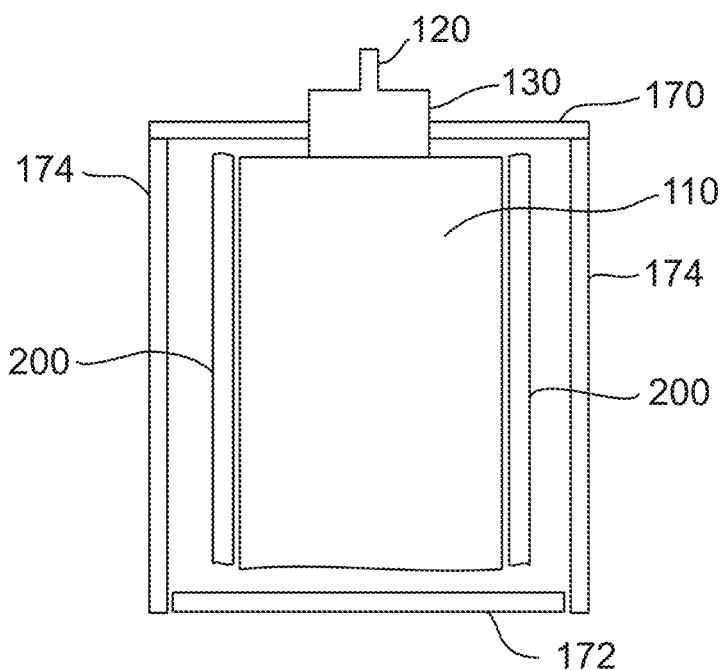

Alternative Embodiments with Sleeve and Bag of Similar Lengths:

FIGS. 7B-7C are simplified schematics of an alternative arrangement for bag and sleeve, according to an embodiment of the present invention. In an embodiment shown in these figures a sleeve 200 has approximately the same length as a bag 110.

FIG. 7B shows bag 110 empty, and a loose or partially contracted sleeve 200 around it. Above bag and sleeve, a top disk 170 is provided, optionally attached to a valve assembly structure 130, or optionally attached to sleeve 200. Below bag and sleeve, a bottom disk 172 is provided, also optionally attached to sleeve 200. Optionally, top disk 170 may be attached to a rod or cable connecting top disk 170 to bottom disk 172. In another option, disks 170 and 172 may optionally be components of or attached to an external container 180.

FIG. 7C shows the same embodiment after bag 110 has been filled, causing sleeve 200 to expand laterally. Top disk 170 and bottom disk 172 are designed to provide adequate support to top and bottom of bag 110 under conditions of the pressure exerted by sleeve 200 on bag 110. While the contents of bag 110 are under pressure from sleeve 200, lateral walls of bag 110 are not in danger of a 'blowout' because pressure exerted outward by contents of bag 110 meet an equal pressure exerted inward by sleeve 200. However since sleeve 200 is optionally open at one or both ends, the top and/or bottom of bag 110 could be subject to outward pressure from contents of bag 110, not matched by inward pressure of sleeve 200. Top disk 170 and bottom disk 172 are provided to support the top and bottom of bag 110.

Top disk 170 and bottom disk 172 are optionally embodied as top and bottom of an external container 180. Optionally, sides 174 may also be provided outside sleeve 200 to hold disks 170 and 172 in place, and these may optionally be sides of an external container 180.

Compatibility with Existing Systems:

In some embodiments, a delivery module 100 (including bag 110, valve 120 and associated hardware, and sleeve 200) is sized to be insertable into a container sized and shaped as an aerosol can, for example an aerosol can such as is used in prior art devices which use a gas propellant. In some embodiments, during device manufacture, a bag (e.g. a BOV) is inserted into a sleeve during expansion of the sleeve as described above, then the bag and sleeve combination is inserted in a can, then the bag is filled through the valve under pressure from the material source. The bag-filling process is therefore optionally similar to the way BOV bags have traditionally been filled, and standard filling machines can be used with some embodiments of the present invention with relatively minor modifications. Indeed, the filling process is potentially simplified because with some embodiments of the present invention the stages of filling with propellant and testing for leaks are eliminated, and since the joining of bag and sleeve to external container is not pressure-sensitive, crimping is unnecessary and can optionally be replaced by a simpler and cheaper methods of attachment.

In some embodiments a BOV bag, wrapped around itself and contained in a sleeve 200, can optionally be made small enough to pass through the standard opening (about 1" diameter) made to fit the standard top of a BOV, making these embodiments compatible with a size standard of the aerosol industry. As shown in the FIG. 7, a container 180 is positioned for connection to such a top. Using a bag and sleeve which can be inserted into an external container and then subsequently filling the bag not only enables a manufacturer to use existing production lines with relatively minor changes, it also optionally enables a manufacturer to use existing containers (e.g. existing aerosol cans, for existing product lines, having standard-sized openings on top, graphics designs familiar to customers, etc.) and existing BOVs, valves, and other parts, while yet producing and selling embodiments of the present invention. Similarly, BIC containers can be used and BIC production sequences can be used with minor modifications.

Ease of Attachment of Pressure Dispenser to an External Container:

Prior art aerosol cans contain a propellant under pressure. Consequently, when attaching a BOV or other bag arrangement to an external container, care must be taken to provide a solid and reliable airtight connection able to withstand aerosol pressures, which are typically in the 7-8 bar range. Accordingly, aerosol valve assembly structures typically comprise a solid cap with a gasket, which is attached to the body of an aerosol can by crimping, or by a similar process, to produce a reliable seal able to stand up to high pressure without leaking. The materials and process involved add cost and complexity as compared to some means and methods which may be used to attach a pressure dispenser 100 to a container 180. Since according to some embodiments of the invention pressure is supplied a tendency of elastic sleeve 200 to contract to its resting state, no gas pressure need be maintained within container 180. Therefore in some embodiments, a BOV 150 or other pressure dispenser 100 can be attached to an external container 180 using lighter, simpler, and cheaper materials and/or methods than those used by the prior art. For example, a standard P.E.T plastic can be used, with one part simply snapping to another, or one part screwing into another, or a glue or any other simple attaching mechanism can be used. This fact can make this attaching process cheaper and/or simpler than those required to connect a BOV to a container according to methods of prior art.

Optionally, container 180 may be made airtight, e.g. containing air at room pressure or at somewhat elevated pressure, so as to help it withstand external impacts to which a product might be subjected during distribution or during use.

Optionally, container 180 may be made intentionally not airtight, for example to prevent pressure differentials in low or high pressure contexts such as air transportation or decompression chambers.

Freedom in Design of External Container:

Since in some embodiments container 180 is not required to hold a pressurized propellant, these embodiments are neither practically nor legally required to be of cylindrical shape and/or to be very solidly constructed, as is the case for at least some prior art aerosol containers. As a result, some embodiments may comprise external containers 180 which are constructed of weaker, cheaper, and simpler materials (for example P.E.T, carton, glass, thin metal), and/or using simpler and more economical construction processes, than those which can be used by aerosol containers according to prior art. In consequents, products which comprise embodiments of the present invention may be constructed in a variety of external shapes selected according to aesthetic or marketing or other considerations. Embodiments comprising containers of a variety of shapes and materials are contemplated. For example, curved shapes, shapes which are triangular, hexagonal, rectangular, oval, other geometric shapes, shapes which are concave on multiple sides, have straight sides, or have sides which are combine concave and/or convex and/or straight sides, and entirely irregular shapes may be selected and used for aesthetic reasons, to individualize or draw attention to a product, to facilitate packing and handling, or for a variety of commercial reasons. In contrast to the practical and in some cases regulatory limitations of prior art aerosol containers, some embodiments of the present invention are optionally present an aerosol or other pressure dispenser 100 in one of the shapes mentioned in this paragraph or in other non-cylindrical shapes.

Sleeves with Multiple Layers or Strips or Sections:

Attention is now drawn to FIGS. 8A-8D, which are simplified schematics of sleeves 200 which comprise multiple layers and/or multiple strips of elastic material, according to embodiments of the present invention. Such sleeves are labeled 209 in FIGS. 8A-8D, but it is to be understood that any of sleeves 200 mentioned herein can be constructed utilizing multiple layers and/or multiple strips of differing material compositions. Such multiple layers or strips can optionally be extruded together, or a layer can be applied or attached or sprayed or painted onto an existing other layer to make a sleeve 209, or a sleeve or sleeve portion can be used as a mold for injection molding. Optionally, sleeves can be stretched during any of these processes. Optionally, layers and surfaces need not necessarily be flat but can be created with undulations or other surface features.

Note that these figures are not to scale, some layers being of exaggerated thickness in the figures, for clarity of the drawing. Also, it is to be understood that any of the various features presented separately in FIGS. 8A-8D may also be used in combination, and may be used in conjunction with any of the various embodiments described herein.

Figure 8A:
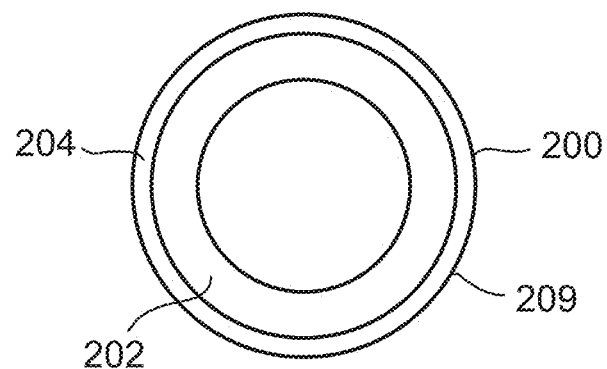

Embodiments without Containers:

In some embodiments, a sleeve 209, optionally produced by a multi-layer extrusion process or by an attaching or painting or spraying or molding or similar process, provides an external layer having selected aesthetic characteristics (e.g. desirable shape, color, surface texture, etc.) or mechanical characteristics (e.g. a non-slip surface, adaptation to particular environmental conditions) covering a sleeve body whose physical characteristics are optionally chosen to enhance its elastic and energy-storing capacity. FIG. 8A presents a cross-section of a sleeve 200 with an inside layer 202 designed to enhance its elastic energy-storing capability, surrounded by an outside layer 204 designed for selected aesthetic and/or tactile qualities and/or other presentational qualities, which can be produced simultaneously by a combined extrusion process.

Figure 8B:
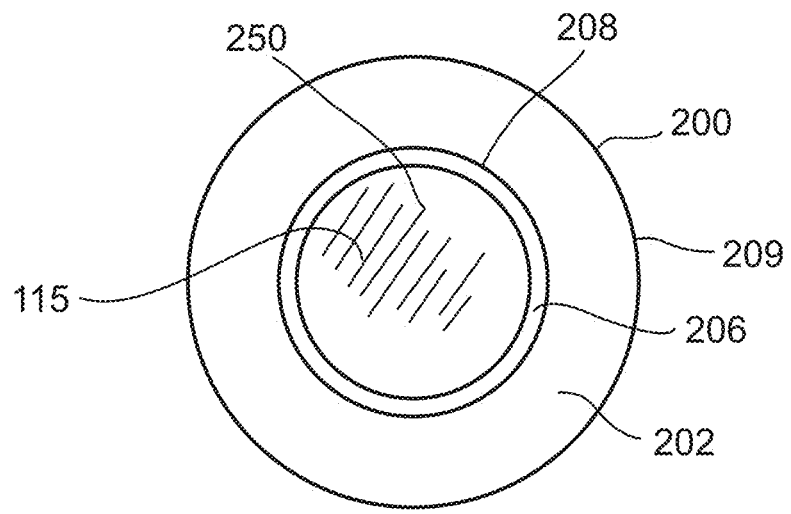

Embodiments without Independent Bags:

In some embodiments, a sleeve 200 comprises layer 206 (which may be thought of as a surface or a coating) covering an inner wall 208 which defines a lumen 250 within a sleeve 200. Layer 206 can be designed, for example, to minimize or prevent interaction between a material 115 introduced into lumen 250 and elastic material comprising a layer 202 made of material selected for its elastic energy-storing capabilities. In these embodiments, layer 202 may be porous and/or may react with a material 115, and layer 206 may be designed for impermeability and for minimal reactivity. FIG. 8B can be used to produce an embodiment in which a material can be stored under pressure and dispensed through a valve, wherein layer 206, though an extruded layer of sleeve 200, serves as bag 110 and provides the functionality of bag 110 as described herein. (In some of these embodiments, where layer 206 functions as a bag 110, lumen 250, within layer 206, will be closed at least at its bottom, e.g. by welding or gluing of the bottom and optionally the top ends of sleeve 200, optionally to top and bottom disks similar to those shown in FIGS. 7B and 7C or to a cap of similar construction.)

Figure 8C:
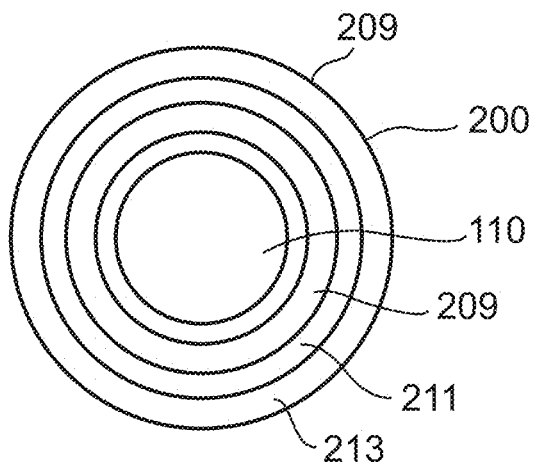

Embodiments which Combine Extruded Strips or Layers to Tailor Expansion Characteristics:

In some embodiments multi-layer extrusion is used to create a sleeve in which each of a plurality of layers, strips, or regions combines different properties of elasticity, strength, and/or different resting diameters, and/or differences in other physical characteristics which cause them to respond differently under applied force and/or thermal energy and/or electric potential, or which differ in other physical properties. FIG. 8C is constructed with a multi-layer extrusion wherein each of a plurality of layers (in the figure, layers 209, 211, 213) has different physical properties. In some embodiments 2, 3, 4, or more layers may be used, and in some embodiments a continuous variance of physical characteristics over all or part of an extrusion cross-section or extrusion length may be used.

Figure 8D:
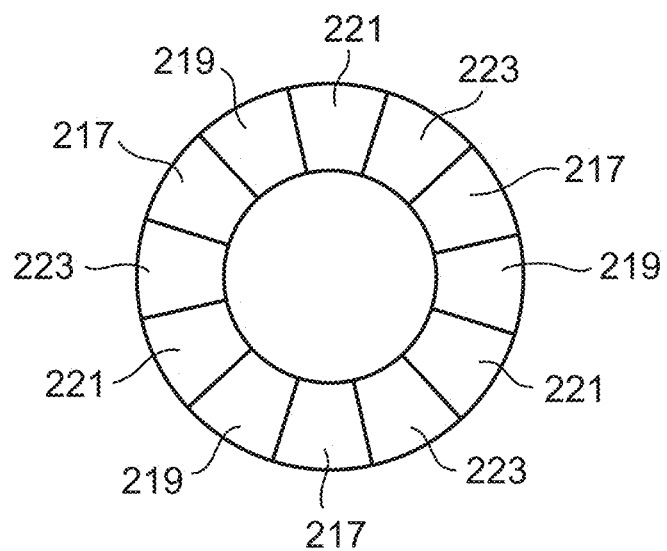

In some embodiments multi-material extrusion is used to create a sleeve in which each of a plurality of regions (optionally longitudinal strips) have different properties of elasticity and strength and/or different resting diameters, and/or differences in other physical characteristics which cause them to respond differently under applied force. Such strips can optionally be combined to produce an elastic performance with desirable characteristics. Such a structure is shown in FIG. 8D, and may be used, for example, to produce a sleeve 200 which provides a relatively uniform amount of pressure under differing conditions of expansion, thereby creating a dispenser with relatively uniform performance (pressure, dispensing rate), while, during use, a bag 110 contained within is gradually emptied of its contents. FIG. 8D is optionally constructed with a multi-strip extrusion wherein each of a plurality of strips (in the figure, strips 217, 219, 221, 223) has different elastic properties.

Figure 8E:
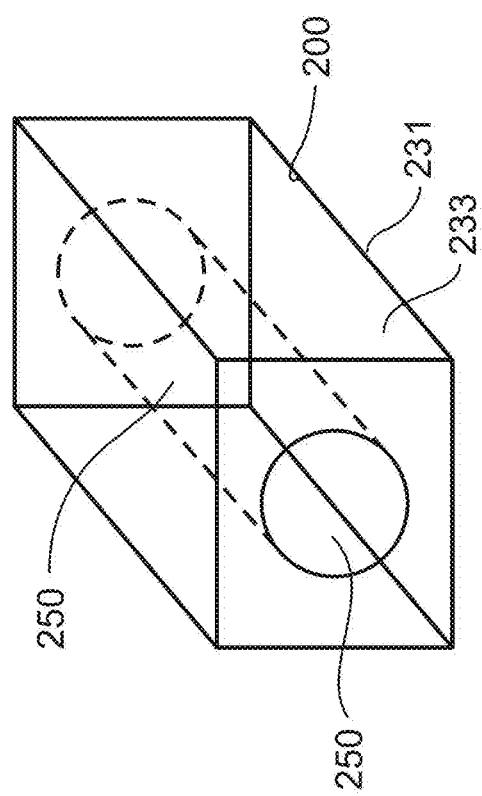

Embodiments with Sleeves with Selected External Shapes:

Attention is now drawn to FIG. 8E, which is a simplified schematic of a sleeve 200, here labeled sleeve 231 having an external shape which differs from a shape of its internal lumen, according to an embodiment of the present invention. In the exemplary embodiment shown in the figure, lumen 250 is of circular cross-section, whereas external wall 233 of sleeve 221 is of square cross section. It is to be understood that these shapes are exemplary and not limiting. External shape of sleeve 221 might, for example, be triangular, or oval, have convex and/or concave sides, or have some other geometric or irregular shape. Embodiments with sleeves 200 with designed external shapes optionally different from shapes of internal lumen 250 of the sleeves may be used with external containers (which they are optionally designed to fit) or without external containers (optionally with an external surface 'presentational' layer, as described in FIG. 8B.

Some Specific Uses:

In some embodiments a bag/sleeve combination is formed as a transfusion module operable to provide gravity-independent transfusions of blood and/or other liquids into to the blood stream of a patient, e.g. in hospital and in first-aid situations. Such an embodiment can provide greater comfort to a patient, eliminating the need for IV stands and long trailing tubes beside the bedside, but rather can optionally be positioned near the transfusion site and taped or otherwise conveniently attached to the limb of a patient, who is then able to move around with less difficulty than using prior art transfusion methods. Emergency transportation of patients could also be greatly facilitated using such a module.

Transfusion modules can adapted to providing transfusion materials at selected pressures, e.g. to simulate a standard hospital drip bag, or alternatively to provide a rapid transfusion source for emergency situations.

Figure 8F:
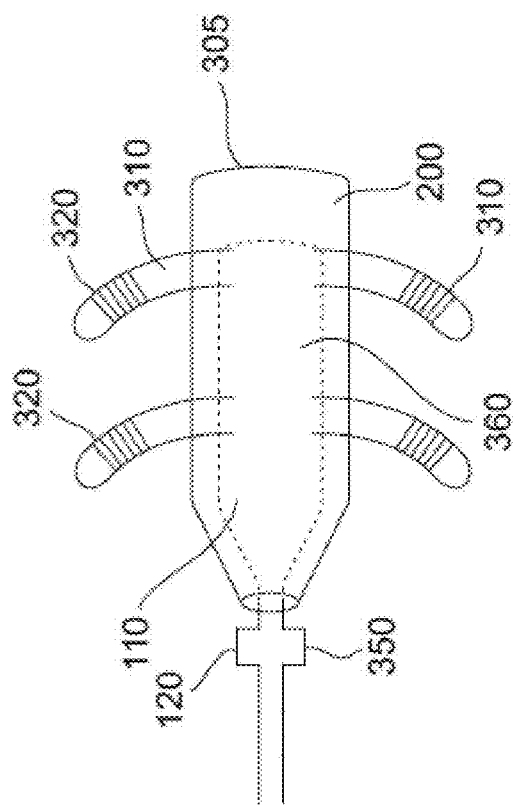

FIG. 8F is a simplified schematic of a transfusion module 305, according to an embodiment of the present invention. Module 305 comprises a bag 110 filled with blood or other transfusion fluids, a sleeve 200 compressing bag 110 at a desired pressure, and optionally comprises or connects to a valve 120 (which may be embodied as a mechanical valve and/or an electronic dosage machine and/or another dosage control mechanism) formed as a dispensing control 350 for controlling delivery rate of the transfusion fluid, and optionally comprises attachments 310, (optionally, straps comprising Velcro attachments 320 or something similar) for attaching module 305 to a bed or stretcher or to a patient's body. In some embodiments a pressure of between 1.5 and 4 bar is used in module 305. In the opinion of some physicians, residual pressure in module 305 should not fall below 1.5 bar as bag 110 of module 305 empties out. Maximum pressures selected for module 305 may depend on its intended use, and depend on the viscosity of the material being transfused and the desired delivery rate. For example, a sleeve providing between 4 and 6 bar of pressure might be used, or a sleeve providing 2-3 bar of pressure might be used with a dispensing control 350 which is able to provide a high deliver rate.

Exemplary Construction Methods:

Some embodiments comprise methods and apparatus for manufacturing devices as described hereinabove. In some embodiments sleeves 200 are provided with graspable fins or other forms running along the length of the sleeve, or other graspable shapes (for example, the corners of a square or triangular shape) comprised on a sleeve, integral to the sleeve or attached to it, and during construction these graspable shapes are grasped and pulled away from each other by a mechanism which thereby expands the sleeve so that a bag (e.g., full or empty) can be inserted therein. In some embodiments a set of rods or other thin, elongate and optionally bend-resistant elements are inserted into the lumen of a sleeve, and then are pulled apart, expanding the sleeve and enabling insertion of a bag. In some embodiments high pressure within a sleeve and/or low pressure outside a sleeve expand the sleeve and enable bag insertion.

Figure 10:
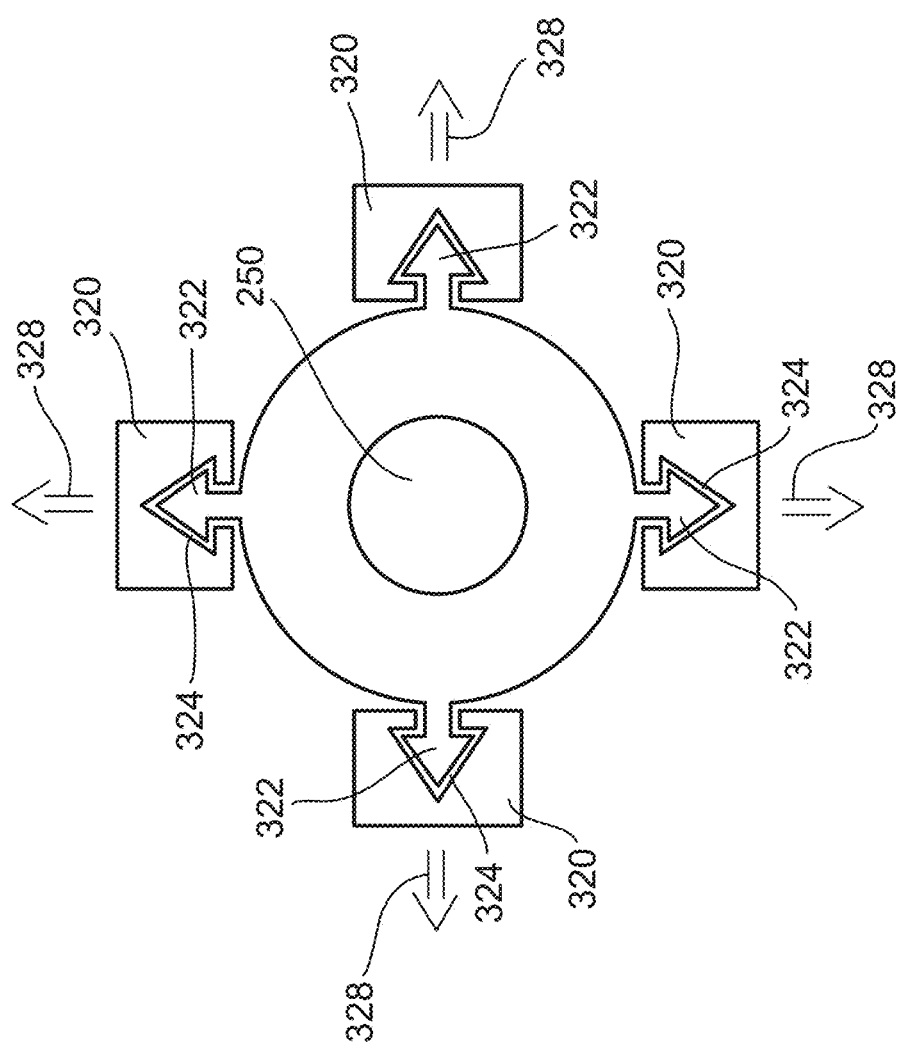
Figure 11:
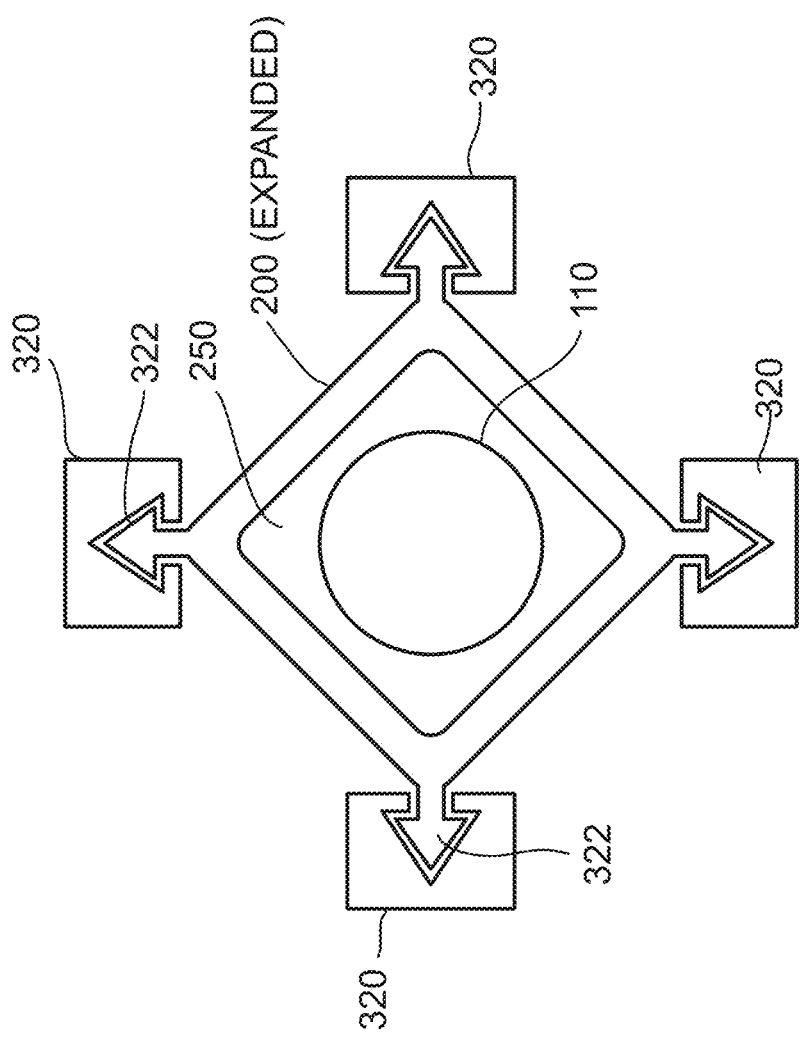

Attention is now drawn to FIGS. 9-11, which are simplified schematics showing a method for expanding a sleeve 200 by pulling its sides outward during a manufacturing process, according to an embodiment of the present invention.

FIG. 9 presents the problem to be solved: in some embodiments it is desirable that sleeve 200 provide residual pressure on bag 110 even when bag 110 is empty or nearly empty. To accomplish this, in some embodiments it is necessary to introduce bag 110 into internal lumen 250 of sleeve 200, although that lumen has a diameter smaller than the diameter of rolled-up bag 110. This situation is shown in FIG. 9.

An exemplary solution is presented in FIG. 10. In some embodiments an assembly apparatus (not shown in its entirety) comprises a set of at least three grippers 320. Grippers 320 are designed to grasp graspable shapes 322, which are part of or attached to sleeve 200, as shown in FIG. 9. In some embodiments graspable shapes 322 are constructed as continuous extensions from an external wall of sleeve 200. In some embodiments sleeve 200 is constructed by an extrusion process which produces a long tube which is subsequently cut into segments of a length appropriate for a specific application. Graspable shapes 322 are optionally constructed as integral parts of sleeve 200 extending outward and formed in a shape which is convenient for being grasped and pulled by grippers 320. In some embodiments, shapes 322 are simply corners or other graspable portions of sleeve 200.

In some embodiments grippers 320 may have jaws or surfaces which come together to grasp all or parts of shapes 322, and to pull them, optionally moved by a motor or servo-mechanism such as a robotic arm.

In some alternate embodiments, for example in an embodiment shown in FIG. 10, shapes 322 of sleeve 200 comprise a thick portion (e.g. the arrowhead shapes of shapes 322 in FIG. 9) connected to a narrower portion (e.g. the short arrow bodies connected to the arrowhead shapes 322 in FIG. 9), and grippers 320 comprise a slot 324 sized and shaped for receiving therein, in a longitudinal sliding motion, at least the thick portions of shapes 322. (Optionally, grippers can be moved to slide over the shapes, or the sleeve can be moved to slide the shapes within the grippers.) These thick portions are able to slide longitudinally within slots 324 (i.e. in a direction perpendicular to the plane of FIG. 10, but are designed not to be pulled laterally from slots 324 under the pressures required to stretch sleeve 200 sufficiently to insert bag 110 (empty or full, depending on the application and dispenser design), and the narrow portions are designed to resist tearing under pressures required to expand sleeve 200 to that extent. Consequently, pulling a gripper 320 laterally away from an extension 322 engaged within it (i.e. in the direction of arrows 328), results in pulling a portion of an external wall of sleeve 200 away from the center of sleeve 200. To insert a BOV into a sleeve 200, expansion of the sleeve to a diameter of a bit more than an inch may suffice, since the sleeve/BOV combination may in some embodiments be expected to be introducible into a aerosol can with a standard one-inch opening. The degree of expansion sufficient to enable placing the pouch of a BIC within a sleeve will typically be much larger, and may approximate the diameter of the can to be used.

During assembly of some embodiments grippers 320 equipped with jaws or the equivalent grip at least parts of shapes 322 and pull them as indicated by arrows 328. During assembly of some embodiments grippers 320 having slots 324 sized for graspable shapes 322 are slid over those shapes, and then pulled as indicated by arrows 328.

FIG. 11 shows the result: sleeve 200 is expanded, and lumen 250 becomes big enough to accommodate a bag 110, which can be inserted therein, (optionally using an introducer tube which is then retracted) after which sleeve 200 is allowed to relax, whereon it will apply pressure to bag 110. If a top portion of a BOV 150 comprising a valve assembly structure 130 is inserted within a top of sleeve 200, sleeve 200 will grasp and hold valve assembly structure 130, connecting sleeve to BOV, as explained earlier with reference to FIG. 6.

In prior art assembly methods, BOV bags are typically filled after insertion in a canister and pressurization of that canister. The optional method shown in FIGS. 9-11 produces a BOV/sleeve combination which can be inserted in such a canister, and then optionally filled, optionally under pressure through the valve, as is usual using the equipment and techniques usual in the aerosol industry today (the equipment optionally modified to in that no gas propellant is introduced). Alternatively, the method shown in FIGS. 9-11 can be used to stretch sleeve 200 sufficiently for inserting therein a filled bag 110.

Attention is now drawn to FIGS. 12-15, which are simplified images of an apparatus 400 for expanding a sleeve 200 by applying pressure from within lumen 250 outwards, according to an embodiment of the present invention. FIGS. 12-15 show a method which can be used to enable insertion of a bag 110 (filled or not yet filled) into sleeve 200.

Figure 12:
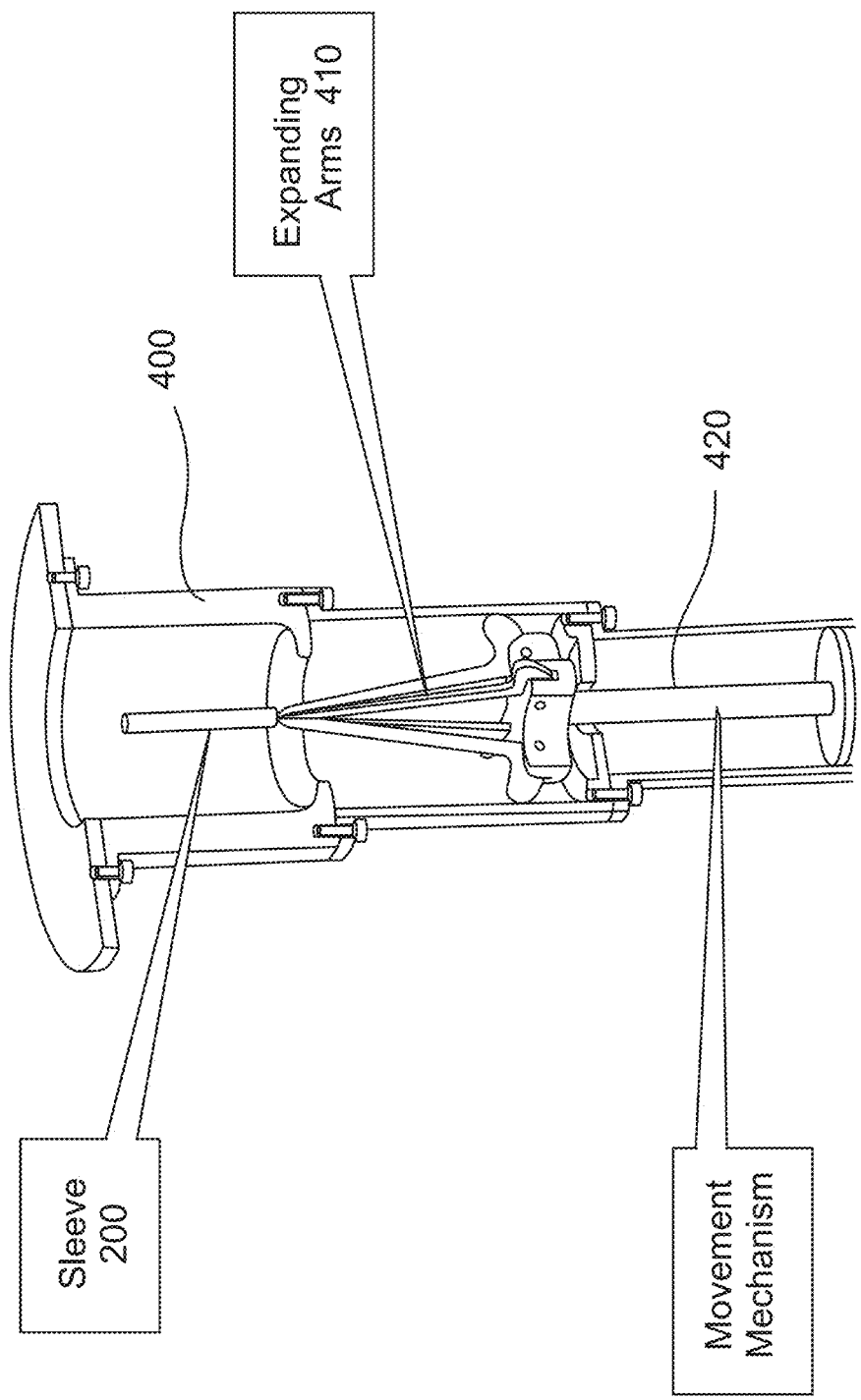
Figure 13:
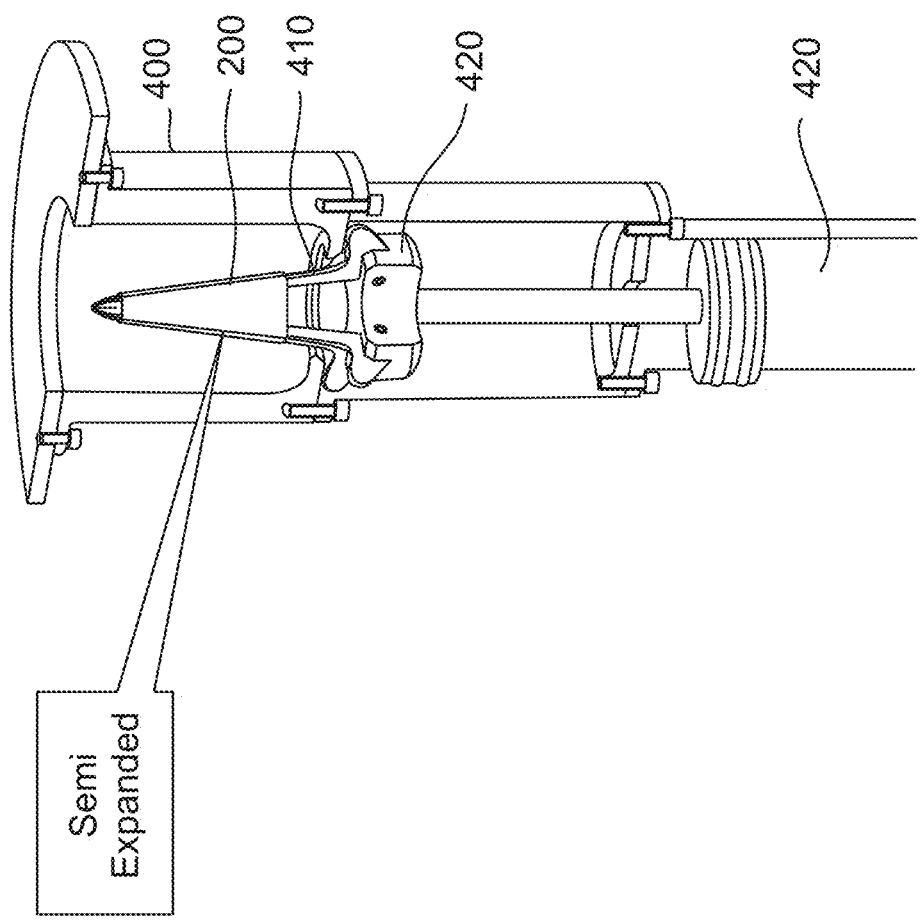
Figure 14:
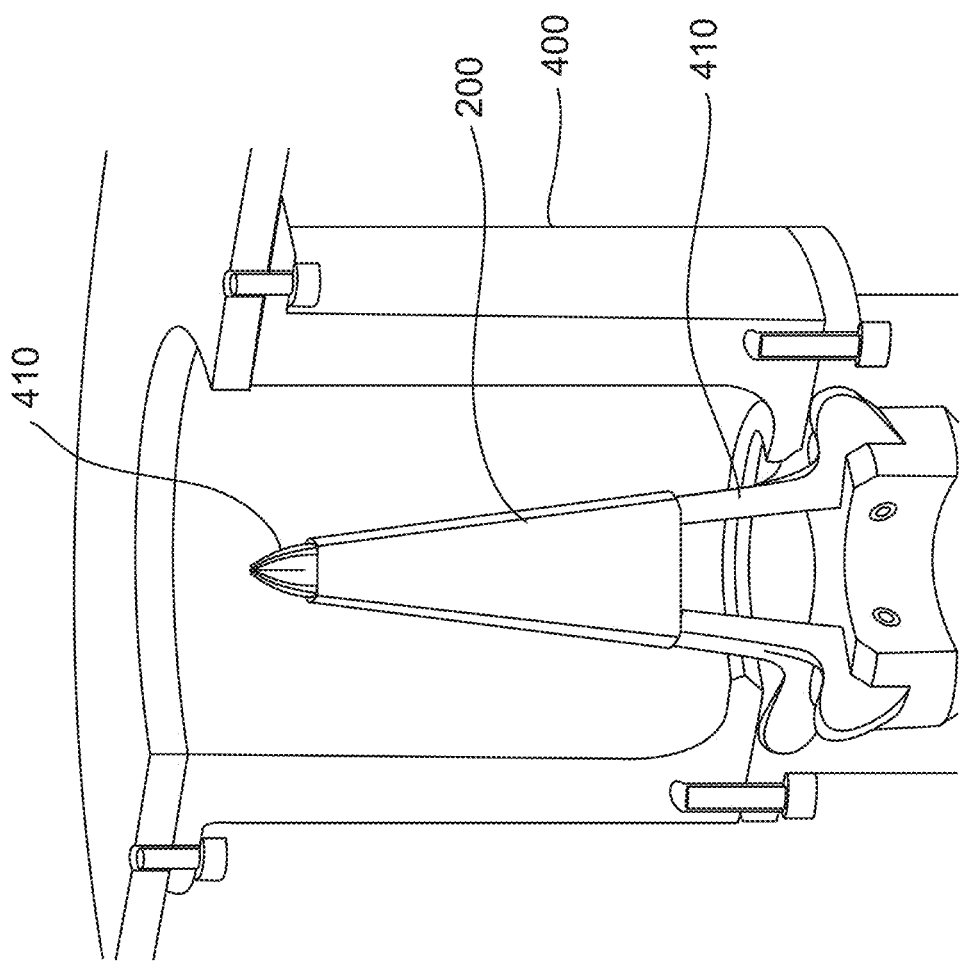
Figure 15:
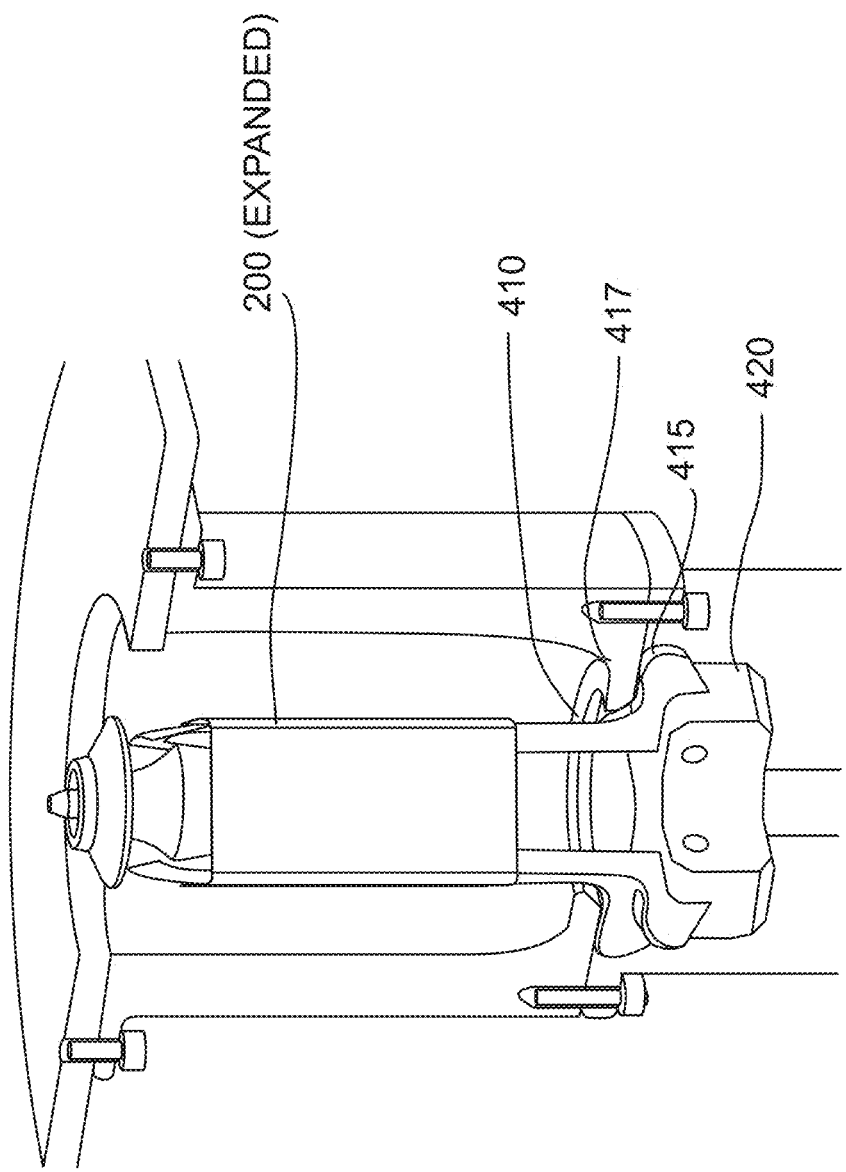

FIG. 12 shows a sleeve 200 positioned above a set of expanding arms 410 which can be pushed upwards by a movement mechanism 420. FIGS. 13 and 14 show two views of a stretching operation in progress, with sleeve 200 in a semi-expanded state. FIG. 15 shows sleeve 200 in an expanded state, arms 410 having been forcibly pushed outward from within lumen 250 as extensions 415 of arms 410 are pushed downward (as arms 410 are pushed upward) by extensions 417 of mechanism 400. It is to be understood that details of the embodiment shown in FIGS. 12-15 are exemplary only and are not to be considered limiting. Any mechanical arrangement for expanding sleeve 200 outward by exerting pushing pressure from within is considered an embodiment of the present invention, including pushing sleeve outward by means of arms or rods pushed from one end (as shown in the figure) or held and pushed from both ends, and also comprising pushing sleeve 200 outward by means of a pressure differential existing between lumen 250 and the environment outside sleeve 200.

Pushing the walls of sleeve 200 outwards and enlarging lumen 250 enable to insert a bag 110 into lumen 250. Relaxing sleeve 200 after insertion of bag 110 exerts pressure on bag 110 and, optionally on a valve assembly structure 130 associated with bag 110, as described above.

In some embodiments bag 110 is inserted in sleeve 200, then optionally positioned in a container, then filled under pressure. This process is optionally compatible with standard BOV filling procedures, with the exception of the process described above for inserting bag 110 into sleeve 200, instead of pressurizing a container surrounding bag 110.

In some embodiments bag 110 is inserted full into sleeve 200. This process is optionally compatible with standard BIC filling procedures, and FIG. 15 shows a filled BIC bag 110 inserted into an expanded sleeve 200, after which sleeve 200 will be relaxed by withdrawal of arms 410, and the BIC/sleeve combination can be inserted into a standard BIC canister, or into any other package.

Some exemplary dimensions are as follows: in BOV technology currently in use, a rolled BOV ready for insertion in a sleeve is usually between about 12 mm and 18 mm in diameter, and often near 15 mm in diameter. In some embodiments sleeve 200 will be stretched to a diameter of between 20 and 25 mm, to accommodate the BOV. In an example of an embodiment of BIC technology currently in use, a pouch about 32 mm in diameter may be used, e.g. for a standard Shaving Gel canister. In some embodiments sleeve 200 will be stretched to a diameter of between 35 mm and 45 mm, for example about 40 mm, to allow insertion of the pouch. In any specific operational context a dimension for stretching of sleeve 200 will be selected taking into account the stretching mechanism used, a desired speed of operation, and other preferences and limitations.

Attention is now drawn to FIGS. 16 and 17, which are simplified flow charts of processes for mass production of products incorporating embodiments of the present invention.

FIG. 16 shows a method for producing some BOV embodiments. As shown in the chart, extruded tubing from a reel is cut into appropriate lengths, placed on a mounting machine, and expanded, optionally using one of the expansion methods presented above. Empty and rolled BOV units from a supply of such units are fed to the mounting machine, which positions each BOV in an expanded sleeve 200, and allows the sleeve to contract. The BOV/sleeve combination, dispenser 100, is then inserted into a container, and the BOV bag 110 is filled with the material to be dispensed.

Note that to accomplish this process, in some embodiments minor modifications in a production line previously adapted to aerosol production according to methods of prior art may suffice to modify the line from producing products using a BOV compressed by a gas propellant, to producing products using a BOV compressed by a sleeve 200. Where a traditional process typically uses an inserting line to introduce a pre-prepared BOV into a pre-prepared can, introduce propellant, seal the can, fill material, test for leaks and weight, and package for shipment, an optional process according to an embodiment of the present invention comprises pre-preparing sleeves 200 (by extrusion and cutting to size) and mounting sleeves 200 on Bags, (optionally using one of the stretching procedures described above), thereby producing dispensers 100 (BOV+sleeve). At that point the BOVs with their sleeves can be handled in a manner similar to that used traditionally, but simplified. The BOVs prepared according to an embodiment of the present invent can be moved to BOV position in normal or slightly modified production machinery, where it is inserted in a container in a procedure which differs little (if at all) from prior art procedures for inserting a BOV into a container. The BOV may then be sealed into its container, either using prior art methods, materials and machinery (e.g. by crimping), or optionally using a simpler type of attachment, which is possible since a pressure-resistant seal is not needed. The prior art procedures for filling the container with propellant and testing for leaks may be skipped since they are not needed, and the product, now externally identical or very similar to a prior art product, is packaged for shipment. (Note also that shipping and handling can be simplified, since embodiments of the present invention, as contrasted to those of prior art, will not be considered a hazardous product requiring special handling.) In summary, sleeves 200 may be produced off line, and a standard production line may be used with only the addition of inserting BOV into sleeve before handling the BOV normally except for optionally using a simpler attachment method, and skipping because they are unnecessary, the prior art steps of insertion of propellant and testing for leaks.

FIG. 17 shows an optional method for producing BIC embodiments. As shown in the chart, extruded tubing from a reel is cut into appropriate lengths to produce sleeves 200, which sleeves are placed on a mounting machine, and expanded, optionally using one of the expansion methods presented above. FIG. 17 shows a process by which BIC bags filled on a filling line may be taken from the filling line, inserted in a sleeve 200, returned to the filling line, and thereafter be treated normally, i.e. according to the methods and optionally using the machines of prior art, except for skipping the production stages of filling with propellant and testing for leaks, pack and handle as is usual in the industry.

Attention is drawn to the fact that embodiments of the present invention may in some ways be safer than devices of prior art which use gas propellants. Dispensers with propellants may explode if overheated (left in a car in the sun, for example) because as their temperature goes up their internal pressure increases. If such a canister is punctured or otherwise fails, its contents may be likely to disperse under pressure. In contrast, with respect to embodiments deriving pressure from a sleeve 200 compressing a bag of materials, in the case of puncture or rupture of the sleeve, the pressurization of the bag contents may be reduced or eliminated when the sleeve fails, without the bag contents necessarily being dispersed, and should such an embodiment be heated, the rubber of the sleeve could become softer, probably resulting in a reduction of its internal pressure rather than an increase.

It is to be noted that any one of the embodiments described herein for a device or a sleeve or any article made of an elastomeric material, or a method of using same, in combination with any one of the elastomeric composites comprising a natural rubber, a filler and a nanofiller as described herein, and in combination with any one of the elastomeric composites comprising an elastomer (any elastomer) and hybrid nanoclays which is in association with an amine-containing compound that exhibits anti-oxidation activity, or a composition-of-matter containing same, are contemplated herein.

It is expected that during the life of a patent maturing from this application many relevant methodologies will be developed in the field of elastomeric compositions and the scope of the methodologies and functional ingredients is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

List of Materials:

Natural Rubber (NR), dirt content 0.1%, was SMR (Standard Malaysian Rubber) 10 or CV60 (constant viscosity 60), which can be considered as equivalent to one another (as shown hereinbelow).

Polybutadiene Rubber (PB) ML(1+4)100-45, was BR 1220, supplied by Nippon Zeon.

Zinc oxide, stearic acid, silica and sulfur were obtained from known vendors.

Organomodified nanoclays Cloisite 15A (Montmorillonite (MMT) treated with dimethyl hydrogenated tallow ammonium) and Cloisite 30B (MMT treated with methyl-dihyroxethyl hydrogenated tallow ammonium), were obtained from Southern Clays.

Mercaptosilane Si69 (TESPT; bis(triethoxysilylpropyl) tetrasulfane) was obtained from Degussa.

Plasticizer DOS is Dioctyl sebacate.

Coumarone indene resin plasticizers Cumar25 and Cumar80, were obtained from Neville.

MBS (accelerator 1), (Santocure) 2-(4-morpholinyl-mercapto)-benzothiazole, was obtained from Flexsys.

DPG (accelerator 2), (Perkacit) diphenyl guanidine, was obtained from Flexsys.

TMTM (accelerator 3), tetramethyl thiuram monosulphide, was obtained from Flexsys.

TETD (an accelerator), tetraethyl thiuram disulfide, was obtained from Flexsys.

Santogard PVI (a retarder), N-(Cyclohexylthio)phthalimide, was obtained from Flex sys.

Carbon Black (HAF N330) was obtained from Cabot.

ExpGraphene 3775 is a commercially available graphene based nanofiller.

Struktol TS35 (a processing aid), an aliphatic-aromatic soft resin, was obtained from Schill & Seilacher.

Struktol WB16 (a processing aid), a mixture of calcium soaps and amides of saturated fatty acids, was obtained from Schill & Seilacher Struktol ZEH (a processing aid), (ZEH=zinc 2-ethyl hexanoate), for improving stress relaxation, was obtained from Schill & Seilacher Struktol ZEH-DL, (a processing aid), zinc 2-ethyl hexanoate on 33% silica carrier silica, was obtained from Schill & Seilacher.

Nanoclay hybrids (also referred to as nanohybrids) were prepared as described in Example 1 hereinbelow.

IPPD is N-isopropyL-N'-phenyl-paraphenylene diamine.

Elastomeric Composite Properties Measurements:

Rheological Properties:

All rheological measurements were performed using a MDL D2000 Arc 1 (Monsanto) Rheometer, and were operated according to Manufacturer's instructions, at the indicated temperature.

Minimal Viscosity (mV or MV) is measured in a rheological test, and is expressed as the torque (lb/inch) applied to an elastomeric composite, before vulcanization.

Scorch time (t2) is the time (in minutes) required for an elastomeric composite to exhibit torque of 2 lb/inch upon vulcanization, as measured in a rheological test.

Optimum Vulcanization Time (t90) is the time (in minutes) required for an elastomeric composite to exhibit 90% of the maximal torque value, as a measured in a rheological test. Similarly, t100 is the time required for an elastomeric composition to exhibit the maximal torque value.

The term "tan" represents "Tangent $\delta$", or the tangent modulus, which is the ratio of the viscous torque (S") and the elastomeric torque (S'), and is dimensionless. Tan can be measured as the slope of a compression stress-strain curve.

S1, is the maximal torque value (in lb-in units).

S1-mV represents the difference between the maximal torque value (S1) and the minimal viscosity.

Mechanical Properties:

Mechanical measurements were performed according to standard (ASTM) procedures, as indicated.

Vulcanization time is the time required for achieving more than 90% of the maximal torque.

Elongation is the extension of a uniform section of a specimen (i.e., an elastomeric composite) expressed as percent of the original length as follows:

$$\text{Elongation \%} = \frac{\text{Final length} - \text{Original length}}{\text{Original length}} \times 100$$

Elongation was determined following the ASTM D412 standard.

Hardness is a resistance of an elastomeric composite to indentation, as measured under the specified conditions. Hardness ShA is Shore A hardness, determined following the ASTM D2240 standard using a digital Shore A hardness meter.

Tensile strength (or tensile) is a measure of the stiffness of an elastic substance, defined as the linear slope of a stress-versus-strain curve in uniaxial tension at low strains in which Hooke's Law is valid. The value represents the maximum tensile stress, in MPa, applied during stretching of an elastomeric composite before its rupture.

Modulus is a tensile stress of an elastomeric composite at a given elongation, namely, the stress required to stretch a uniform section of an elastomeric composite to a given elongation. This value represents the functional strength of the composite. M100 is the tensile stress at 100% elongation, M200 is the tensile stress at 200% elongation, etc.

Tear Strength is the maximum force required to tear an elastomeric composite, expressed in N per mm, whereby the force acts substantially parallel to the major axis of the composite.

Tensile strength, modulus and tear resistance were determined following the ASTM D412 standard.

Work represents the toughness of an elastomeric composite, namely, the energy a composite can absorb before it breaks, and is determined by the area under a stress-strain curve. The stress is proportional to the tensile force on the composite and the strain is proportional to its length. The area under the curve is therefore proportional to the integral of the force over the distance the elastomer stretches before breaking:

$$\text{Area} \propto \int F(L) dL$$

and this integral represents the work (energy) required to break the composite.

Hchg ShA is the change on Shore A hardness upon ageing at 100° C. for 70 hours, and represents the hardness as measured upon ageing minus the hardness as measured before ageing.

Tchg % is the change, in percents, of the tear resistance upon ageing at 100° C. for 70 hours, and represents the difference between tear resistance upon ageing and before ageing, divided by the tear resistance before ageing, multiplied by 100.

Echg % is the change, in percents, of the elongation upon ageing at 100° C. for 70 hours, and represents the difference between elongation upon ageing and before ageing, divided by the elongation before ageing, multiplied by 100.

Yerzley Elasticity (Elast. Yerzley) is a measure of elasticity of an elastomeric composite as determined on a Yerzley device. It represents resilience, which is the ability of a material to absorb energy when it is deformed elastically, and to release that energy upon unloading. The modulus of resilience is defined as the maximum energy that can be absorbed per unit volume without creating a permanent distortion.

Stress Relaxation is the time dependent change in stress while maintaining a constant strain. It can be measured by rapidly straining a tested specimen in tension to a predetermined and relatively low strain level and measuring the stress necessary to maintain this strain as a function of time while keeping temperature constant. Stress decreases with time due to molecular relaxation processes that take place within the polymeric specimen. Relaxation can therefore be defined as a ratio of time dependent elastic modulus. Relaxation can further be defined as the change in % of the elastic modulus during a time period (e.g., a year).

Creep is the time dependent change is strain while maintaining a constant stress. It can be measured by subjecting a tested specimen to strain and measuring the level of stretching over time.

In an exemplary procedure, creep rate was determined by measuring the length between two-predetermined points on a specimen. The rate the length increases represents the creep rate. The creep rate is the slope of a curve of the stretching as a function of time. The creep per X years, in percents, can be calculated as the difference between the two points after X years—the initial difference between these points, divided by the initial difference between the two points and multiplied by 100. Such a procedure is exemplified in FIGS. 11A-B. Therein, a specimen was subjected to a stress applied by connecting it to 2 Kg weight. Stress on dumbbell (0.6 mm 3.25 mm) is calculated as 110.61 Kg/cm$^2$.

Two points, one inch apart were marked at the beginning of stress application and the length between the points was measured with time, as described hereinabove.

The creep is presented herein as the change in mm per 3 years; or as the percentage (from the initial difference between the points, e.g., from 25.4 mm) of the creep per 3 years, upon application of a stress of about 110 Kg/cm². Values for the creep per 1 year, one month, or one week, can be easily extracted from these data.

Example 1

Preparation of Nanoclay Hybrids

Nanoclay hybrids are generally prepared by reacting commercially available MMT NCs, such as Cloisite 15A, with an antioxidant, as described herein, in an organic solvent (e.g., 600 ml), at elevated temperature, and thereafter adding to the mixture the mercaptosilane Si69, and optionally an acid (e.g., acetic acid or dodecylbenzensulfonic acid (Ufacid K)), added until a pH 3 is obtained. Reaction is then continued for several hours.

Preparation of RRA 194-2:

The preparation of RRA 194-2 is depicted in FIG. 1. In brief, to a suspension of Cloisite 15A in a mixture of chloroform:acetone 2:1 was added, while stirring, IPPD (an antioxidant), and upon heating for two hour at 80° C., Si69 and water were added, and the reaction mixture was heated for 7 hours at 80° C. Thereafter, the reaction mixture was poured onto a tray and dried for approximately 16 hours at room temperature.

Preparation of RRA 202-1 and RRA 206-2:

The preparation of RRA 202-1 is depicted in FIG. 2. To a suspension of Cloisite 15A in a mixture of 1:3 isopropyl alcohol:water was added, while stirring, IPPD (an antioxidant), and upon heating for two hour at 80° C., Si69 was added, and the reaction mixture was heated for 7 hours at 80° C. Thereafter, the reaction mixture was poured onto a tray and dried for approximately 16 hours at room temperature.

RRA 206-2 was similarly prepared, while using a mixture of 3:1 isopropyl alcohol:water.

Following the above-described general procedure and exemplified procedure, additional exemplary modified nanoclays were prepared as follows:

Preparation of RRA 181-1:

To a suspension of Cloisite 15A in acetone was added, while stirring, IPPD (an antioxidant), and upon heating for one hour at 80° C., Si69, acid and water were added, and the reaction mixture was heated for 7 hours at 80° C.

Preparation of RRA 189-2:

To a suspension of Cloisite 15A in acetone was added, while stirring, DDA (an antioxidant) and SBS (an accelerator), and upon heating for two hour at 80° C., Si69, acid and water were added, and the reaction mixture was heated for 7 hours at 80° C.

Preparation of RRA 190-5:

To a suspension of Cloisite 15A in acetone was added, while stirring, DDA (an antioxidant) and SBS (an accelerator), and upon heating for two hour at 80° C., silica (SiO₂) in acetone was added and the mixture was heated for 10 hours at 90° C., prior to the addition of Si69 and water (no acid), and the reaction mixture was heated for 10 hours at 90° C.

Without being bound to any particular theory, it is assumed that the added silica reacts with both, free hydroxy groups on the nanoclays surface and the mercaptosilane.

Preparation of RRA 189-4:

To a suspension of Cloisite 15A in acetone was added, while stirring, DDA (an antioxidant) and SBS (an accelerator), and upon heating for two hour at 80° C., Si69 and water (no acid) were added, and the reaction mixture was heated for 7 hours at 80° C.

It is noted that RRA 189-4 are prepared similarly to RRA 189—but without the addition of an acid.

Preparation of RRA 194-1:

To a suspension of Cloisite 15A in chloroform was added, while stirring, IPPD (an antioxidant), and upon heating for two hour at 80° C., Si69 and water (no acid) were added, and the reaction mixture was heated for 7 hours at 80° C. Thereafter, the reaction mixture was poured onto a tray and dried for approximately 16 hours at room temperature.

Preparation of RRA 194-2:

To a suspension of Cloisite 15A in a mixture of chloroform:acetone 2:1 was added, while stirring, IPPD (an antioxidant), and upon heating for two hour at 80° C., Si69 and water (no acid) were added, and the reaction mixture was heated for 7 hours at 80° C.

Preparation of RRA 195-1:

To a suspension of Cloisite 15A in a mixture of water:acetone 2:1 was added, while stirring, IPPD (an antioxidant), and upon heating for two hour at 80° C., Si69 (no water and no acid) was added, and the reaction mixture was heated for 7 hours at 80° C.

Preparation of RRA 207-1:

To a suspension of Cloisite 15A in DMF was added, while stirring, IPPD (an antioxidant), and upon heating for two hour at 80° C., Si69 was added, and the reaction mixture was heated for 7 hours at 80° C. Thereafter, the reaction mixture was poured onto a tray and dried for approximately 16 hours at room temperature.

Additional Examples of nanoclay hybrids and of elastomeric composites comprising the same are provided hereinunder.

Example 2

Elastomeric Composite Containing Commercial Nanoclays and Mercaptosilane

Elastomeric composites were prepared in a one-pot method, in the presence of commercially available organo-modified nanoclays and mercaptosilane, with and without a plasticizer.

Table 1 below presents the ingredients of the tested elastomeric composites.

TABLE 1

|  | ED01 | ED02 | ED03 | ED04 |
|---|---|---|---|---|
| NR (SMR 10) | 90.00 |  |  |  |
| PB (BR 1220) | 10.00 |  |  |  |
| zinc oxide | 5.00 |  |  |  |
| acid stearic | 2.00 |  |  |  |
| CLOISITE 30B | 5.00 | — | 5.00 | — |
| CLOISITE 15A | — | 5.00 | — | 5.00 |
| Mercaptosil (Si 69) | 5.00 |  |  |  |
| Plasticis1 (DOS) | — | — | 13.50 | 13.50 |
| Sulfur | 1.80 |  |  |  |
| Acceler1 (MBS) | 0.60 |  |  |  |
| Acceler2 (DPG) | 0.50 |  |  |  |
| Acceler3 (TMTM) | 0.25 |  |  |  |

FIG. 3 presents comparative stress-versus-strain plots of the tested elastomeric composites, and demonstrates the adverse effect of the plasticizer on the tensile strength of the composite.

The effect of plasticizer load was therefore tested, and composites comprising lower amount of the plasticizer were prepared, as depicted in Table 2.

TABLE 2

|  | ED53G | ED56G | ED59G |
|---|---|---|---|
| NR (SMR 10) | 90.00 | | |
| PB (BR 1220) | 10.00 | | |
| zinc oxide | 5.00 | | |
| acid stearic | 2.00 | | |
| CLOISITE 15A | 10.00 | | |
| Mersaptosilane (Si69) | 5.00 | | |
| Plasticizer (DOA) | — | 3.25 | 6.50 |
| Sulfur | 1.80 | | |
| Acceler1 (MBS) | 0.60 | | |
| Acceler2 (DPG) | 0.50 | | |
| Acceler3 (TMTM) | 0.25 | | |
| Retarder (PVI) | 0.75 | | |

FIG. 4 presents comparative plots of the stress-versus-strain curves of the tested elastomeric composites.

Example 3

Elastomeric Composites Containing Nanohybrids

Elastomeric composites were prepared in a one-pot method, in the presence of commercially available organo-modified nanoclays and mercaptosilane, or, alternatively, in the presence of an exemplary nanohybrid, RRA 194-2 (see, Example 1).

Table 3 below presents the ingredients of the tested elastomeric composites.

TABLE 3

|  | ED11-RG | ED34G |
|---|---|---|
| NR (SMR10) | 90.00 | |
| PB (BR 1220) | 10.00 | |
| zinc oxide | 5.00 | |
| acid stearic | 2.00 | |
| CLOISITE 15A | 10.00 | — |
| Nanohybrid (RRA 194-2R) | — | 15.00 |
| Mercaptosilane (Si 69) | 5.00 | — |
| Sulfur | 1.80 | |
| Acceler1 (MBS) | 0.60 | |
| Acceler2 (DPG) | 0.50 | |
| Acceler3 (TMTM) | 0.25 | |

FIG. 5 presents comparative plots of the stress-versus-strain curves of the tested elastomeric composites.

FIGS. 6A and 6B present the tear resistance and Work of tested composites. The improved performance of elastomeric composites containing the nanohybrids is clearly demonstrated in FIGS. 5 and 6A-B.

In order to further improve the performance of the elastomeric composites, Carbon Black and a retarding agent (retarder, PVI) were added, in various amounts and ratios.

Table 4 below presents the ingredients of the tested elastomeric composites.

TABLE 4

|  | ED60-252 | ED60-253 | ED60-254 | ED60-255 | ED60-256 |
|---|---|---|---|---|---|
| NR (SMR10) | 90.00 | | | | |
| PB (BR 1220) | 10.00 | | | | |
| zinc oxide | 5.00 | | | | |
| acid stearic | 2.00 | | | | |
| Black (HAF N330) | 45.00 | 40.00 | 40.00 | 45.00 | 45.00 |
| Nanohybr (RRA202-1) | 15.00 | 13.33 | 13.33 | 13.33 | 13.33 |
| Sulfur | 1.80 | 1.80 | 2.20 | 1.80 | 2.20 |
| Acceler1 (MBS) | 0.60 | | | | |
| Acceler2 (DPG) | 0.50 | | | | |
| Acceler3 (TMTM) | 0.25 | | | | |
| SANTOGARD PVI | 0.50 | 0.75 | 0.50 | 0.75 | 0.50 |

FIG. 7 presents comparative plots of the stress-versus-strain curves of the tested elastomeric composites.

FIGS. 8A and 8B present the M200 and elongation of the tested composites, and clearly shows the superior elasticity, yet high modulus, of ED60-253, in which a 3:1 ratio of CB:nanoclays, is used.

The Yerzley elasticity and other properties of elastomeric composites containing the nanohybrids, compared to commercial nanoclays, were further tested.

Table 5 below presents the ingredients of the compared elastomeric composites and Table 6 below presents the properties of the tested elastomeric composites.

TABLE 5

|  | E3 | ED64-3 |
|---|---|---|
| SMR 10 | 100.00 | 90.00 |
| BR 1220 | — | 10.00 |
| zinc oxide | 5.00 | 5.00 |
| acid stearic | 2.00 | 2.00 |
| Antioxid. PAN | 1.00 | — |
| ANTIOXIDANT 4010NA | 1.00 | — |
| Antioz. DPPD | 2.00 | — |
| HAF-LS | 50.00 | — |
| HAF N330 | — | 40.00 |
| Ultrasil VN3 | 10.00 | — |
| RRRA 204-3 | — | 13.33 |
| Si69 X50 | 2.50 | — |
| sulphur | 2.50 | 1.80 |
| Santocure MOR | 0.80 | — |
| SANTOCURE MBS | — | 1.20 |
| PERKACIT TMTM | 0.20 | 0.25 |
| PERKACIT DPG | — | 0.50 |
| Rheowax 721 | 0.50 | — |
| Struktol Akt. 73 | 4.00 | — |

TABLE 6

|  | E3 | ED64-3 |
|---|---|---|
| Mechanical properties | | — |
| Vulc temp (° C.) | 160 | 140 |
| Vulc time (min) | 10 | 12 |
| Hardness ShA | 75 | 73 |
| Tensile MPa | 24.80 | 25.52 |
| Elongation % | 398 | 356 |
| M100 MPa | 5.20 | 7.46 |
| M200 MPa | 11.60 | 13.99 |
| M300 MPa | 19.20 | 20.82 |
| Elast Yerzley % | 66.5 | 69.07 |

Table 6 further demonstrates the improvement in mechanical properties, particularly the improvement in elasticity, as reflected by the improved resilience (Yerzley), and further the improvement in elastic modulus (M200), when nanohybrid was used.

Based on the obtained data, the composite referred to in Table 1 as ED60-253 was selected for further studies. This composite comprises Carbon Black 40 phr and 13.33 nanohybrid.

Example 4

Elastomeric Composites Containing 40 Phr Carbon Black and 13.33 Phr Nanohybrid The effects of the amounts of sulfur and MBS, and the presence, type and/or amount of a plasticizer, a retarder and a dispersant, and of any combination thereof, were tested for elastomeric composites containing Carbon Black 40 phr and nanohybrid 13.33 phr.

In preliminary experiments, it was found that a combination of 1.8 parts sulfur, 1.2 parts MBS as accleratorl, 0.5 parts of DPG as accelerator2, and 0.25 parts of TMTM as acclerator3, provides elastomeric composites with better performance, compared to other amounts and/or components ratios.

The improvement in the module of elasticity of such exemplary elastomeric composites is exemplified in FIG. 9.

Table 7 below presents the ingredients of the tested elastomeric composites presented in FIG. 9. As shown in Table 7 and FIG. 9, a substantial improvement in the elasticity modulus is observed for the elastomeric composite in which the combination of components was optimized.

TABLE 7

| | ED34G | ED60-253 | ED253-OPT32 |
|---|---|---|---|
| NR (SMR10) | 90.00 | | |
| PB (BR 1220) | 10.00 | | |
| zinc oxide | 5.00 | | |
| acid stearic | 2.00 | | |
| Black (HAF N330) | — | 40.00 | 40.00 |
| Nanohybr1 (RRA 194-2R) | 15.00 | — | — |
| Nanohybr2 (RRA 202-1) | | 13.33 | |
| Sulfur | 1.80 | | |
| Acceler1 (MBS) | 0.60 | 0.60 | 1.20 |
| Acceler2 (DPG) | 0.50 | | |
| Acceler3 (TMTM) | 0.25 | | |
| Retarder (PVI) | — | 0.75 | — |

The effect of the type of vulcanization was also tested. The elastomeric composite ED60-253R2 was prepared using extrusion and steam vulcanization and using plate molded vulcanization, as indicated in FIG. 10.

Table 8 below presents the lists of ingredient of ED60-253R2.

TABLE 8

| | ED60-253R2 |
|---|---|
| NR (SMR10) | 90.00 |
| PB (BR 1220) | 10.00 |
| zinc oxide | 5.00 |
| acid stearic | 2.00 |
| Black (HAF N330) | 40.00 |
| Nanohybrid (RRA 202-1) | 13.33 |
| Sulfur | 1.80 |
| Acceler1 (MBS) | 0.60 |
| Acceler2 (DPG) | 0.50 |
| Acceler3 (TMTM) | 0.25 |
| Retarder (PVI) | 0.75 |

FIG. 10 presents comparative stress-versus-strain curves of the elastomeric composites prepared by the tested vulcanizations, and show that autoclaved (steamed) extruded composite exhibit somewhat reduced modulus, compared to the plate molded composite.

Further elastomeric composites, into which a processing aid was added, were tested. Such compositions were formulated in order to provide compositions which are suitable for extrusion processing (e.g., with steam), yet the effect of the processing aids on the elastic modulus and other mechanical properties is minimized.

Table 9 below presents the list of ingredients of an exemplary elastomeric composite, and Table 10 below presents the rheological and mechanical properties of this elastomeric composite.

TABLE 9

| | ED69-OPT33 |
|---|---|
| SMR 10 | 90.00 |
| BR 1220 | 10.00 |
| zinc oxide | 5.00 |
| acid stearic | 2.00 |
| HAF N330 | 40.00 |
| RRA 202-1 | 13.33 |
| sulphur | 1.80 |
| SANTOCURE MBS | 1.80 |
| PERKACIT DPG | 1.20 |
| SANTOGARD PVI | 1.00 |
| PERKACIT TMTM | 0.30 |
| STRUKTOL WB16 | 3.00 |
| CUMAR 80 | 1.50 |
| | 170.93 |

TABLE 10

| Rheological properties MDR D2000 140 C. | |
|---|---|
| MV lb-in | 1.40 |
| t2 min | 2.66 |
| t90 min | 10.60 |
| S1 | 12.39 |
| S1 − mV | 10.99 |
| Mechanical properties 140 C. | |
| Vulc time min | 13.00 |
| Hardness ShA | 74 |
| Tensile MPa | 23.72 |
| Elongation % | 342 |
| M100 MPa | 6.65 |
| M200 MPa | 13.27 |
| M300 MPa | 20.37 |
| M300/M100 | 3.06 |
| Work | 5.09 |

In further comparative studies, elastomeric composites comprising similar ingredients to those used for ED60-253R2, yet in which the nanoclay hybrids were replaced by commercial graphene nanoparticles, were tested.

An inferior performance of these elastomeric composites, compared to the composites comprising the anti-oxidant modified nanoclay hybrids, as described hereinabove, was clearly demonstrated (data not shown)

Example 6

Elastomeric Composites Containing 40 Phr Carbon Black and 13.33 Phr Various Nanohybrids The effect of the type of the nanohybrid used was tested for elastomeric composites containing Carbon Black 40 phr and nanohybrid 13.33 phr, wherein the tested nanohybrids were RRA201-1; RRA 206-2; and RRA207-1, all prepared as described in Example 1 hereinabove and in Table 11 below.

TABLE 11

| | | NanoHybrids | | |
|---|---|---|---|---|
| | | RRA201-1 | RRA206-2 | RRA207-1 |
| 2 h 80 C. | Cloisite 15A | 40 | 40 | 40 |
| | water | 400 | 200 | — |
| | Isopropyl alcohol | 200 | 400 | — |
| | Dimethyl formamide | — | — | 600 |
| | IPPD | 1.51 | 1.51 | 1.51 |
| 7 h 80 C. | Si 69 | 13.33 | 13.33 | 13.33 |

Table 12 below presents the list of ingredients of exemplary elastomeric composites, differing from one another by the type of the nanohybrid, and Table 13 below presents the rheological and mechanical properties of these elastomeric composites.

As can be seen, while all composites containing the nanohybrids exhibit high elongation, high Scorch time (t2) and high Work values, the best performance was obtained with RRA 206-2 nanohybrid, and further comparative studies were performed with elastomeric composites comprising this nanohybrid.

TABLE 12

| | ED69-OPT33 | ED70-2 | ED70-3 |
|---|---|---|---|
| SMR 10 | 90.00 | — | — |
| SMR CV60 | — | 90.00 | 90.00 |
| BR 1220 | 10.00 | 10.00 | 10.00 |
| zinc oxide | 5.00 | 5.00 | 5.00 |
| acid stearic | 2.00 | 2.00 | 2.00 |
| HAF N330 | 40.00 | 40.00 | 40.00 |
| RRA 202-1 | 13.33 | — | — |
| RRA 206-2 | — | 13.33 | — |
| RRA 207-1 | — | — | 13.33 |
| sulphur | 1.80 | 1.80 | 1.80 |
| SANTOCURE MBS | 1.80 | 1.80 | 1.80 |
| PERKACIT DPG | 1.20 | 1.20 | 1.20 |
| SANTOGARD PVI | 1.00 | 1.00 | 1.00 |
| PERKACIT TMTM | 0.30 | 0.30 | 0.30 |
| STRUKTOL WB16 | 3.00 | 3.00 | 3.00 |
| CUMAR 80 | 1.50 | 1.50 | 1.50 |
| | 170.93 | 170.93 | 170.93 |

TABLE 13

| | ED69-OPT33 | ED70-2 | ED70-3 |
|---|---|---|---|
| Rheological properties MDR D2000 140 C. | | | |
| MV lb-in | 1.40 | 1.51 | 1.57 |
| t2 min | 2.66 | 2.33 | 2.41 |
| t90 min | 10.60 | 14.12 | 12.96 |
| t100 min | 23.45 | 23.95 | 23.93 |
| S1 min | 12.39 | 15.73 | 19.96 |
| S2 min | 0.01 | 0.03 | 0.67 |
| tan | 0.001 | 0.002 | 0.034 |
| Rev 0.5 | — | — | — |
| S1 – mV | 10.99 | 14.22 | 18.39 |
| Mechanical properties 140 C. | | | |
| Vulc time min | 13.00 | 17.00 | 15.00 |
| Hardness ShA | 74 | 78 | 79 |
| Tensile MPa | 23.72 | 23.23 | 22.53 |
| Elongation % | 342 | 396 | 393 |
| M100 MPa | 6.65 | 6.11 | 5.73 |
| M200 MPa | 13.27 | 11.34 | 11.07 |

TABLE 13-continued

| | ED69-OPT33 | ED70-2 | ED70-3 |
|---|---|---|---|
| M300 MPa | 20.37 | 17.09 | 16.91 |
| Tear N/mm | — | 52.00 | 53.50 |
| M300/M100 | 3.06 | 2.80 | 2.95 |
| Work | 5.09 | 6.24 | 5.76 |

Example 7

Elastomeric Composite Containing 20 Phr Carbon Black and 20 Phr Nanohybrid

Elastomeric composites containing Carbon Black 20 phr and nanohybrid 20 phr, were further tested, in order to test the effect of the CB/nanohybrid ratio on the stress relaxation and creep. Various combinations of accelerators, processing aid agents, retarders and plasticizers were also tested. Tables 14 and 15 present the list of ingredients of exemplary elastomeric composites, comprising the nanohybrid RRA 206-2 20 phr and Carbon Black 20 phr, and differing from one another by the vulcanization system used. Thus, for example, in elastomeric composite ED77-06 (Table 14), a vulcanization system comprising sulfur 0.70 phr, SANTO-CURE MBS 1.70 phr, and PERKACIT TETD 0.70 phr, which has been described in the literature [Natural rubber formulary], in combination with the processing aid STRUK-TOL ZEH (ZEH=zinc diethyl hexanoate), which has also been described in the literature for imparting low stress relaxation, was tested and compared to the previously tested system used in elastomeric composite ED 76-06 (see, for example, Tables 9 and 12).

TABLE 15

| | ED77-06 |
|---|---|
| SMR CV60 | 90.00 |
| BR 1220 | 10.00 |
| zinc oxide | 5.00 |
| HAF N330 | 20.00 |
| RRA 206-2 | 20.00 |
| sulphur | 0.70 |
| SANTOCURE MBS | 1.70 |
| PERKACIT TETD | 0.70 |
| STRUKTOL WB16 | 3.00 |
| CUMAR 80 | 1.50 |
| STRUKTOL ZEH-DL | 1.00 |
| | 153.60 |

TABLE 14

| | ED76-06 |
|---|---|
| SMR CV60 | 90.00 |
| BR 1220 | 10.00 |
| zinc oxide | 5.00 |
| acid stearic | 2.00 |
| HAF N330 | 20.00 |
| RRA 206-2 | 20.00 |
| sulphur | 1.80 |
| SANTOCURE MBS | 1.80 |
| PERKACIT DPG | 1.20 |

TABLE 14-continued

|  | ED76-06 |
|---|---|
| SANTOGARD PVI | 1.00 |
| PERKACIT TMTM | 0.30 |
| STRUKTOL WB16 | 3.00 |
| CUMAR 80 | 1.50 |
|  | 157.60 |

The rheological and mechanical properties of these elastomeric composites are presented in Tables 19 and 20, respectively. As can be seen therein, desired values of parameters such as t2, elongation, Work and creep, are exhibited by the elastomeric composition which comprises a combination of accelerators, processing aids, and sulfur, as devised and described hereinabove (although not comprising the literature recommended Struktol ZEH), and inferior values are exhibited for composites comprising the known vulcanization system.

TABLE 17

|  | ED77-06 |
|---|---|
| Rheological properties MDR D2000 140 C. | |
| MV lb-in | 1.06 |
| t2 min | 1.84 |
| t90 min | 17.18 |
| S1 min | 11.19 |
| S2 min | 0.01 |
| tan | 0.001 |
| S1 − mV | 10.13 |
| Mechanical properties 140 C. | |
| Vulc time min | 20.00 |
| Hardness ShA | 72 |
| Tensile MPa | 23.29 |
| Elongation % | 336 |
| M100 MPa | 7.45 |
| M200 MPa | 13.16 |
| M300 MPa | 20.24 |
| M300/M100 | 2.72 |
| Tear N/mm | 54.80 |
| Work | 4.69 |
| Creep | 302.87 |

TABLE 16

|  | ED76-06 |
|---|---|
| Rheological properties MDR D2000 140 C. | |
| MV lb-in | 0.91 |
| t2 min | 2.93 |
| t90 min | 14.37 |
| S1 min | 11.92 |
| S2 min | 0.01 |
| tan | 0.001 |
| S1 − mV | 11.01 |
| Mechanical properties 140 C. | |
| Vulc time min | 17.00 |
| Hardness ShA | 75 |
| Tensile MPa | 22.50 |
| Elongation % | 405 |
| M100 MPa | 6.66 |
| M200 MPa | 10.65 |
| M300 MPa | 15.36 |
| M300/M100 | 2.31 |
| Tear N/mm | 51.00 |
| Work | 5.76 |
| Creep | 294.02 |

Further elastomeric composites were tested for the effect of the type of an additional ZEH-containing processing aid on the composite's performance.

The lists of ingredients of these elastomeric composites are presented in Table 18 below, and the rheological and mechanical properties of these elastomeric composites are presented in Table 19 below.

As can be seen therein, the addition of ZEH-containing processing aid (with or without a carrier) results in higher values of t2, elongation, modulus, and reduced creep.

TABLE 18

|  | ED80-07 | ED86-01 |
|---|---|---|
| SMR CV60 | 90.00 | — |
| SMR 10 | — | 90.00 |
| BR 1220 | 10.00 | 10.00 |
| zinc oxide | 5.00 | 5.00 |
| acid stearic | 2.00 | 2.00 |
| HAF N330 | 20.00 | 20.00 |
| RRA 206-2 | 20.00 | 20.00 |
| sulphur | 1.80 | 1.80 |
| SANTOCURE MBS | 1.80 | 1.80 |
| PERKACIT DPG | 0.40 | 0.40 |
| SANTOGARD PVI | 0.20 | 0.20 |
| STRUKTOL WB16 | 3.00 | 3.00 |
| CUMAR 80 | 1.50 | 1.50 |
| STRUKTOL ZEH-DL | 2.00 | — |
| Struktol ZEH | — | 1.30 |
|  | 157.70 | 157.00 |

TABLE 19

|  | ED80-07 | ED86-01 |
|---|---|---|
| Rheological properties MDR D2000 140 C. | | |
| MV lb-in | 0.48 | 0.80 |
| t2 min | 3.06 | 3.16 |
| t90 min | 12.26 | 14.52 |
| S1 min | 23.94 | 11.64 |
| S2 min | 9.66 | 0.80 |
| tan | 0.62 | 0.069 |
| S1 − mV | 23.46 | 10.84 |
| Mechanical properties 140 C. | | |
| Vulc time min | 15.00 | 17.00 |
| Hardness ShA | 64 | 71 |
| Tensile MPa | 24.33 | 24.29 |
| Elongation % | 452 | 427 |
| M100 MPa | 4.55 | 6.49 |
| M200 MPa | 8.55 | 10.45 |
| M300 MPa | 13.10 | 15.31 |
| M300/M100 | 2.88 | 2.36 |
| Tear N/mm | 44.40 | 57.00 |
| Creep | 219.92 | 281.65 |

Example 8

Elastomeric Composites Containing Various Carbon Black/Nanohybrid Ratios

Elastomeric composites comprising various Carbon black/nanohybrid ratios, with and without various concentrations of the Struktol ZEH-DL processing aid, were prepared and tested.

The lists of ingredients of these elastomeric composites are presented in Table 20 below and the rheological and mechanical properties are presented in Table 21 below.

TABLE 20

| | ED76-06 | ED80-01 | ED80-06 | ED80-07 | ED82-1 |
|---|---|---|---|---|---|
| SMR CV60 | 90.00 | — | 90.00 | 90.00 | 90.00 |
| SMR 10 | — | 90.00 | — | — | — |
| BR 1220 | 10.00 | 10.00 | 10.00 | 10.00 | 10.00 |
| zinc oxide | 5.00 | 5.00 | 5.00 | 5.00 | 5.00 |
| acid stearic | 2.00 | 2.00 | 2.00 | 2.00 | 2.00 |
| HAF N330 | 20.00 | 40.00 | 20.00 | 20.00 | 30.00 |
| RRA 206-2 | 20.00 | 13.33 | 20.00 | 20.00 | 17.00 |
| sulphur | 1.80 | 1.80 | 1.80 | 1.80 | 1.80 |
| SANTOCURE MBS | 1.80 | 1.80 | 1.80 | 1.80 | 1.80 |
| PERKACIT DPG | 1.20 | 0.40 | 0.40 | 0.40 | 0.40 |
| SANTOGARD PVI | 1.00 | 0.20 | 0.20 | 0.20 | 0.20 |
| PERKACIT TMTM | 0.30 | 0.30 | — | — | — |
| STRUKTOL WB16 | 3.00 | 3.00 | 3.00 | 3.00 | 3.00 |
| CUMAR 80 | 1.50 | 1.50 | 1.50 | 1.50 | 1.50 |
| STRUKTOL ZEH-DL | — | — | 1.00 | 2.00 | 2.00 |
| | 157.60 | 169.03 | 156.70 | 157.70 | 164.70 |

TABLE 21

| | ED76-06 | ED80-01 | ED80-06 | ED80-07 | ED82-1 |
|---|---|---|---|---|---|
| Rheological properties MDR D2000 140 C. | | | | | |
| MV lb-in | 0.91 | 1.23 | 0.80 | 0.48 | 1.02 |
| t2 min | 2.93 | 2.65 | 3.00 | 3.06 | 3.20 |
| t90 min | 14.37 | 13.25 | 12.18 | 12.26 | 14.11 |
| S1 min | 11.92 | 23.99 | 23.80 | 23.94 | 23.83 |
| S2 min | 0.01 | 12.78 | 9.61 | 9.66 | 12.71 |
| tan | 0.001 | 0.16 | 0.74 | 0.62 | 1.02 |
| S1 − mV | 11.01 | 22.76 | 23.00 | 23.46 | 22.81 |
| Mechanical properties 140 C. | | | | | |
| Vulc time min | 17.00 | 16.00 | 15.00 | 15.00 | 17.00 |
| Hardness ShA | 75 | 76 | 65 | 64 | 78 |
| Tensile MPa | 22.50 | 23.70 | 22.85 | 24.33 | 22.73 |
| Elongation % | 405 | 429 | 425 | 452 | 374 |
| M100 MPa | 6.66 | 5.34 | 4.78 | 4.55 | 6.71 |
| M200 MPa | 10.65 | 10.21 | 9.06 | 8.55 | 11.60 |
| M300 MPa | 15.36 | 15.67 | 14.15 | 13.10 | 17.40 |
| M300/M100 | 2.31 | 2.93 | 2.96 | 2.88 | 2.59 |
| Tear N/mm | 51.00 | 60.10 | 49.30 | 44.40 | 52.90 |
| Creep | 294.02 | 246.22 | 231.93 | 219.92 | 267.17 |

As can be seen, the addition of ZEH-containing processing aid improved parameters such as creep, t2 and elongation in all tested CB/nanohybrid ratios. The best value for M200 was obtained for a composite comprising 30 phr CB and 17 phr nanohybrid.

Further elastomeric compositions were prepared, using various ratios of Carbon black/nanohybrid, and using the same content of Struktol ZFH, and of other components of the vulcanization system.

The lists of ingredients of these elastomeric composites are presented in Table 22 below and the rheological and mechanical properties are presented in Table 23 below.

TABLE 22

| | ED86-05 | ED86-03 | ED86-02 | ED86-04 |
|---|---|---|---|---|
| SMR 10 | 90.00 | 90.00 | 90.00 | 90.00 |
| BR 1220 | 10.00 | 10.00 | 10.00 | 10.00 |
| zinc oxide | 5.00 | 5.00 | 5.00 | 5.00 |
| acid stearic | 2.00 | 2.00 | 2.00 | 2.00 |
| HAF N330 | 40.00 | 20.00 | 30.00 | 30.00 |
| RRA 206-2 | 13.00 | 20.00 | 17.00 | 17.00 |
| sulphur | 1.80 | 1.80 | 1.80 | 1.80 |
| SANTOCURE MBS | 1.80 | 1.80 | 1.80 | 1.80 |
| PERKACIT DPG | 0.40 | 0.40 | 0.40 | 0.40 |
| SANTOGARD PVI | 0.20 | 0.20 | 0.20 | 0.20 |
| STRUKTOL WB16 | 3.00 | 3.00 | 3.00 | 3.00 |
| Struktol ZEH | 1.30 | 1.30 | 1.30 | 1.30 |
| CUMAR 80 | 1.50 | 1.50 | 1.50 | 1.50 |
| | 170.00 | 157.00 | 164.00 | 164.00 |

TABLE 23

| | ED86-05 | ED86-03 | ED86-02 | ED86-04 |
|---|---|---|---|---|
| Rheological properties MDR D2000 140 C. | | | | |
| MV lb-in | 1.59 | 0.95 | 1.10 | 1.24 |
| t2 min | 2.95 | 3.22 | 2.91 | 3.06 |
| t90 min | 13.17 | 14.76 | 13.64 | 14.15 |
| t100 min | 23.82 | 23.84 | 23.83 | 23.81 |
| S2 min | 1.16 | 0.80 | 0.96 | 0.96 |
| tan | 0.083 | 0.070 | 0.078 | 0.073 |
| Mechanical properties 140 C. | | | | |
| Vulc time min | 16.00 | 17.00 | 16.00 | 17.00 |
| Hardness ShA | 75 | 70 | 73 | 74 |
| Tensile MPa | 23.22 | 26.77 | 24.50 | 24.41 |
| Elongation % | 364 | 451 | 414 | 409 |
| M100 MPa | 6.84 | 6.52 | 6.43 | 6.55 |
| M200 MPa | 12.72 | 10.50 | 11.05 | 11.22 |
| M300 MPa | 19.45 | 15.44 | 16.50 | 16.77 |
| M300/M100 | 2.84 | 2.37 | 2.57 | 2.56 |
| Work | 5.64 | 6.94 | 6.43 | 5.97 |
| Tear N/mm | 52.50 | 56.50 | 53.50 | 56.00 |
| Creep | 236.30 | 259.96 | 273.74 | 222.56 |

As can be seen, the use of CB 30 phr and nanohybrid 17 phr resulted in improvements in both creep and M200, and also in t2. It is to be noted that typically, when M200 is increased, creep is also increased, and that in the composite presented herein, M200 was shown to increase and creep decreased.

Example 9

Elastomeric Composites Containing 30 Phr Carbon Black, 17 Phr Nanohybrid and a Mercaptosilane Elastomeric composites containing Carbon black 30 phr and nanohybrid RRA 206-2, and further containing mercaptosilane Si69 at various concentrations, and the processing aid Struktol ZEH, were prepared, while further manipulating the amounts of the accelerators used.

The lists of ingredients of these elastomeric composites are presented in Table 24 below, and the rheological and mechanical properties of these elastomeric composites are presented in Table 25 below.

As can be seen therein, parameters such as t2, M200 and Work were improved by the addition of the mercaptosilane.

TABLE 24

| | ED86-04(21) | ED86-04(211) | ED86-04(262) |
|---|---|---|---|
| SMR 10 | 90.00 | 90.00 | 90.00 |
| BR 1220 | 10.00 | 10.00 | 10.00 |
| zinc oxide | 5.00 | 5.00 | 5.00 |

TABLE 24-continued

|  | ED86-04(21) | ED86-04(211) | ED86-04(262) |
|---|---|---|---|
| acid stearic | 2.00 | 2.00 | 2.00 |
| HAF N330 | 30.00 | 30.00 | 30.00 |
| RRA 206-2 | 17.00 | 17.00 | 17.00 |
| Si 69 | — | 2.00 | 3.00 |
| sulphur | 1.80 | 1.80 | 1.80 |
| SANTOCURE MBS | 1.80 | 1.80 | — |
| MBS (KZB) | — | — | 1.80 |
| PERKACIT DPG | 0.40 | 0.40 | 0.55 |
| SANTOGARD PVI | 0.20 | 0.20 | 0.20 |
| PERKACIT TMTM | — | — | 0.15 |
| STRUKTOL WB16 | 3.00 | 3.00 | 3.00 |
| CUMAR 80 | 1.50 | 1.50 | 1.50 |
| Struktol ZEH | 1.30 | 1.30 | 1.30 |
|  | 164.00 | 166.00 | 167.30 |

TABLE 25

|  | ED86-04(21) | ED86-04(211) | ED86-04(262) |
|---|---|---|---|
| Rheological properties | | | |
| MV lb-in | 1.22 | 0.49 | 0.69 |
| t2 min | 3.05 | 3.10 | 4.31 |
| t90 min | 13.23 | 15.34 | 16.45 |
| S1 min | 11.21 | 12.83 | 12.59 |
| S2 min | 0.86 | 0.98 | 0.97 |
| tan | 0.077 | 0.076 | 0.077 |
| S1 – mV | 9.99 | 12.34 | 11.90 |
| Mechanical properties 140 C. | | | |
| Vulc time min | 16.00 | 18.00 | 19.00 |
| Hardness ShA | 71 | 72 | 72 |
| Tensile MPa | 25.88 | 25.45 | 23.95 |
| Elongation % | 421 | 412 | 387 |
| M100 MPa | 6.27 | 5.79 | 6.99 |
| M200 MPa | 10.83 | 11.04 | 12.14 |
| M300 MPa | 16.55 | 17.06 | 17.89 |
| M300/M100 | 2.64 | 2.95 | 2.56 |
| Work | 4.09 | 4.09 | 6.18 |
| Creep | 222.20 | 263.50 | — |

Example 10

Elastomeric Composites Comprising SBR Rubber and Nanohybrids

In general, elastomeric composites are prepared by mixing an SBR rubber with modified nanoclays as described herein, and a vulcanization agent (sulfur), and optionally with other ingredients such as fillers (e.g., carbon black, zinc oxide), acid, processing aids, accelerators, etc., as indicated. The mixture is then subjected to vulcanization and rheological and mechanical measurements are performed, as described hereinabove.

The obtained modified NCs, termed herein RRA 181-1 (see, Example 1) were mixed with SBR rubber and carbon black (HAF N330), to produce SBR rubber composite. For comparison, the same rubber composite was prepared with RRA 10 (modified nanoclay not in association with an antioxidant, as described herein).

Table 26 below presents the ingredients of 5267-1 (SBR rubber composite comprising RRA 10) and of S257-2R (SBR rubber composite with RRA 181-1).

TABLE 26

| Ingredient | S267-1 | S257-2R |
|---|---|---|
| Synpol1502 | 100.00 | 100.00 |
| acid stearic | 1.00 | 1.00 |
| zinc oxide | 3.00 | 3.00 |
| HAF. N330 | 15.00 | 15.00 |
| RRA 10 | 17.50 | — |
| RRA 181-1 | — | 17.50 |
| sulfur | 1.60 | 1.60 |
| MBS | 1.30 | 1.30 |
| STRUKTOL TS35 | 1.14 | 1.14 |

Table 27 below presents the properties of the compositions S267-1 and S257-2R as measured at 150° C. Some key features are also shown in graphic form in FIG. 29.

TABLE 27

|  | S267-1 | S257-2R |
|---|---|---|
| Rheological properties | | |
| mV lb-in | 0.79 | 1.06 |
| t2 min | 5.88 | 2.87 |
| t90 min | 25.43 | 23.29 |
| t100 min | 35.93 | 36.00 |
| S1 lb-in | 12.46 | 14.36 |
| tan | 0.035 | 0.032 |
| S1 – mV | 11.67 | 13.30 |
| Mechanical properties | | |
| Vulc time min | 28.00 | 26.00 |
| Hardness ShA | 63 | 70 |
| Tensile MPa | 18.59 | 23.16 |
| Elongation % | 435 | 403 |
| M100 MPa | 2.69 | 5.06 |
| M200 MPa | 6.90 | 10.79 |
| M300 MPa | 11.00 | 16.66 |
| Hchg ShA | 9 | 6 |
| Tchg % | −24.15 | −15.28 |
| Echg % | −55.61 | −41.88 |
| Tear N/mm | 52.10 | 57.20 |

As can be seen in Table 27 and FIG. 29, addition of the amine antioxidant significantly improved the tear resistance, modulus at various stretching lengths, tensile strength and hardness, compared to previously discloses organomodified nanoclays. In addition, ageing properties of the nanoclays were improved.

Without being bound by any particular theory, it is assumed that the added mercaptosilane interacts with free hydroxy groups on the modified NCs surface and may further react with silica (if added to the rubber formulation). The mercaptosilane may undergo condensation in the presence of water, and thus may contribute to the mechanical strength of the resulting rubber.

It is to be noted that the reactions to prepare the modified NCs disclosed herein are not necessarily carried out to completion, since experiments have so far shown that after 7 hours reaction with the TESPT there were no significant improvements in the mechanical properties of the products.

Without being bound by any particular theory, it is assumed that by the addition of an antioxidant to the modified nanoclays (Cloisite 15A) before the addition of mercaptosilane (e.g., TESPT; Si69), the process of increasing distance between the layers of the NC (a process begun during production of the modified NC by treating MMT with quaternary tallow ammonium salt) continues, due to the long-chain residues of the amine antioxidant. Such "spacing" of the NC layers increases the surface area of the NCs and such that the silanization, by the mercaptosilane occurs on a larger surface.

Example 11

Elastomeric Composites without Carbon Black

Elastomeric composites devoid of carbon black (CB) were produced: S96-1G comprising (prior art) RRA 10, S266-1G comprising RRA 181-1 (see, Example 1), and S270-1G comprising RRA 189-2 (see, Example 1). Table 28 below lists the ingredients in the three elastomeric composites.

TABLE 28

| Ingredient | S96-1G | S266-1G | S270-1G |
|---|---|---|---|
| Synpol1502 | 100.00 | 100.00 | 100.00 |
| acid stearic | 1.00 | 1.00 | 1.00 |
| zinc oxide | 3.00 | 3.00 | 3.00 |
| RRA 10 | 10.00 | — | — |
| RRA 181-1 | — | 10.00 | — |
| RRA 189-2 | — | — | 10.00 |
| sulfur | 1.75 | 1.75 | 1.75 |
| Santocure TBBS | 1.00 | 1.00 | 1.00 |

Table 29 below presents the properties of the compositions S96-1G, S266-1G and S270-1G as measured at 170° C. Some key features are also shown in graphic form in FIG. 30.

TABLE 29

|  | S96-1G | S266-1G | S270-1G |
|---|---|---|---|
| Rheological properties |  |  |  |
| mV lb-in | 0.76 | 0.63 | 0.50 |
| t2 min | 2.52 | 1.27 | 1.45 |
| t90 min | 9.75 | 10.01 | 6.28 |
| S1 lb-in | 10.59 | 9.13 | 8.09 |
| tan | 0.029 | 0.023 | 0.022 |
| S1 − mV | 9.83 | 8.50 | 7.59 |
| Mechanical properties |  |  |  |
| Vulc time min | 12 | 13 | 9 |
| Hardness ShA | 48 | 57 | 55 |
| Tensile MPa | 10.40 | 10.40 | 10.61 |
| Elongation % | 519 | 327 | 454 |
| M200 MPa | 2.39 | 5.57 | 3.70 |
| M300 MPa | 3.12 | 3.54 | 3.19 |
| Tear N/mm | 24.4 | 39.2 | 39.1 |
| Elast. Yerzley % | 79.32 | 76.44 | 76.46 |

As can be seen in Table 29 and FIG. 30, and similarly to the elastomeric composites containing CB, elastomeric composite containing the modified NCs as disclosed herein, which comprise the amine antioxidant (DDA or IPPD) exhibited improved tear resistance, shear modulus at various stretching lengths, and hardness, with no essential change in elasticity. 5266-1G and S270-1G exhibited similar tear resistance, tensile strength, hardness and elasticity. The main improvement resulting from the incorporation of DDA and SBS over incorporation of IPPD was increasing scorch time (t2) and reducing of vulcanization time (DDA as amine is also a strong accelerator). However, IPPD has anti-ozone properties that may improve the wear resistance of the elastomeric composites.

Example 12

Additional Comparative Elastomeric Composites Devoid of CB

Additional exemplary elastomeric composites were prepared as described in Example 11 hereinabove, while replacing the accelerator TBBS by MBS.

The modified RRA 190-5, which was prepared while using MBS and into which silica was added during preparation was compared with RRA 50R, previously reported modified NCs into which silica was also added during preparation (see, Example 1 hereinabove).

Table 30 below lists the ingredients used to prepare the elastomeric composites termed herein S278-1G, that includes the previously reported RRA 50R, S274-5G, which includes RRA 190-5.

TABLE 30

| Ingredient | S278-1G | S274-5G |
|---|---|---|
| Synpol1502 | 100.00 | 100.00 |
| acid stearic | 1.00 | 1.00 |
| zinc oxide | 3.00 | 3.00 |
| HAF. N330 | 15.00 | 15.00 |
| RRA 50R | 10.00 | — |
| RRA 190-5 | — | 10.00 |
| sulfur | 1.75 | 1.75 |
| STRUKTOL MBS | 1.00 | 1.00 |

Table 31 below presents the properties of the compositions S278-1G and S274-5G as measured at 150° C. Some key features are also shown in graphic form in FIG. 31.

TABLE 31

|  | S278-1G | S274-5G |
|---|---|---|
| Rheological properties |  |  |
| mV lb-in | 0.55 | 0.61 |
| t2 min | 5.14 | 3.53 |
| t90 min | 23.98 | 21.12 |
| tan | 0.023 | 0.022 |
| S1 − mV | 8.69 | 7.71 |
| Mechanical properties |  |  |
| Vulc time min | 26 | 24 |
| Hardness ShA | 52 | 55 |
| Tensile MPa | 9.94 | 11.08 |
| Elongation % | 538 | 453 |
| M200 MPa | 2.48 | 3.11 |
| M300/M100 | 2.43 | 3.11 |
| Tear N/mm | 35.72 | 44.40 |
| Elast. Yerzley % | 80.42 | 78.89 |

As can be seen in Table 31, the elastomeric composites made with the accelerant MBS exhibited similar features to those observed with elastomeric composites made with the accelerant TBBS, namely, a general improvement in physical properties as a result of using the modified nanoclays as disclosed herein was observed, particularly a significant improvement of tear resistance, tensile strength and modulus, while retaining elasticity.

It is to be noted that in the modified nanoclays used in forming the elastomeric composite S274-5G, RRA 190-5, an accelerator SBS and a filler SiO$_2$ were added to the nanoclays composition-of-matter. The role of SiO$_2$ addition is discussed hereinabove. It is further assumed that when an accelerator is added during nanoclays formation, the properties of an elastomeric composite containing such nanoclays are further improved.

Example 13

Comparative Elastomeric Composites Containing Modified NCs Prepared in the Presence or Absence of an Acid The modified NCs RRA 181-1 and RRA189-2, described in Example 1 hereinabove, were prepared using acetic acid as a catalyst for the reaction of the mercaptosilane with the NCs. However, RRA 190-5 was prepared without use of the acetic acid or any other acid catalyst. Similarly, RRA 189-4 (see, Example 1) differs from RRA-189-2 (see, Example 1) by the absence of addition of an acid catalyst (acetic acid) during NCs modification.

The effect of the presence of an acid catalyst during modified NCs preparation on the properties of elastomeric composites containing the modified NCs is presented herein by comparing various elastomeric composites containing RRA-189-2 or RRA-189-4.

Table 32 lists the ingredients of the non-CB elastomeric composites S270-5G and S270-7G.

TABLE 32

| Ingredient | S270-5G | S270-7G |
|---|---|---|
| Synpol1502 | 100.00 | 100.00 |
| acid stearic | 1.00 | 1.00 |
| zinc oxide | 3.00 | 3.00 |
| RRA 189-2 | 8.00 | — |
| RRA 189-4 | — | 8.00 |
| sulfur | 1.75 | 1.75 |
| SANTOCURE MBS | 1.00 | 1.00 |

Table 33 presents the properties of the elastomeric composites S270-5G and S270-7G, as measured at 150° C.

TABLE 33

| | S270-5G | S270-7G |
|---|---|---|
| Rheological properties | | |
| mV lb-in | 0.64 | 0.64 |
| t2 min | 3.47 | 3.54 |
| t90 min | 15.57 | 14.63 |
| tan | 0.021 | 0.022 |
| S1 − mV | 7.38 | 7.56 |
| Mechanical properties | | |
| Vulc time min | 18 | 17 |
| Hardness ShA | 55 | 54 |
| Tensile MPa | 10.18 | 11.04 |
| Elongation % | 438 | 478 |
| M200 MPa | 3.58 | 3.53 |
| M300/M100 | 3.27 | 3.43 |
| Tear N/mm | 34.70 | 35.70 |

Table 34 lists the ingredients of CB-containing elastomeric composites S268-2 (containing RRA 189-2) and S269-2 (containing RRA 189-4).

TABLE 34

| Ingredient | S268-2 | S269-2 |
|---|---|---|
| Synpol1502 | 100.00 | 100.00 |
| acid stearic | 1.00 | 1.00 |
| zinc oxide | 3.00 | 3.00 |
| HAF N330 | 15.00 | 15.00 |
| RRA 189-2 | 25.54 | — |
| RRA 189-4 | — | 25.54 |
| sulfur | 1.90 | 1.90 |
| SANTOCURE MBS | 1.00 | 1.00 |
| Structol TS35 | 1.14 | 1.14 |

Structol TS35 is a dispersant.

Table 35 presents the properties of the elastomeric composites S268-2 and S269-2, as measured at 150° C.

TABLE 35

| Rheological properties | S268-2 | S269-2 |
|---|---|---|
| mV lb-in | 0.95 | 0.89 |
| t2 min | 2.22 | 2.42 |
| t90 min | 23.36 | 23.95 |
| tan | 0.031 | 0.034 |
| S1 − mV | 13.73 | 13.36 |
| Mechanical properties | S270-5G | S270-7G |
| Vulc time min | 26 | 26 |
| Hardness ShA | 72 | 70 |
| Tensile MPa | 23.89 | 24.70 |
| Elongation % | 407 | 460 |
| M200 MPa | 12.28 | 10.72 |
| M300/M100 | 2.66 | 2.79 |
| Tear N/mm | 61.30 | 57.90 |

Table 36 lists the ingredients of elastomeric composites S269-11 (containing RRA 189-2) and S269-21 (containing RRA 189-4), both containing CB and silica.

TABLE 36

| Ingredient | S269-11 | S269-21 |
|---|---|---|
| Synpol1502 | 100.00 | 100.00 |
| acid stearic | 1.00 | 1.00 |
| zinc oxide | 3.00 | 3.00 |
| HAF N330 | 15.00 | 15.00 |
| RRA 189-2 | 25.54 | — |
| RRA 189-4 | — | 25.54 |
| PERKASIL KS 408 | 10.00 | 10.00 |
| sulfur | 1.90 | 1.90 |
| SANTOCURE MBS | 1.00 | 1.00 |
| Structol TS35 | 1.14 | 1.14 |

Table 37 presents the properties of the elastomeric composites S269-11 and S269-21, as measured at 150° C.

TABLE 37

| Rheological properties | S268-2 | S269-2 |
|---|---|---|
| mV lb-in | 1.66 | 1.63 |
| t2 min | 1.94 | 2.15 |
| t90 min | 20.16 | 19.94 |
| tan | 0.049 | 0.050 |
| S1 − mV | 13.88 | 13.70 |
| Mechanical properties | S270-5G | S270-7G |
| Vulc time min | 23 | 23 |
| Hardness ShA | 71 | 71 |
| Tensile MPa | 24.00 | 25.30 |

TABLE 37-continued

| | | |
|---|---|---|
| Elongation % | 448 | 412 |
| M200 MPa | 9.51 | 11.42 |
| M300/M100 | 3.48 | 3.38 |
| Tear N/mm | 56.90 | 69.60 |

The data presented in Tables 33-37 indicate that in some composites, adding acetic acid during preparation of modified NCs may improve the elastomeric composites; however, in other compositions omitting the acetic acid may actually overall improve the properties of the elastomeric composites. An improvement of tensile strength and tear resistance is apparent in the elastomeric composites S270-7G and S269-21, in which the modified NC is prepared without acetic acid (RRA 189-4). It is noted that a particularly high tear threshold, which is known as suitable for e.g., tire applications, was observed for S269-21, despite the low CB content of the composite (15 phr).

Example 14

Elastomeric Composites Containing Modified NCs Prepared with and without Silica

The effect of the addition of silica during preparation of the modified NCs as described herein can be seen while comparing the properties of S270-7G, which contain RRA 190-5 (see, Table 33) and S274-5G, which contain RRA 189-4 (see, Table 31). As described and discussed hereinabove, silica is added during the preparation of RRA 190-5.

S274-5G, containing RRA 190-5, has a significantly higher tear threshold, and higher tensile strength, compared with S270-7G, indicating that the addition of silica during the preparation of modified NCs as described herein beneficially affect the strength of elastomeric composites containing the modified NCs as described herein.

Example 15

Elastomeric Composites Containing Modified NCs Prepared Using Various Solvents

The reaction of preparing the modified NCs as described herein was initially performed in acetone as a solvent, and the effect of replacing the acetone with other organic solvents or with a water:organic solvent mixture as studied.

Two similarly modified NCs were prepared as generally described hereinabove, one in which the solvent was chloroform (RRA 194-1, see, Example 1), and another in which the solvent was a mixture of isopropanol (WA) and water (RRA 202-1, see, Example 1). All other ingredients and conditions used for preparing these NCs were the same.

Elastomer composites were prepared using these NCs, as depicted in Table 38.

TABLE 38

| Ingredient | S298-1G | S311-4G |
|---|---|---|
| Synpol1502 | 100.00 | 100.00 |
| acid stearic | 1.00 | 1.00 |
| zinc oxide | 3.00 | 3.00 |
| RRA 194-1 | 10.00 | — |
| RRA 202-1 | — | 10.00 |
| sulfur | 1.75 | 1.75 |

Table 39 presents the properties of the elastomeric composites S298-1G and S311-4G, as measured at 150° C. Some key features are also shown in graphic form in FIG. 32, further comparing to S274-5G, containing RRA 190-5.

TABLE 39

| | S298-1G | S311-4G |
|---|---|---|
| Rheological properties | | |
| mV lb-in | 0.76 | 0.86 |
| t2 min | 3.79 | 3.67 |
| t90 min | 17.70 | 14.48 |
| tan | 0.028 | 0.001 |
| S1 – mV | 9.90 | 7.69 |
| Mechanical properties | | |
| Vulc time min | 20.00 | 17.00 |
| Hardness ShA | 55 | 56 |
| Tensile MPa | 12.36 | 11.04 |
| Elongation % | 427 | 420 |
| M100 MPa | 2.45 | 2.43 |
| M200 MPa | 4.91 | 4.81 |
| M300 MPa | 7.87 | 7.39 |
| M300/M100 | 3.21 | 3.04 |
| Tear N/mm | 76.16 | 76.26 |

As can be seen in Table 39 and FIG. 32, the elastomeric composites S298-1G and S311-4G exhibit similar properties. These elastomeric composites, which are devoid of CB, were further comparable in their properties with S274-5G (see, Table 31 and FIG. 31), which contains CB and nanoclays prepared in acetone, and MBS and silica were added during the NCs preparation (see, RRA 190-5 in Example 1 hereinabove). Thus, since it is shown that silica appears to augment the strength of the elastomeric composites, and since the hybrids in S298-1G and S311-4G do not contain silica, it appears that using a mixture of IPA and water or chloroform in preparing the NCs is superior to acetone. It is noted that both WA and chloroform are much less of a fire hazard compared with acetone.

The effect of the solvent used for preparing the modified nanoclays was further studied. RRA 194-2 (see, Example 1), was prepared using a chloroform:acetone (2:1) mixture, and RRA 195-1 (see, Example 1), was prepared using a water:acetone (2:1) mixture, and both were prepared using comparable conditions and ingredients as RRA 194-2 and RRA 202-1.

Table 40 below lists the properties of elastomeric composites, S298-2G and S302-1G, containing the nanoclays RRA 194-2 and RRA 195-1, respectively.

TABLE 40

| | S298-2G | S302-1G |
|---|---|---|
| Rheological properties | | |
| mV lb-in | 0.76 | 0.82 |
| t2 min | 3.05 | 4.00 |
| t90 min | 17.17 | 20.85 |
| tan | 0.025 | 0.031 |
| S1 – mV | 10.64 | 10.39 |
| Mechanical properties | | |
| Vulc time min | 20.00 | 23.00 |
| Hardness ShA | 56 | 55 |
| Tensile MPa | 10.70 | 9.09 |
| Elongation % | 387 | 403 |
| M100 MPa | 2.60 | 2.08 |
| M200 MPa | 5.06 | 3.95 |
| M300 MPa | 7.86 | 6.04 |
| M300/M100 | 3.02 | 2.90 |
| Elast. Yerzley % | 78.05 | 78.35 |

FIG. 33 presents comparative plots showing readings from a rheometer (Alpha Technologies MDR2000) at 150° C. as obtained for these elastomeric composites (containing RRA 194-2 and RRA 195-1), and of the elastomeric composites S209-1G and S311-4G, containing RRA 194-2 and RRA 202-1, respectively). FIG. 34 presents comparative stress-strain curves of these elastomeric composites.

It can be seen from the obtained data that all elastomeric composites containing modified nanoclays prepared while using a solvent other than acetone exhibited similar properties as those containing RRA 190-5, as discussed hereinabove, without using a filler. An improvement in vulcanization time was also observed for these elastomeric composites.

Thus, it is shown that production of modified nanoclays as described herein, while using in solvent mixtures containing water, such as a mixture of IPA:water and acetone:water, may be preferable over use of acetone as a solvent.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for dispensing a material under pressure, comprising:
    a) a chamber having at least one wall formed at least in part by an elastic material, and having therein a flexible bag containing material for dispensing;
    b) an outlet positioned to release material from within said chamber, wherein said chamber and said elastic material are configured so that elastic contraction forces in said elastic material exert compressive pressure on said material, urging the material out of the outlet, and wherein said elastic material applies pressure on said outlet, but allows movement of said wall with respect to said outlet;
    said elastic material comprising an elastomeric composite which comprises an elastomer that comprises natural rubber, carbon black at an amount of at most 40 parts per hundred rubber (phr), and a nanofiller at an amount of from about 10 phr to about 15 phr, said nanofiller comprising modified nanoclays,
    wherein said modified nanoclays comprise organomodified nanoclays, in which a nanoclay is in association with a surface modifying agent, said organomodified nanoclays being further in association with an amine-containing compound that exhibits an antioxidation activity,
    and wherein said elastomeric composite exhibits at least one of:
    an elongation of at least 200%;
    relaxation lower than 10% change in M200 per year; and
    creep rate lower than 300 mm per 3 years.

2. The dispensing device of claim 1, wherein said elastomeric composite further exhibits at least one of:
    Yerzley elasticity higher than 65%;
    a toughness of at least 5 Joules; and
    a tear resistance of at least 50 N/mm.

3. The dispensing device of claim 1, wherein said elastic material is mounted on said outlet without gluing, welding, screwing and/or crimping.

4. The dispensing device of claim 1, wherein said surface modifying agent is a cationic surfactant.

5. The dispensing device of claim 1, wherein said nanoclay is montmorillonite.

6. The dispensing device of claim 4, wherein said nanoclay is montmorillonite.

7. The dispensing device of claim 1, wherein said amine-containing compound featuring an anti-oxidation activity is selected from the group consisting of a para-phenylenediamine (p-PDA), a substituted ethylene diurea (EDU) and a substituted amine having at least one hydrocarbyl chain of at least 4 carbon atoms.

8. The dispensing device of claim 7, wherein said para-phenylene diamine compound is selected from the group consisting of a N,N-dialkyl-p-PDA and a N-alkyl-N-aryl-p-PDA.

9. The dispensing device of claim 1, wherein said modified nanoclays further comprise a silyl-containing compound.

10. The dispensing device of claim 9, wherein the silyl-containing compound is a mercaptosilyl compound.

11. The dispensing device of claim 9, wherein said silyl-containing compound is a siloxane.

12. The dispensing device of claim 11, wherein said silyl-containing compound is a mercaptosiloxane.

* * * * *